(12) United States Patent
Konrardy et al.

(10) Patent No.: US 11,015,942 B1
(45) Date of Patent: *May 25, 2021

(54) AUTONOMOUS VEHICLE ROUTING

(71) Applicant: State Farm Mutual Automobile Insurance Company, Bloomington, IL (US)

(72) Inventors: Blake Konrardy, Bloomington, IL (US); Scott T. Christensen, Salem, OR (US); Gregory Hayward, Bloomington, IL (US); Scott Farris, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/408,508

(22) Filed: May 10, 2019

Related U.S. Application Data

(63) Continuation of application No. 15/409,146, filed on Jan. 18, 2017, now Pat. No. 10,386,192.

(Continued)

(51) Int. Cl.
*G01C 21/34* (2006.01)
*G01S 19/13* (2010.01)
(Continued)

(52) U.S. Cl.
CPC .......... *G01C 21/3453* (2013.01); *G01S 19/13* (2013.01); *G05D 1/0088* (2013.01); *G07C 5/008* (2013.01)

(58) Field of Classification Search
CPC .. G01C 21/3453; G01S 19/13; G05D 1/0088; G07C 5/008
(Continued)

(56) References Cited

U.S. PATENT DOCUMENTS

| 4,218,763 A | 8/1980 | Kelley et al. |
| 4,386,376 A | 5/1983 | Takimoto et al. |

(Continued)

FOREIGN PATENT DOCUMENTS

| DE | 102010001006 A1 | 7/2011 |
| DE | 102015208358 A1 | 11/2015 |

(Continued)

OTHER PUBLICATIONS

Eriksson et al. "Tuning for Ride Quality in Autonomous Vehicle Application to Linear Quadratic Path Planning Algorithm" Jun. 2015, 75 pages. (Year: 2015).

(Continued)

*Primary Examiner* — Yazan A Soofi

(57) ABSTRACT

Methods and systems for autonomous and semi-autonomous vehicle routing are disclosed. Roadway suitability for autonomous operation is scored to facilitate use in route determination. Maps of roadways suitable for various levels of autonomous operation may be generated. Such map data may be used by autonomous vehicles or other computer devices in determining routes based upon criteria for vehicle trips. Such routes may be automatically updated based upon changes in road conditions, vehicle conditions, operator conditions, or environmental conditions. Emergency routing using such map data is described, such as automatic routing and travel when a passenger is experiencing a medical emergency.

20 Claims, 12 Drawing Sheets

Related U.S. Application Data

(60) Provisional application No. 62/434,355, filed on Dec. 14, 2016, provisional application No. 62/434,361, filed on Dec. 14, 2016, provisional application No. 62/434,370, filed on Dec. 14, 2016, provisional application No. 62/434,368, filed on Dec. 14, 2016, provisional application No. 62/434,365, filed on Dec. 14, 2016, provisional application No. 62/434,359, filed on Dec. 14, 2016, provisional application No. 62/430,215, filed on Dec. 5, 2016, provisional application No. 62/428,843, filed on Dec. 1, 2016, provisional application No. 62/424,093, filed on Nov. 18, 2016, provisional application No. 62/424,078, filed on Nov. 18, 2016, provisional application No. 62/418,999, filed on Nov. 8, 2016, provisional application No. 62/419,009, filed on Nov. 8, 2016, provisional application No. 62/418,988, filed on Nov. 8, 2016, provisional application No. 62/419,023, filed on Nov. 8, 2016, provisional application No. 62/419,002, filed on Nov. 8, 2016, provisional application No. 62/419,017, filed on Nov. 8, 2016, provisional application No. 62/415,668, filed on Nov. 1, 2016, provisional application No. 62/415,678, filed on Nov. 1, 2016, provisional application No. 62/415,673, filed on Nov. 1, 2016, provisional application No. 62/415,672, filed on Nov. 1, 2016, provisional application No. 62/406,600, filed on Oct. 11, 2016, provisional application No. 62/406,595, filed on Oct. 11, 2016, provisional application No. 62/406,605, filed on Oct. 11, 2016, provisional application No. 62/406,611, filed on Oct. 11, 2016, provisional application No. 62/381,848, filed on Aug. 31, 2016, provisional application No. 62/380,686, filed on Aug. 29, 2016, provisional application No. 62/376,044, filed on Aug. 17, 2016, provisional application No. 62/373,084, filed on Aug. 10, 2016, provisional application No. 62/351,559, filed on Jun. 17, 2016, provisional application No. 62/349,884, filed on Jun. 14, 2016, provisional application No. 62/312,109, filed on Mar. 23, 2016, provisional application No. 62/303,500, filed on Mar. 4, 2016, provisional application No. 62/302,990, filed on Mar. 3, 2016, provisional application No. 62/287,659, filed on Jan. 27, 2016, provisional application No. 62/286,017, filed on Jan. 22, 2016.

(51) Int. Cl.
*G07C 5/00* (2006.01)
*G05D 1/00* (2006.01)

(58) Field of Classification Search
USPC .......................................................... 701/25
See application file for complete search history.

(56) References Cited

U.S. PATENT DOCUMENTS

| | | |
|---|---|---|
| 4,565,997 A | 1/1986 | Seko et al. |
| 4,833,469 A | 5/1989 | David |
| 5,214,582 A | 5/1993 | Gray |
| 5,363,298 A | 11/1994 | Survanshi et al. |
| 5,367,456 A | 11/1994 | Summerville et al. |
| 5,368,484 A | 11/1994 | Copperman et al. |
| 5,436,839 A | 7/1995 | Dausch et al. |
| 5,453,939 A | 9/1995 | Hoffman et al. |
| 5,488,353 A | 1/1996 | Kawakami et al. |
| 5,499,182 A | 3/1996 | Ousborne |
| 5,515,026 A | 5/1996 | Ewert |
| 5,574,641 A | 11/1996 | Kawakami et al. |
| 5,626,362 A | 5/1997 | Mottola |
| 5,689,241 A | 11/1997 | Clarke et al. |
| 5,797,134 A | 8/1998 | McMillan et al. |
| 5,835,008 A | 11/1998 | Colemere, Jr. |
| 5,983,161 A | 11/1999 | Lemelson et al. |
| 6,031,354 A | 2/2000 | Wiley et al. |
| 6,064,970 A | 5/2000 | McMillan et al. |
| 6,067,488 A | 5/2000 | Tano |
| 6,141,611 A | 10/2000 | Mackey et al. |
| 6,151,539 A | 11/2000 | Bergholz et al. |
| 6,246,933 B1 | 6/2001 | Bague |
| 6,253,129 B1 | 6/2001 | Jenkins et al. |
| 6,271,745 B1 | 8/2001 | Anzai |
| 6,285,931 B1 | 9/2001 | Hattori et al. |
| 6,298,290 B1 | 10/2001 | Abe et al. |
| 6,313,749 B1 | 11/2001 | Horne et al. |
| 6,323,761 B1 | 11/2001 | Son |
| 6,353,396 B1 | 3/2002 | Atlas |
| 6,400,835 B1 | 6/2002 | Lemelson et al. |
| 6,473,000 B1 | 10/2002 | Secreet et al. |
| 6,477,117 B1 | 11/2002 | Narayanaswami et al. |
| 6,477,177 B1 | 11/2002 | Potts |
| 6,553,354 B1 | 4/2003 | Hausner et al. |
| 6,556,905 B1 | 4/2003 | Mittelsteadt et al. |
| 6,570,609 B1 | 5/2003 | Heien |
| 6,579,233 B2 | 6/2003 | Hursh |
| 6,609,051 B2 | 8/2003 | Fiechter et al. |
| 6,661,345 B1 | 12/2003 | Bevan et al. |
| 6,701,234 B1 | 3/2004 | Vogelsang |
| 6,704,434 B1 | 3/2004 | Sakoh et al. |
| 6,727,800 B1 | 4/2004 | Dutu |
| 6,734,685 B2 | 5/2004 | Rudrich |
| 6,754,490 B2 | 6/2004 | Okoro et al. |
| 6,795,759 B2 | 9/2004 | Doyle |
| 6,832,141 B2 | 12/2004 | Skeen et al. |
| 6,889,137 B1 | 5/2005 | Rychlak |
| 6,909,947 B2 | 6/2005 | Douros et al. |
| 6,934,365 B2 | 8/2005 | Suganuma et al. |
| 6,944,536 B2 | 9/2005 | Singleton |
| 6,983,313 B1 | 1/2006 | Korkea-Aho |
| 6,989,737 B2 | 1/2006 | Yasui |
| 7,027,621 B1 | 4/2006 | Prokoski |
| 7,054,723 B2 | 5/2006 | Seto et al. |
| 7,102,496 B1 | 9/2006 | Ernst et al. |
| 7,138,922 B2 | 11/2006 | Strumolo et al. |
| 7,149,533 B2 | 12/2006 | Laird et al. |
| 7,253,724 B2 | 8/2007 | Prakah-Asante et al. |
| 7,254,482 B2 | 8/2007 | Kawasaki et al. |
| 7,266,532 B2 | 9/2007 | Sutton et al. |
| 7,290,275 B2 | 10/2007 | Baudoin et al. |
| 7,302,344 B2 | 11/2007 | Olney et al. |
| 7,315,233 B2 | 1/2008 | Yuhara |
| 7,330,124 B2 | 2/2008 | Ota |
| 7,348,882 B2 | 3/2008 | Adamczyk et al. |
| 7,349,860 B1 | 3/2008 | Wallach et al. |
| 7,356,392 B2 | 4/2008 | Hubbard et al. |
| 7,386,376 B2 | 6/2008 | Basir et al. |
| 7,424,414 B2 | 9/2008 | Craft |
| 7,499,774 B2 | 3/2009 | Barrett et al. |
| 7,565,230 B2 | 7/2009 | Gardner et al. |
| 7,596,242 B2 | 9/2009 | Breed et al. |
| 7,609,150 B2 | 10/2009 | Wheatley et al. |
| 7,639,148 B2 | 12/2009 | Victor |
| 7,676,062 B2 | 3/2010 | Breed et al. |
| 7,692,552 B2 | 4/2010 | Harrington et al. |
| 7,719,431 B2 | 5/2010 | Bolourchi |
| 7,783,426 B2 | 8/2010 | Kato et al. |
| 7,783,505 B2 | 8/2010 | Roschelle et al. |
| 7,791,503 B2 | 9/2010 | Breed et al. |
| 7,792,328 B2 | 9/2010 | Albertson et al. |
| 7,797,107 B2 | 9/2010 | Shiller |
| 7,812,712 B2 | 10/2010 | White et al. |
| 7,813,888 B2 | 10/2010 | Vian et al. |
| 7,835,834 B2 | 11/2010 | Smith et al. |
| 7,865,378 B2 | 1/2011 | Gay |
| 7,870,010 B2 | 1/2011 | Joao |
| 7,877,275 B2 | 1/2011 | Ball |

(56) References Cited

U.S. PATENT DOCUMENTS

| | | |
|---|---|---|
| 7,881,951 B2 | 2/2011 | Roschelle et al. |
| 7,890,355 B2 | 2/2011 | Gay et al. |
| 7,904,219 B1 | 3/2011 | Lowrey et al. |
| 7,973,674 B2 | 7/2011 | Bell et al. |
| 7,979,172 B2 | 7/2011 | Breed |
| 7,979,173 B2 | 7/2011 | Breed |
| 7,983,802 B2 | 7/2011 | Breed |
| 7,987,103 B2 | 7/2011 | Gay et al. |
| 7,991,629 B2 | 8/2011 | Gay et al. |
| 8,005,467 B2 | 8/2011 | Gerlach et al. |
| 8,009,051 B2 | 8/2011 | Omi |
| 8,010,283 B2 | 8/2011 | Yoshida et al. |
| 8,016,595 B2 | 9/2011 | Aoki et al. |
| 8,027,853 B1 | 9/2011 | Kazenas |
| 8,035,508 B2 | 10/2011 | Breed |
| 8,040,247 B2 | 10/2011 | Gunaratne |
| 8,068,983 B2 | 11/2011 | Vian et al. |
| 8,078,334 B2 | 12/2011 | Goodrich |
| 8,090,598 B2 | 1/2012 | Bauer et al. |
| 8,095,394 B2 | 1/2012 | Nowak et al. |
| 8,106,769 B1 | 1/2012 | Maroney |
| 8,108,655 B2 | 1/2012 | Abernathy et al. |
| 8,117,049 B2 | 2/2012 | Berkobin et al. |
| 8,123,686 B2 | 2/2012 | Fennell et al. |
| 8,140,249 B2 | 3/2012 | Hessling et al. |
| 8,140,358 B1 | 3/2012 | Ling et al. |
| 8,140,359 B2 | 3/2012 | Daniel |
| 8,180,522 B2 | 5/2012 | Tuff |
| 8,180,655 B1 | 5/2012 | Hopkins, III |
| 8,185,330 B2 | 5/2012 | Kameyama |
| 8,188,887 B2 | 5/2012 | Catten et al. |
| 8,190,323 B2 | 5/2012 | Maeda et al. |
| 8,255,144 B2 | 8/2012 | Breed et al. |
| 8,255,243 B2 | 8/2012 | Raines et al. |
| 8,255,244 B2 | 8/2012 | Raines et al. |
| 8,260,489 B2 | 9/2012 | Nielsen et al. |
| 8,260,639 B1 | 9/2012 | Medina, III et al. |
| 8,265,861 B2 | 9/2012 | Ikeda et al. |
| 8,275,417 B2 | 9/2012 | Flynn |
| 8,280,752 B1 | 10/2012 | Cripe et al. |
| 8,311,858 B2 | 11/2012 | Everett et al. |
| 8,314,708 B2 | 11/2012 | Gunderson et al. |
| 8,332,242 B1 | 12/2012 | Medina, III |
| 8,340,893 B2 | 12/2012 | Yamaguchi et al. |
| 8,340,902 B1 | 12/2012 | Chiang |
| 8,344,849 B2 | 1/2013 | Larsson et al. |
| 8,352,118 B1 | 1/2013 | Mittelsteadt et al. |
| 8,355,837 B2 | 1/2013 | Avery et al. |
| 8,364,391 B2 | 1/2013 | Nagase et al. |
| 8,384,534 B2 | 2/2013 | James et al. |
| 8,386,168 B2 | 2/2013 | Hao |
| 8,423,239 B2 | 4/2013 | Blumer et al. |
| 8,437,966 B2 | 5/2013 | Connolly et al. |
| 8,447,231 B2 | 5/2013 | Bai et al. |
| 8,451,105 B2 | 5/2013 | McNay |
| 8,457,880 B1 | 6/2013 | Malalur et al. |
| 8,473,143 B2 | 6/2013 | Stark et al. |
| 8,487,775 B2 | 7/2013 | Victor et al. |
| 8,520,695 B1 | 8/2013 | Rubin et al. |
| 8,554,468 B1 | 10/2013 | Bullock |
| 8,554,587 B1 | 10/2013 | Nowak et al. |
| 8,566,126 B1 | 10/2013 | Hopkins, III |
| 8,595,034 B2 | 11/2013 | Bauer et al. |
| 8,595,037 B1 | 11/2013 | Hyde et al. |
| 8,605,947 B2 | 12/2013 | Zhang et al. |
| 8,618,922 B2 | 12/2013 | Debouk et al. |
| 8,634,980 B1 | 1/2014 | Urmson et al. |
| 8,645,014 B1 | 2/2014 | Kozlowski et al. |
| 8,645,029 B2 | 2/2014 | Kim et al. |
| 8,698,639 B2 | 4/2014 | Fung et al. |
| 8,700,251 B1 | 4/2014 | Zhu et al. |
| 8,725,311 B1 | 5/2014 | Breed |
| 8,725,472 B2 | 5/2014 | Hagelin et al. |
| 8,731,977 B1 | 5/2014 | Hardin et al. |
| 8,742,936 B2 | 6/2014 | Galley et al. |
| 8,781,442 B1 | 7/2014 | Link, II |
| 8,781,669 B1 | 7/2014 | Teller et al. |
| 8,788,299 B1 | 7/2014 | Medina, III |
| 8,799,034 B1 | 8/2014 | Brandmaier et al. |
| 8,816,836 B2 | 8/2014 | Lee et al. |
| 8,818,608 B2 | 8/2014 | Cullinane et al. |
| 8,825,258 B2 | 9/2014 | Cullinane et al. |
| 8,849,558 B2 | 9/2014 | Morotomi et al. |
| 8,874,301 B1 | 10/2014 | Rao et al. |
| 8,874,305 B2 | 10/2014 | Dolgov |
| 8,876,535 B2 | 11/2014 | Fields et al. |
| 8,880,291 B2 | 11/2014 | Hampiholi |
| 8,892,271 B2 | 11/2014 | Breed |
| 8,902,054 B2 | 12/2014 | Morris |
| 8,909,428 B1 | 12/2014 | Lombrozo |
| 8,917,182 B2 | 12/2014 | Chang et al. |
| 8,935,036 B1 | 1/2015 | Christensen et al. |
| 8,954,217 B1 | 2/2015 | Montemerlo et al. |
| 8,954,226 B1 | 2/2015 | Binion et al. |
| 8,965,677 B2 | 2/2015 | Breed et al. |
| 8,989,959 B2 | 3/2015 | Plante et al. |
| 8,996,228 B1 | 3/2015 | Ferguson et al. |
| 8,996,240 B2 | 3/2015 | Plante |
| 9,008,952 B2 | 4/2015 | Caskey et al. |
| 9,019,092 B1 | 4/2015 | Brandmaier et al. |
| 9,049,584 B2 | 6/2015 | Hatton |
| 9,053,588 B1 | 6/2015 | Briggs et al. |
| 9,056,395 B1 | 6/2015 | Ferguson et al. |
| 9,063,543 B2 | 6/2015 | An et al. |
| 9,070,243 B1 | 6/2015 | Kozlowski et al. |
| 9,075,413 B2 | 7/2015 | Cullinane et al. |
| 9,079,587 B1 | 7/2015 | Rupp et al. |
| 9,081,650 B1 | 7/2015 | Brinkmann et al. |
| 9,098,080 B2 | 8/2015 | Norris et al. |
| 9,135,803 B1 | 9/2015 | Fields et al. |
| 9,141,996 B2 | 9/2015 | Christensen et al. |
| 9,144,389 B2 | 9/2015 | Srinivasan et al. |
| 9,147,219 B2 | 9/2015 | Binion et al. |
| 9,147,353 B1 | 9/2015 | Slusar |
| 9,151,692 B2 | 10/2015 | Breed |
| 9,164,507 B2 | 10/2015 | Cheatham, III et al. |
| 9,177,475 B2 | 11/2015 | Sellschopp |
| 9,182,764 B1 | 11/2015 | Kolhouse et al. |
| 9,182,942 B2 | 11/2015 | Kelly et al. |
| 9,188,985 B1 | 11/2015 | Hobbs et al. |
| 9,194,168 B1 | 11/2015 | Lu et al. |
| 9,205,805 B2 | 12/2015 | Cudak et al. |
| 9,205,842 B1 | 12/2015 | Fields et al. |
| 9,221,396 B1 | 12/2015 | Zhu et al. |
| 9,224,293 B2 | 12/2015 | Taylor |
| 9,235,211 B2 | 1/2016 | Davidsson et al. |
| 9,262,787 B2 | 2/2016 | Binion et al. |
| 9,274,525 B1 | 3/2016 | Ferguson et al. |
| 9,275,417 B2 | 3/2016 | Binion et al. |
| 9,275,552 B1 | 3/2016 | Fields et al. |
| 9,282,430 B1 | 3/2016 | Brandmaier et al. |
| 9,282,447 B2 | 3/2016 | Gianakis |
| 9,299,108 B2 | 3/2016 | Diana et al. |
| 9,308,891 B2 | 4/2016 | Cudak et al. |
| 9,317,983 B2 | 4/2016 | Ricci |
| 9,342,074 B2 | 5/2016 | Dolgov et al. |
| 9,342,993 B1 | 5/2016 | Fields et al. |
| 9,352,709 B2 | 5/2016 | Brenneis et al. |
| 9,352,752 B2 | 5/2016 | Cullinane et al. |
| 9,355,423 B1 | 5/2016 | Slusar |
| 9,361,599 B1 | 6/2016 | Biemer et al. |
| 9,361,650 B2 | 6/2016 | Binion et al. |
| 9,371,072 B1 | 6/2016 | Sisbot |
| 9,376,090 B2 | 6/2016 | Gennermann |
| 9,377,315 B2 | 6/2016 | Grover et al. |
| 9,381,916 B1 | 7/2016 | Zhu et al. |
| 9,384,491 B1 | 7/2016 | Briggs et al. |
| 9,390,451 B1 | 7/2016 | Slusar |
| 9,390,452 B1 | 7/2016 | Biemer et al. |
| 9,390,567 B2 | 7/2016 | Kim et al. |
| 9,399,445 B2 | 7/2016 | Abou et al. |
| 9,406,177 B2 | 8/2016 | Attard |
| 9,421,972 B2 | 8/2016 | Davidsson et al. |
| 9,429,943 B2 | 8/2016 | Wilson et al. |

(56) References Cited

U.S. PATENT DOCUMENTS

| | | |
|---|---|---|
| 9,430,944 B2 | 8/2016 | Grimm et al. |
| 9,440,657 B1 | 9/2016 | Fields et al. |
| 9,443,152 B2 | 9/2016 | Atsmon et al. |
| 9,443,207 B2 | 9/2016 | Przybylko et al. |
| 9,443,436 B2 | 9/2016 | Scheidt |
| 9,454,786 B1 | 9/2016 | Srey et al. |
| 9,466,214 B2 | 10/2016 | Fuehrer |
| 9,475,496 B2 | 10/2016 | Attard et al. |
| 9,477,990 B1 | 10/2016 | Binion et al. |
| 9,478,150 B1 | 10/2016 | Fields et al. |
| 9,489,635 B1 | 11/2016 | Zhu |
| 9,505,494 B1 | 11/2016 | Marlow et al. |
| 9,511,765 B2 | 12/2016 | Obradovich |
| 9,511,767 B1 | 12/2016 | Okumura et al. |
| 9,511,779 B2 | 12/2016 | Cullinane et al. |
| 9,517,771 B2 | 12/2016 | Attard et al. |
| 9,524,648 B1 | 12/2016 | Gopalakrishnan |
| 9,529,361 B2 | 12/2016 | You et al. |
| 9,530,333 B1 | 12/2016 | Fields et al. |
| 9,542,846 B2 | 1/2017 | Zeng et al. |
| 9,557,741 B1 | 1/2017 | Elie et al. |
| 9,566,959 B2 | 2/2017 | Breuer et al. |
| 9,567,007 B2 | 2/2017 | Cudak et al. |
| 9,587,952 B1 | 3/2017 | Slusar |
| 9,594,373 B2 | 3/2017 | Solyom et al. |
| 9,604,652 B2 | 3/2017 | Strauss |
| 9,632,502 B1 | 4/2017 | Levinson et al. |
| 9,633,318 B2 | 4/2017 | Plante |
| 9,646,428 B1 | 5/2017 | Konrardy et al. |
| 9,650,051 B2 | 5/2017 | Hoye et al. |
| 9,656,606 B1 | 5/2017 | Vose et al. |
| 9,663,033 B2 | 5/2017 | Bharwani |
| 9,663,112 B2 | 5/2017 | Abou-Nasr et al. |
| 9,665,101 B1 | 5/2017 | Templeton |
| 9,679,487 B1 | 6/2017 | Hayward |
| 9,688,288 B1 * | 6/2017 | Lathrop ............... B60W 50/14 |
| 9,692,778 B1 | 6/2017 | Mohanty |
| 9,697,733 B1 | 7/2017 | Penilla et al. |
| 9,712,549 B2 | 7/2017 | Almurayh |
| 9,715,711 B1 | 7/2017 | Konrardy et al. |
| 9,720,419 B2 | 8/2017 | O'Neill |
| 9,725,036 B1 | 8/2017 | Tarte |
| 9,727,920 B1 | 8/2017 | Healy et al. |
| 9,753,390 B2 | 9/2017 | Kabai |
| 9,754,325 B1 | 9/2017 | Konrardy et al. |
| 9,754,424 B2 | 9/2017 | Ling et al. |
| 9,754,490 B2 | 9/2017 | Kentley |
| 9,760,702 B1 | 9/2017 | Kursun et al. |
| 9,761,139 B2 | 9/2017 | Acker et al. |
| 9,766,625 B2 | 9/2017 | Boroditsky et al. |
| 9,767,516 B1 | 9/2017 | Konrardy et al. |
| 9,773,281 B1 | 9/2017 | Hanson |
| 9,792,656 B1 | 10/2017 | Konrardy et al. |
| 9,805,423 B1 | 10/2017 | Konrardy |
| 9,805,601 B1 | 10/2017 | Fields |
| 9,816,827 B1 | 11/2017 | Slusar |
| 9,817,400 B1 | 11/2017 | Poeppel et al. |
| 9,842,496 B1 | 12/2017 | Hayward |
| 9,846,978 B1 | 12/2017 | Tseng et al. |
| 9,847,033 B1 | 12/2017 | Carmack et al. |
| 9,852,475 B1 | 12/2017 | Konrardy et al. |
| 9,858,621 B1 | 1/2018 | Konrardy et al. |
| 9,868,394 B1 | 1/2018 | Fields |
| 9,870,649 B1 | 1/2018 | Fields |
| 9,884,611 B2 | 2/2018 | Abou et al. |
| 9,904,928 B1 | 2/2018 | Leise |
| 9,939,279 B2 | 4/2018 | Pan et al. |
| 9,940,676 B1 | 4/2018 | Biemer |
| 9,940,834 B1 | 4/2018 | Konrardy |
| 9,944,282 B1 | 4/2018 | Fields et al. |
| 9,944,404 B1 | 4/2018 | Gentry |
| 9,946,531 B1 | 4/2018 | Fields |
| 9,948,477 B2 | 4/2018 | Marten |
| 9,972,054 B1 | 5/2018 | Konrardy et al. |
| 9,986,404 B2 | 5/2018 | Mehta et al. |
| 10,007,263 B1 | 6/2018 | Fields |
| 10,013,697 B1 | 7/2018 | Cote et al. |
| 10,019,901 B1 | 7/2018 | Fields |
| 10,026,130 B1 | 7/2018 | Konrardy et al. |
| 10,026,237 B1 | 7/2018 | Fields et al. |
| 10,042,359 B1 | 8/2018 | Konrardy et al. |
| 10,042,364 B1 | 8/2018 | Hayward |
| 10,043,323 B1 | 8/2018 | Konrardy et al. |
| 10,049,505 B1 | 8/2018 | Harvey et al. |
| 10,055,794 B1 | 8/2018 | Konrardy et al. |
| 10,065,517 B1 | 9/2018 | Konrardy et al. |
| 10,086,782 B1 | 10/2018 | Konrardy et al. |
| 10,089,693 B1 | 10/2018 | Konrardy et al. |
| 10,102,586 B1 | 10/2018 | Marlow et al. |
| 10,102,590 B1 | 10/2018 | Farnsworth |
| 10,106,083 B1 | 10/2018 | Fields et al. |
| 10,134,278 B1 | 11/2018 | Konrardy et al. |
| 10,156,848 B1 | 12/2018 | Konrardy et al. |
| 10,157,423 B1 | 12/2018 | Fields et al. |
| 10,163,350 B1 | 12/2018 | Fields et al. |
| 10,166,994 B1 | 1/2019 | Fields et al. |
| 10,168,703 B1 | 1/2019 | Konrardy et al. |
| 10,181,161 B1 | 1/2019 | Konrardy et al. |
| 10,185,997 B1 | 1/2019 | Konrardy et al. |
| 10,185,998 B1 | 1/2019 | Konrardy et al. |
| 10,185,999 B1 | 1/2019 | Konrardy et al. |
| 10,359,782 B1 | 7/2019 | Hayward |
| 10,416,205 B2 | 9/2019 | Marti et al. |
| 10,657,597 B1 | 5/2020 | Billman et al. |
| 10,755,566 B2 | 8/2020 | Tennent et al. |
| 2001/0005217 A1 | 6/2001 | Hamilton et al. |
| 2002/0016655 A1 | 2/2002 | Joao |
| 2002/0049535 A1 | 4/2002 | Rigo et al. |
| 2002/0091483 A1 | 7/2002 | Douet |
| 2002/0099527 A1 | 7/2002 | Bomar et al. |
| 2002/0103622 A1 | 8/2002 | Burge |
| 2002/0103678 A1 | 8/2002 | Burkhalter et al. |
| 2002/0111725 A1 | 8/2002 | Burge |
| 2002/0116228 A1 | 8/2002 | Bauer et al. |
| 2002/0128751 A1 | 9/2002 | Engstrom et al. |
| 2002/0128882 A1 | 9/2002 | Nakagawa et al. |
| 2002/0135618 A1 | 9/2002 | Maes et al. |
| 2002/0146667 A1 | 10/2002 | Dowdell et al. |
| 2003/0028298 A1 | 2/2003 | Macky et al. |
| 2003/0061116 A1 | 3/2003 | Tago |
| 2003/0061160 A1 | 3/2003 | Asahina |
| 2003/0095039 A1 | 5/2003 | Shimomura |
| 2003/0102997 A1 | 6/2003 | Levin et al. |
| 2003/0112133 A1 | 6/2003 | Webb et al. |
| 2003/0139948 A1 | 7/2003 | Strech |
| 2003/0146850 A1 | 8/2003 | Fallenstein |
| 2003/0182042 A1 | 9/2003 | Watson et al. |
| 2003/0182183 A1 | 9/2003 | Pribe |
| 2003/0200123 A1 | 10/2003 | Burge et al. |
| 2004/0005927 A1 | 1/2004 | Bonilla et al. |
| 2004/0017106 A1 | 1/2004 | Aizawa et al. |
| 2004/0019539 A1 | 1/2004 | Raman et al. |
| 2004/0039503 A1 | 2/2004 | Doyle |
| 2004/0054452 A1 | 3/2004 | Bjorkman |
| 2004/0077285 A1 | 4/2004 | Bonilla et al. |
| 2004/0085198 A1 | 5/2004 | Saito et al. |
| 2004/0090334 A1 | 5/2004 | Zhang et al. |
| 2004/0111301 A1 | 6/2004 | Wahlbin et al. |
| 2004/0122639 A1 | 6/2004 | Qiu |
| 2004/0139034 A1 | 7/2004 | Farmer |
| 2004/0153362 A1 | 8/2004 | Bauer |
| 2004/0158476 A1 | 8/2004 | Blessinger et al. |
| 2004/0169034 A1 | 9/2004 | Park |
| 2004/0198441 A1 | 10/2004 | Cooper et al. |
| 2004/0226043 A1 | 11/2004 | Mettu et al. |
| 2004/0252027 A1 | 12/2004 | Torkkola et al. |
| 2004/0260579 A1 | 12/2004 | Tremiti |
| 2005/0007438 A1 | 1/2005 | Busch et al. |
| 2005/0046584 A1 | 3/2005 | Breed |
| 2005/0055249 A1 | 3/2005 | Helitzer et al. |
| 2005/0059151 A1 | 3/2005 | Bosch |
| 2005/0065678 A1 | 3/2005 | Smith et al. |
| 2005/0071052 A1 | 3/2005 | Coletrane et al. |
| 2005/0071202 A1 | 3/2005 | Kendrick |

(56) References Cited

U.S. PATENT DOCUMENTS

| | | |
|---|---|---|
| 2005/0073438 A1 | 4/2005 | Rodgers et al. |
| 2005/0080519 A1 | 4/2005 | Oesterling et al. |
| 2005/0088291 A1 | 4/2005 | Blanco et al. |
| 2005/0088521 A1 | 4/2005 | Blanco et al. |
| 2005/0093684 A1 | 5/2005 | Cunnien |
| 2005/0108910 A1 | 5/2005 | Esparza et al. |
| 2005/0131597 A1 | 6/2005 | Raz et al. |
| 2005/0154513 A1 | 7/2005 | Matsunaga et al. |
| 2005/0216136 A1 | 9/2005 | Lengning et al. |
| 2005/0228763 A1 | 10/2005 | Lewis et al. |
| 2005/0237784 A1 | 10/2005 | Kang |
| 2005/0246256 A1 | 11/2005 | Gastineau et al. |
| 2005/0259151 A1 | 11/2005 | Hamilton et al. |
| 2005/0267784 A1 | 12/2005 | Slen et al. |
| 2006/0031103 A1 | 2/2006 | Henry |
| 2006/0052909 A1 | 3/2006 | Cherouny |
| 2006/0052929 A1 | 3/2006 | Bastian et al. |
| 2006/0053038 A1 | 3/2006 | Warren et al. |
| 2006/0055565 A1 | 3/2006 | Kawamata et al. |
| 2006/0079280 A1 | 4/2006 | LaPerch |
| 2006/0089766 A1 | 4/2006 | Allard et al. |
| 2006/0092043 A1 | 5/2006 | Lagassey |
| 2006/0136291 A1 | 6/2006 | Morita et al. |
| 2006/0149461 A1 | 7/2006 | Rowley et al. |
| 2006/0184295 A1 | 8/2006 | Hawkins et al. |
| 2006/0212195 A1 | 9/2006 | Veith et al. |
| 2006/0220905 A1 | 10/2006 | Hovestadt |
| 2006/0229777 A1 | 10/2006 | Hudson et al. |
| 2006/0232430 A1 | 10/2006 | Takaoka et al. |
| 2006/0294514 A1 | 12/2006 | Bauchot et al. |
| 2007/0001831 A1 | 1/2007 | Raz et al. |
| 2007/0027726 A1 | 2/2007 | Warren et al. |
| 2007/0048707 A1 | 3/2007 | Caamano et al. |
| 2007/0055422 A1 | 3/2007 | Anzai et al. |
| 2007/0080816 A1 | 4/2007 | Haque et al. |
| 2007/0088469 A1 | 4/2007 | Schmiedel et al. |
| 2007/0093947 A1 | 4/2007 | Gould et al. |
| 2007/0122771 A1 | 5/2007 | Maeda et al. |
| 2007/0124599 A1 | 5/2007 | Morita et al. |
| 2007/0132773 A1 | 6/2007 | Plante |
| 2007/0149208 A1 | 6/2007 | Syrbe et al. |
| 2007/0159344 A1 | 7/2007 | Kisacanin |
| 2007/0159354 A1 | 7/2007 | Rosenberg |
| 2007/0203866 A1 | 8/2007 | Kidd et al. |
| 2007/0208498 A1 | 9/2007 | Barker et al. |
| 2007/0219720 A1 | 9/2007 | Trepagnier et al. |
| 2007/0265540 A1 | 11/2007 | Fuwamoto et al. |
| 2007/0282489 A1 | 12/2007 | Boss et al. |
| 2007/0282638 A1 | 12/2007 | Surovy |
| 2007/0291130 A1 | 12/2007 | Broggi et al. |
| 2007/0299700 A1 | 12/2007 | Gay et al. |
| 2008/0027761 A1 | 1/2008 | Bracha |
| 2008/0028974 A1 | 2/2008 | Bianco |
| 2008/0052134 A1 | 2/2008 | Nowak et al. |
| 2008/0061953 A1 | 3/2008 | Bhogal et al. |
| 2008/0064014 A1 | 3/2008 | Wojtczak et al. |
| 2008/0065427 A1 | 3/2008 | Helitzer et al. |
| 2008/0082372 A1 | 4/2008 | Burch |
| 2008/0084473 A1 | 4/2008 | Romanowich |
| 2008/0097796 A1 | 4/2008 | Birchall |
| 2008/0106390 A1 | 5/2008 | White |
| 2008/0111666 A1 | 5/2008 | Plante et al. |
| 2008/0114502 A1 | 5/2008 | Breed et al. |
| 2008/0114530 A1 | 5/2008 | Petrisor et al. |
| 2008/0126137 A1 | 5/2008 | Kidd et al. |
| 2008/0143497 A1 | 6/2008 | Wasson et al. |
| 2008/0147265 A1 | 6/2008 | Breed |
| 2008/0147266 A1 | 6/2008 | Plante et al. |
| 2008/0147267 A1 | 6/2008 | Plante et al. |
| 2008/0161989 A1 | 7/2008 | Breed |
| 2008/0167821 A1 | 7/2008 | Breed |
| 2008/0180237 A1 | 7/2008 | Fayyad et al. |
| 2008/0189142 A1 | 8/2008 | Brown et al. |
| 2008/0255887 A1 | 10/2008 | Gruter |
| 2008/0255888 A1 | 10/2008 | Berkobin et al. |
| 2008/0258885 A1 | 10/2008 | Akhan |
| 2008/0258890 A1 | 10/2008 | Follmer et al. |
| 2008/0291008 A1 | 11/2008 | Jeon |
| 2008/0294690 A1 | 11/2008 | McClellan et al. |
| 2008/0297488 A1 | 12/2008 | Operowsky et al. |
| 2008/0300733 A1 | 12/2008 | Rasshofer et al. |
| 2008/0313007 A1 | 12/2008 | Callahan |
| 2008/0319665 A1 | 12/2008 | Berkobin et al. |
| 2009/0005979 A1 | 1/2009 | Nakao et al. |
| 2009/0015684 A1 | 1/2009 | Ooga et al. |
| 2009/0027188 A1 | 1/2009 | Saban |
| 2009/0063030 A1 | 3/2009 | Howarter et al. |
| 2009/0069953 A1 | 3/2009 | Hale et al. |
| 2009/0079839 A1 | 3/2009 | Fischer et al. |
| 2009/0081923 A1 | 3/2009 | Dooley et al. |
| 2009/0085770 A1 | 4/2009 | Mergen |
| 2009/0106135 A1 | 4/2009 | Steiger |
| 2009/0115638 A1 | 5/2009 | Shankwitz et al. |
| 2009/0132294 A1 | 5/2009 | Haines |
| 2009/0140887 A1 | 6/2009 | Breed et al. |
| 2009/0174573 A1 | 7/2009 | Smith |
| 2009/0207005 A1 | 8/2009 | Habetha et al. |
| 2009/0210257 A1 | 8/2009 | Chalfant et al. |
| 2009/0228160 A1 | 9/2009 | Eklund et al. |
| 2009/0254240 A1 | 10/2009 | Olsen et al. |
| 2009/0267801 A1 | 10/2009 | Kawai et al. |
| 2009/0300065 A1 | 12/2009 | Birchall |
| 2009/0303026 A1 | 12/2009 | Broggi et al. |
| 2010/0004995 A1 | 1/2010 | Hickman |
| 2010/0030540 A1 | 2/2010 | Choi et al. |
| 2010/0030586 A1 | 2/2010 | Taylor et al. |
| 2010/0042318 A1 | 2/2010 | Kaplan et al. |
| 2010/0055649 A1 | 3/2010 | Takahashi et al. |
| 2010/0063672 A1 | 3/2010 | Anderson |
| 2010/0076646 A1 | 3/2010 | Basir et al. |
| 2010/0085171 A1 | 4/2010 | Do |
| 2010/0106346 A1 | 4/2010 | Badli et al. |
| 2010/0106356 A1 | 4/2010 | Trepagnier et al. |
| 2010/0128127 A1 | 5/2010 | Ciolli |
| 2010/0131300 A1 | 5/2010 | Collopy et al. |
| 2010/0131302 A1 | 5/2010 | Collopy et al. |
| 2010/0131304 A1 | 5/2010 | Collopy et al. |
| 2010/0131307 A1 | 5/2010 | Collopy et al. |
| 2010/0143872 A1 | 6/2010 | Lankteee |
| 2010/0148923 A1 | 6/2010 | Takizawa |
| 2010/0157255 A1 | 6/2010 | Togino |
| 2010/0164737 A1 | 7/2010 | Lin |
| 2010/0198491 A1 | 8/2010 | Mays |
| 2010/0214087 A1 | 8/2010 | Nakagoshi et al. |
| 2010/0219944 A1 | 9/2010 | McCormick et al. |
| 2010/0253541 A1 | 10/2010 | Seder et al. |
| 2010/0256836 A1 | 10/2010 | Mudalige |
| 2010/0274629 A1 | 10/2010 | Walker et al. |
| 2010/0286845 A1 | 11/2010 | Rekow et al. |
| 2010/0289632 A1 | 11/2010 | Seder et al. |
| 2010/0293033 A1 | 11/2010 | Hall et al. |
| 2010/0299021 A1 | 11/2010 | Jalili |
| 2011/0009093 A1 | 1/2011 | Self et al. |
| 2011/0010042 A1 | 1/2011 | Boulet et al. |
| 2011/0043350 A1 | 2/2011 | Ben David |
| 2011/0043377 A1 | 2/2011 | McGrath et al. |
| 2011/0054767 A1 | 3/2011 | Schafer et al. |
| 2011/0060496 A1 | 3/2011 | Nielsen et al. |
| 2011/0066310 A1 | 3/2011 | Sakai et al. |
| 2011/0077809 A1 | 3/2011 | Leary |
| 2011/0084824 A1 | 4/2011 | Tewari et al. |
| 2011/0087505 A1 | 4/2011 | Terlep |
| 2011/0090075 A1 | 4/2011 | Armitage et al. |
| 2011/0090093 A1 | 4/2011 | Grimm et al. |
| 2011/0093134 A1 | 4/2011 | Emanuel et al. |
| 2011/0093350 A1 | 4/2011 | Laumeyer et al. |
| 2011/0106370 A1 | 5/2011 | Duddle et al. |
| 2011/0109462 A1 | 5/2011 | Deng et al. |
| 2011/0118907 A1 | 5/2011 | Elkins |
| 2011/0128161 A1 | 6/2011 | Bae et al. |
| 2011/0133954 A1 | 6/2011 | Ooshima et al. |
| 2011/0137684 A1 | 6/2011 | Peak et al. |
| 2011/0140919 A1 | 6/2011 | Hara et al. |
| 2011/0140968 A1 | 6/2011 | Bai et al. |

(56) References Cited

U.S. PATENT DOCUMENTS

| | | |
|---|---|---|
| 2011/0144854 A1 | 6/2011 | Cramer et al. |
| 2011/0153367 A1 | 6/2011 | Amigo et al. |
| 2011/0161116 A1 | 6/2011 | Peak et al. |
| 2011/0161119 A1 | 6/2011 | Collins |
| 2011/0169625 A1 | 7/2011 | James et al. |
| 2011/0184605 A1 | 7/2011 | Neff |
| 2011/0187559 A1 | 8/2011 | Applebaum |
| 2011/0190972 A1 | 8/2011 | Timmons |
| 2011/0196571 A1 | 8/2011 | Foladare et al. |
| 2011/0202305 A1 | 8/2011 | Willis et al. |
| 2011/0224865 A1 | 9/2011 | Gordon et al. |
| 2011/0224900 A1 | 9/2011 | Hiruta et al. |
| 2011/0251751 A1 | 10/2011 | Knight |
| 2011/0270513 A1 | 11/2011 | Shida |
| 2011/0279263 A1 | 11/2011 | Rodkey et al. |
| 2011/0288770 A1 | 11/2011 | Greasby |
| 2011/0295446 A1 | 12/2011 | Basir et al. |
| 2011/0295546 A1 | 12/2011 | Khazanov |
| 2011/0301839 A1 | 12/2011 | Pudar et al. |
| 2011/0304465 A1 | 12/2011 | Boult et al. |
| 2011/0307188 A1 | 12/2011 | Peng et al. |
| 2011/0307336 A1 | 12/2011 | Smirnov et al. |
| 2012/0004933 A1 | 1/2012 | Foladare et al. |
| 2012/0010906 A1 | 1/2012 | Foladare et al. |
| 2012/0013582 A1 | 1/2012 | Inoue et al. |
| 2012/0019001 A1 | 1/2012 | Hede et al. |
| 2012/0025969 A1 | 2/2012 | Dozza |
| 2012/0028680 A1 | 2/2012 | Breed |
| 2012/0053824 A1 | 3/2012 | Nam et al. |
| 2012/0056758 A1 | 3/2012 | Kuhlman et al. |
| 2012/0059227 A1 | 3/2012 | Friedlander et al. |
| 2012/0066007 A1 | 3/2012 | Ferrick et al. |
| 2012/0071151 A1 | 3/2012 | Abramson et al. |
| 2012/0072214 A1 | 3/2012 | Cox et al. |
| 2012/0072243 A1 | 3/2012 | Collins et al. |
| 2012/0072244 A1 | 3/2012 | Collins et al. |
| 2012/0083668 A1 | 4/2012 | Pradeep et al. |
| 2012/0083960 A1 | 4/2012 | Zhu |
| 2012/0083964 A1 | 4/2012 | Montemerio |
| 2012/0083974 A1 | 4/2012 | Sandblom |
| 2012/0092157 A1 | 4/2012 | Tran |
| 2012/0101855 A1 | 4/2012 | Collins et al. |
| 2012/0108909 A1 | 5/2012 | Slobounov et al. |
| 2012/0109407 A1 | 5/2012 | Yousefi et al. |
| 2012/0109692 A1 | 5/2012 | Collins et al. |
| 2012/0123806 A1 | 5/2012 | Schumann, Jr. et al. |
| 2012/0135382 A1 | 5/2012 | Winston et al. |
| 2012/0143391 A1 | 6/2012 | Gee |
| 2012/0143630 A1 | 6/2012 | Hertenstein |
| 2012/0172055 A1 | 7/2012 | Edge |
| 2012/0185204 A1 | 7/2012 | Jallon et al. |
| 2012/0188100 A1 | 7/2012 | Min et al. |
| 2012/0190001 A1 | 7/2012 | Knight et al. |
| 2012/0191343 A1 | 7/2012 | Haleem |
| 2012/0191373 A1 | 7/2012 | Soles et al. |
| 2012/0197669 A1 | 8/2012 | Kote et al. |
| 2012/0200427 A1 | 8/2012 | Kamata |
| 2012/0203418 A1 | 8/2012 | Braennstroem et al. |
| 2012/0209634 A1 | 8/2012 | Ling et al. |
| 2012/0209692 A1 | 8/2012 | Bennett et al. |
| 2012/0215375 A1 | 8/2012 | Chang |
| 2012/0235865 A1 | 9/2012 | Nath et al. |
| 2012/0239242 A1 | 9/2012 | Uehara |
| 2012/0239281 A1 | 9/2012 | Hinz |
| 2012/0239471 A1 | 9/2012 | Grimm et al. |
| 2012/0239821 A1 | 9/2012 | Hozumi |
| 2012/0246733 A1 | 9/2012 | Schafer et al. |
| 2012/0256769 A1 | 10/2012 | Satpathy |
| 2012/0258702 A1 | 10/2012 | Matsuyama |
| 2012/0271500 A1 | 10/2012 | Tsimhoni et al. |
| 2012/0277949 A1 | 11/2012 | Ghimire et al. |
| 2012/0277950 A1 | 11/2012 | Plante et al. |
| 2012/0286974 A1 | 11/2012 | Claussen et al. |
| 2012/0289819 A1 | 11/2012 | Snow |
| 2012/0303177 A1 | 11/2012 | Jauch et al. |
| 2012/0303222 A1 | 11/2012 | Cooprider et al. |
| 2012/0306663 A1 | 12/2012 | Mudalige |
| 2012/0316406 A1 | 12/2012 | Rahman et al. |
| 2013/0006674 A1 | 1/2013 | Bowne et al. |
| 2013/0006675 A1 | 1/2013 | Bowne et al. |
| 2013/0018677 A1 | 1/2013 | Chevrette |
| 2013/0030606 A1 | 1/2013 | Mudalige |
| 2013/0038437 A1 | 2/2013 | Talati et al. |
| 2013/0044008 A1 | 2/2013 | Gafford et al. |
| 2013/0046562 A1 | 2/2013 | Taylor et al. |
| 2013/0066751 A1 | 3/2013 | Glazer et al. |
| 2013/0073115 A1 | 3/2013 | Levin et al. |
| 2013/0097128 A1 | 4/2013 | Suzuki et al. |
| 2013/0116855 A1 | 5/2013 | Nielsen et al. |
| 2013/0121239 A1 | 5/2013 | Hicks, III |
| 2013/0131907 A1 | 5/2013 | Green et al. |
| 2013/0144459 A1 | 6/2013 | Ricci |
| 2013/0151027 A1 | 6/2013 | Petrucci et al. |
| 2013/0151058 A1* | 6/2013 | Zagorski ............ B60W 30/0956 701/23 |
| 2013/0151202 A1 | 6/2013 | Denny et al. |
| 2013/0164715 A1 | 6/2013 | Hunt et al. |
| 2013/0179198 A1 | 7/2013 | Bowne et al. |
| 2013/0189649 A1 | 7/2013 | Mannino |
| 2013/0190966 A1 | 7/2013 | Collins et al. |
| 2013/0191189 A1 | 7/2013 | Aparicio et al. |
| 2013/0209968 A1 | 8/2013 | Miller et al. |
| 2013/0218603 A1 | 8/2013 | Hagelstein et al. |
| 2013/0218604 A1 | 8/2013 | Hagelstein et al. |
| 2013/0226391 A1 | 8/2013 | Nordbruch et al. |
| 2013/0227409 A1 | 8/2013 | Das et al. |
| 2013/0231824 A1 | 9/2013 | Wilson et al. |
| 2013/0237194 A1 | 9/2013 | Davis |
| 2013/0245857 A1 | 9/2013 | Gariepy et al. |
| 2013/0245881 A1 | 9/2013 | Scarbrough |
| 2013/0245883 A1 | 9/2013 | Humphrey |
| 2013/0257626 A1 | 10/2013 | Masli et al. |
| 2013/0267194 A1 | 10/2013 | Breed |
| 2013/0274940 A1 | 10/2013 | Wei et al. |
| 2013/0278442 A1 | 10/2013 | Rubin et al. |
| 2013/0289819 A1 | 10/2013 | Hassib et al. |
| 2013/0302758 A1 | 11/2013 | Wright |
| 2013/0304513 A1 | 11/2013 | Hyde et al. |
| 2013/0304514 A1 | 11/2013 | Hyde et al. |
| 2013/0307786 A1 | 11/2013 | Heubel |
| 2013/0317693 A1 | 11/2013 | Jefferies et al. |
| 2013/0317711 A1 | 11/2013 | Plante |
| 2013/0317786 A1 | 11/2013 | Kuhn |
| 2013/0317865 A1 | 11/2013 | Tofte et al. |
| 2013/0332402 A1 | 12/2013 | Rakshit |
| 2013/0339062 A1 | 12/2013 | Brewer et al. |
| 2014/0002651 A1 | 1/2014 | Plante |
| 2014/0004734 A1 | 1/2014 | Hoang |
| 2014/0006660 A1 | 1/2014 | Frei |
| 2014/0009307 A1 | 1/2014 | Bowers et al. |
| 2014/0012492 A1 | 1/2014 | Bowers et al. |
| 2014/0018940 A1 | 1/2014 | Casilli |
| 2014/0019170 A1 | 1/2014 | Coleman et al. |
| 2014/0039934 A1 | 2/2014 | Rivera |
| 2014/0047347 A1 | 2/2014 | Mohn et al. |
| 2014/0047371 A1 | 2/2014 | Palmer et al. |
| 2014/0052323 A1 | 2/2014 | Reichel et al. |
| 2014/0052336 A1 | 2/2014 | Moshchuk et al. |
| 2014/0052479 A1 | 2/2014 | Kawamura |
| 2014/0058761 A1 | 2/2014 | Freiberger et al. |
| 2014/0059066 A1 | 2/2014 | Koloskov |
| 2014/0070980 A1 | 3/2014 | Park |
| 2014/0074345 A1 | 3/2014 | Gabay et al. |
| 2014/0080100 A1 | 3/2014 | Phelan et al. |
| 2014/0095009 A1 | 4/2014 | Oshima et al. |
| 2014/0095214 A1 | 4/2014 | Mathe et al. |
| 2014/0099607 A1 | 4/2014 | Armitage et al. |
| 2014/0100892 A1 | 4/2014 | Collopy et al. |
| 2014/0104405 A1 | 4/2014 | Weidl et al. |
| 2014/0106782 A1 | 4/2014 | Chitre et al. |
| 2014/0108198 A1 | 4/2014 | Jariyasunant et al. |
| 2014/0114691 A1 | 4/2014 | Pearce |
| 2014/0125474 A1 | 5/2014 | Gunaratne |
| 2014/0129053 A1 | 5/2014 | Kleve et al. |

(56) References Cited

U.S. PATENT DOCUMENTS

| | | |
|---|---|---|
| 2014/0129301 A1 | 5/2014 | Van et al. |
| 2014/0130035 A1 | 5/2014 | Desai et al. |
| 2014/0135598 A1 | 5/2014 | Weidl et al. |
| 2014/0148988 A1 | 5/2014 | Lathrop et al. |
| 2014/0149148 A1 | 5/2014 | Luciani |
| 2014/0152422 A1 | 6/2014 | Breed |
| 2014/0156176 A1 | 6/2014 | Caskey et al. |
| 2014/0163768 A1 | 6/2014 | Purdy et al. |
| 2014/0167967 A1 | 6/2014 | He et al. |
| 2014/0168399 A1 | 6/2014 | Plummer et al. |
| 2014/0172467 A1 | 6/2014 | He et al. |
| 2014/0172727 A1 | 6/2014 | Abhyanker et al. |
| 2014/0188322 A1 | 7/2014 | Oh et al. |
| 2014/0191858 A1 | 7/2014 | Morgan et al. |
| 2014/0207325 A1 | 7/2014 | Mudalige et al. |
| 2014/0207707 A1 | 7/2014 | Na, II |
| 2014/0218187 A1 | 8/2014 | Chun et al. |
| 2014/0218520 A1 | 8/2014 | Teich et al. |
| 2014/0221781 A1 | 8/2014 | Schrauf et al. |
| 2014/0236638 A1 | 8/2014 | Pallesen et al. |
| 2014/0240132 A1 | 8/2014 | Bychkov |
| 2014/0250515 A1 | 9/2014 | Jakobsson |
| 2014/0253376 A1 | 9/2014 | Large et al. |
| 2014/0257866 A1 | 9/2014 | Gay et al. |
| 2014/0266655 A1 | 9/2014 | Palan |
| 2014/0272810 A1 | 9/2014 | Fields et al. |
| 2014/0272811 A1 | 9/2014 | Palan |
| 2014/0277916 A1 | 9/2014 | Mullen et al. |
| 2014/0278571 A1 | 9/2014 | Mullen |
| 2014/0278840 A1 | 9/2014 | Scofield et al. |
| 2014/0279707 A1 | 9/2014 | Joshua et al. |
| 2014/0301218 A1 | 10/2014 | Luo et al. |
| 2014/0306799 A1 | 10/2014 | Ricci |
| 2014/0306814 A1 | 10/2014 | Ricci |
| 2014/0309864 A1 | 10/2014 | Ricci |
| 2014/0309870 A1 | 10/2014 | Ricci |
| 2014/0310186 A1 | 10/2014 | Ricci |
| 2014/0337930 A1 | 11/2014 | Hoyos et al. |
| 2014/0343972 A1 | 11/2014 | Fernandes et al. |
| 2014/0350970 A1 | 11/2014 | Schumann et al. |
| 2014/0358324 A1 | 12/2014 | Sagar et al. |
| 2014/0358592 A1 | 12/2014 | Wedig et al. |
| 2014/0380264 A1 | 12/2014 | Misra |
| 2015/0006278 A1 | 1/2015 | Di et al. |
| 2015/0019266 A1 | 1/2015 | Stempora |
| 2015/0024705 A1 | 1/2015 | Rashidi |
| 2015/0025917 A1 | 1/2015 | Stempora |
| 2015/0032581 A1 | 1/2015 | Blackhurst et al. |
| 2015/0035685 A1 | 2/2015 | Strickland et al. |
| 2015/0039350 A1 | 2/2015 | Martin et al. |
| 2015/0039397 A1 | 2/2015 | Fuchs |
| 2015/0045983 A1 | 2/2015 | Fraser et al. |
| 2015/0046022 A1 | 2/2015 | Bai et al. |
| 2015/0051752 A1 | 2/2015 | Paszkowicz |
| 2015/0051787 A1 | 2/2015 | Doughty et al. |
| 2015/0066284 A1 | 3/2015 | Yopp |
| 2015/0070265 A1 | 3/2015 | Cruz-Hernandez et al. |
| 2015/0073645 A1 | 3/2015 | Davidsson et al. |
| 2015/0073834 A1 | 3/2015 | Gurenko et al. |
| 2015/0081202 A1 | 3/2015 | Levin |
| 2015/0088334 A1 | 3/2015 | Bowers et al. |
| 2015/0088358 A1 | 3/2015 | Yopp |
| 2015/0088360 A1 | 3/2015 | Bonnet et al. |
| 2015/0088373 A1 | 3/2015 | Wilkins |
| 2015/0088550 A1 | 3/2015 | Bowers et al. |
| 2015/0100189 A1 | 4/2015 | Tellis et al. |
| 2015/0100190 A1 | 4/2015 | Yopp |
| 2015/0100191 A1 | 4/2015 | Yopp |
| 2015/0109450 A1 | 4/2015 | Walker |
| 2015/0112504 A1 | 4/2015 | Binion et al. |
| 2015/0112543 A1 | 4/2015 | Binion et al. |
| 2015/0112545 A1 | 4/2015 | Binion et al. |
| 2015/0112730 A1 | 4/2015 | Binion et al. |
| 2015/0112731 A1 | 4/2015 | Binion et al. |
| 2015/0112800 A1 | 4/2015 | Binion et al. |
| 2015/0113521 A1 | 4/2015 | Suzuki et al. |
| 2015/0120331 A1 | 4/2015 | Russo et al. |
| 2015/0127570 A1 | 5/2015 | Doughty et al. |
| 2015/0128123 A1 | 5/2015 | Eling |
| 2015/0142262 A1 | 5/2015 | Lee |
| 2015/0149018 A1 | 5/2015 | Attard et al. |
| 2015/0149265 A1 | 5/2015 | Huntzicker et al. |
| 2015/0153733 A1 | 6/2015 | Ohmura |
| 2015/0158469 A1 | 6/2015 | Cheatham, III et al. |
| 2015/0158495 A1 | 6/2015 | Duncan et al. |
| 2015/0160653 A1 | 6/2015 | Cheatham, III et al. |
| 2015/0161564 A1 | 6/2015 | Sweeney et al. |
| 2015/0161738 A1 | 6/2015 | Stempora |
| 2015/0161893 A1 | 6/2015 | Duncan et al. |
| 2015/0161894 A1 | 6/2015 | Duncan et al. |
| 2015/0166069 A1 | 6/2015 | Engelman et al. |
| 2015/0169311 A1 | 6/2015 | Dickerson et al. |
| 2015/0170287 A1 | 6/2015 | Tirone |
| 2015/0170290 A1 | 6/2015 | Bowne et al. |
| 2015/0170522 A1 | 6/2015 | Noh |
| 2015/0178997 A1 | 6/2015 | Ohsaki |
| 2015/0178998 A1 | 6/2015 | Attard |
| 2015/0179062 A1 | 6/2015 | Ralston et al. |
| 2015/0185034 A1 | 7/2015 | Abhyanker |
| 2015/0187013 A1 | 7/2015 | Adams et al. |
| 2015/0187015 A1 | 7/2015 | Adams et al. |
| 2015/0187016 A1 | 7/2015 | Adams et al. |
| 2015/0187019 A1 | 7/2015 | Fernandes et al. |
| 2015/0187194 A1 | 7/2015 | Hypolite et al. |
| 2015/0189241 A1 | 7/2015 | Kim et al. |
| 2015/0193219 A1 | 7/2015 | Pandya et al. |
| 2015/0193220 A1 | 7/2015 | Rork et al. |
| 2015/0203107 A1 | 7/2015 | Lippman |
| 2015/0203113 A1 | 7/2015 | Duncan et al. |
| 2015/0229885 A1 | 8/2015 | Offenhaeuser |
| 2015/0235323 A1 | 8/2015 | Oldham |
| 2015/0235480 A1 | 8/2015 | Cudak et al. |
| 2015/0235557 A1 | 8/2015 | Engelman et al. |
| 2015/0239436 A1 | 8/2015 | Kanai et al. |
| 2015/0241241 A1 | 8/2015 | Cudak et al. |
| 2015/0241853 A1 | 8/2015 | Vechart et al. |
| 2015/0242953 A1 | 8/2015 | Suiter |
| 2015/0246672 A1 | 9/2015 | Pilutti |
| 2015/0254955 A1 | 9/2015 | Fields et al. |
| 2015/0266489 A1 | 9/2015 | Solyom et al. |
| 2015/0266490 A1 | 9/2015 | Coelingh |
| 2015/0271201 A1 | 9/2015 | Ruvio et al. |
| 2015/0274072 A1 | 10/2015 | Croteau et al. |
| 2015/0293534 A1 | 10/2015 | Takamatsu |
| 2015/0294422 A1 | 10/2015 | Carver |
| 2015/0307110 A1 | 10/2015 | Grewe et al. |
| 2015/0310742 A1 | 10/2015 | Albornoz |
| 2015/0310758 A1 | 10/2015 | Daddona et al. |
| 2015/0332407 A1 | 11/2015 | Wilson et al. |
| 2015/0334545 A1 | 11/2015 | Maier et al. |
| 2015/0336502 A1 | 11/2015 | Hillis et al. |
| 2015/0338852 A1 | 11/2015 | Ramanujam |
| 2015/0339928 A1 | 11/2015 | Ramanujam |
| 2015/0343947 A1 | 12/2015 | Bernico et al. |
| 2015/0346718 A1 | 12/2015 | Stenneth |
| 2015/0346727 A1 | 12/2015 | Ramanujam |
| 2015/0348335 A1 | 12/2015 | Ramanujam |
| 2015/0348337 A1 | 12/2015 | Choi |
| 2015/0356797 A1 | 12/2015 | McBride et al. |
| 2015/0382085 A1 | 12/2015 | Lawrie-Fussey et al. |
| 2016/0005130 A1 | 1/2016 | Devereaux et al. |
| 2016/0014252 A1 | 1/2016 | Biderman et al. |
| 2016/0019790 A1 | 1/2016 | Tobolski et al. |
| 2016/0025027 A1 | 1/2016 | Mentele |
| 2016/0027276 A1 | 1/2016 | Freeck et al. |
| 2016/0036899 A1 | 2/2016 | Moody et al. |
| 2016/0042463 A1 | 2/2016 | Gillespie |
| 2016/0042644 A1 | 2/2016 | Velusamy |
| 2016/0042650 A1 | 2/2016 | Stenneth |
| 2016/0055750 A1 | 2/2016 | Linder et al. |
| 2016/0068103 A1 | 3/2016 | McNew et al. |
| 2016/0069694 A1 | 3/2016 | Tao et al. |
| 2016/0071418 A1 | 3/2016 | Oshida |
| 2016/0078403 A1 | 3/2016 | Sethi et al. |

(56) References Cited

U.S. PATENT DOCUMENTS

| | | |
|---|---|---|
| 2016/0083285 A1 | 3/2016 | De et al. |
| 2016/0086285 A1 | 3/2016 | Peters et al. |
| 2016/0086393 A1 | 3/2016 | Collins et al. |
| 2016/0092962 A1 | 3/2016 | Wasserman et al. |
| 2016/0093212 A1 | 3/2016 | Barfield, Jr. et al. |
| 2016/0098561 A1 | 4/2016 | Keller et al. |
| 2016/0104250 A1 | 4/2016 | Allen |
| 2016/0105365 A1 | 4/2016 | Droste et al. |
| 2016/0112445 A1 | 4/2016 | Abramowitz |
| 2016/0116293 A1 | 4/2016 | Grover et al. |
| 2016/0116913 A1 | 4/2016 | Niles |
| 2016/0117871 A1 | 4/2016 | McClellan et al. |
| 2016/0117928 A1 | 4/2016 | Hodges et al. |
| 2016/0125735 A1 | 5/2016 | Tuukkanen |
| 2016/0129917 A1 | 5/2016 | Gariepy |
| 2016/0140783 A1 | 5/2016 | Catt et al. |
| 2016/0140784 A1 | 5/2016 | Akanuma et al. |
| 2016/0147226 A1 | 5/2016 | Akselrod et al. |
| 2016/0153806 A1 | 6/2016 | Ciasulli et al. |
| 2016/0163217 A1 | 6/2016 | Harkness |
| 2016/0167652 A1 | 6/2016 | Slusar |
| 2016/0171521 A1 | 6/2016 | Ramirez et al. |
| 2016/0180610 A1 | 6/2016 | Ganguli et al. |
| 2016/0187127 A1 | 6/2016 | Purohit et al. |
| 2016/0187368 A1 | 6/2016 | Modi |
| 2016/0189303 A1 | 6/2016 | Fuchs |
| 2016/0189544 A1 | 6/2016 | Ricci |
| 2016/0203560 A1 | 7/2016 | Parameshwaran |
| 2016/0221575 A1 | 8/2016 | Posch et al. |
| 2016/0231746 A1 | 8/2016 | Hazelton et al. |
| 2016/0248598 A1 | 8/2016 | Lin |
| 2016/0255154 A1 | 9/2016 | Kim |
| 2016/0264132 A1 | 9/2016 | Paul et al. |
| 2016/0272219 A1 | 9/2016 | Ketfi-Cherif et al. |
| 2016/0275790 A1 | 9/2016 | Kang et al. |
| 2016/0277911 A1 | 9/2016 | Kang et al. |
| 2016/0282874 A1 | 9/2016 | Kurata et al. |
| 2016/0285907 A1 | 9/2016 | Nguyen et al. |
| 2016/0288833 A1 | 10/2016 | Heimberger et al. |
| 2016/0291153 A1 | 10/2016 | Mossau et al. |
| 2016/0292679 A1 | 10/2016 | Kolin |
| 2016/0301698 A1 | 10/2016 | Katara et al. |
| 2016/0303969 A1 | 10/2016 | Akula |
| 2016/0304027 A1 | 10/2016 | Di et al. |
| 2016/0304038 A1 | 10/2016 | Chen et al. |
| 2016/0304091 A1 | 10/2016 | Remes |
| 2016/0313132 A1 | 10/2016 | Larroy |
| 2016/0314224 A1 | 10/2016 | Wei et al. |
| 2016/0321674 A1 | 11/2016 | Lux |
| 2016/0323233 A1 | 11/2016 | Song et al. |
| 2016/0327949 A1 | 11/2016 | Wilson et al. |
| 2016/0343249 A1 | 11/2016 | Gao et al. |
| 2016/0347329 A1 | 12/2016 | Zelman et al. |
| 2016/0358497 A1 | 12/2016 | Nguyen et al. |
| 2016/0370194 A1 | 12/2016 | Colijn et al. |
| 2017/0004710 A1 | 1/2017 | Dozono et al. |
| 2017/0008487 A1 | 1/2017 | Ur et al. |
| 2017/0015263 A1 | 1/2017 | Makled et al. |
| 2017/0017734 A1 | 1/2017 | Groh et al. |
| 2017/0023945 A1 | 1/2017 | Cavalcanti et al. |
| 2017/0024938 A1 | 1/2017 | Lindsay |
| 2017/0036678 A1 | 2/2017 | Takamatsu |
| 2017/0038773 A1 | 2/2017 | Gordon et al. |
| 2017/0043780 A1 | 2/2017 | Yoon |
| 2017/0061712 A1 | 3/2017 | Li et al. |
| 2017/0066452 A1 | 3/2017 | Scofield |
| 2017/0067764 A1 | 3/2017 | Skupin |
| 2017/0072967 A1 | 3/2017 | Fendt |
| 2017/0076606 A1 | 3/2017 | Gupta et al. |
| 2017/0080900 A1 | 3/2017 | Huennekens et al. |
| 2017/0084175 A1 | 3/2017 | Sedlik et al. |
| 2017/0086028 A1 | 3/2017 | Hwang et al. |
| 2017/0106876 A1 | 4/2017 | Gordon |
| 2017/0108870 A1* | 4/2017 | Miller .................. G05D 1/0223 |
| 2017/0116794 A1 | 4/2017 | Gortsas |
| 2017/0120761 A1 | 5/2017 | Kapadia et al. |
| 2017/0123421 A1 | 5/2017 | Kentley et al. |
| 2017/0123428 A1 | 5/2017 | Levinson et al. |
| 2017/0136902 A1 | 5/2017 | Ricci |
| 2017/0139412 A1 | 5/2017 | Keohane et al. |
| 2017/0147722 A1 | 5/2017 | Greenwood |
| 2017/0148102 A1 | 5/2017 | Franke et al. |
| 2017/0148324 A1 | 5/2017 | High et al. |
| 2017/0154479 A1 | 6/2017 | Kim |
| 2017/0168493 A1 | 6/2017 | Miller et al. |
| 2017/0169627 A1 | 6/2017 | Kim et al. |
| 2017/0176641 A1 | 6/2017 | Zhu et al. |
| 2017/0192428 A1 | 7/2017 | Vogt et al. |
| 2017/0200367 A1 | 7/2017 | Mielenz |
| 2017/0212511 A1 | 7/2017 | Paiva et al. |
| 2017/0234689 A1 | 8/2017 | Gibson et al. |
| 2017/0236210 A1 | 8/2017 | Kumar et al. |
| 2017/0249839 A1 | 8/2017 | Becker et al. |
| 2017/0249844 A1* | 8/2017 | Perkins .................. B60W 40/00 |
| 2017/0270617 A1 | 9/2017 | Fernandes et al. |
| 2017/0274897 A1 | 9/2017 | Rink et al. |
| 2017/0278312 A1 | 9/2017 | Minster et al. |
| 2017/0308082 A1 | 10/2017 | Ullrich |
| 2017/0309092 A1* | 10/2017 | Rosenbaum ........ G01M 17/007 |
| 2017/0330399 A1 | 11/2017 | Nordbruch et al. |
| 2017/0330448 A1 | 11/2017 | Moore et al. |
| 2018/0004223 A1 | 1/2018 | Baldwin |
| 2018/0013831 A1 | 1/2018 | Dey et al. |
| 2018/0029489 A1 | 2/2018 | Nordbruch |
| 2018/0029607 A1* | 2/2018 | Khalifeh ............... B60W 10/04 |
| 2018/0039274 A1 | 2/2018 | Saibel |
| 2018/0046198 A1 | 2/2018 | Nordbruch et al. |
| 2018/0053411 A1 | 2/2018 | Wieskamp et al. |
| 2018/0075538 A1 | 3/2018 | Konrardy et al. |
| 2018/0080995 A1 | 3/2018 | Heinen |
| 2018/0091981 A1 | 3/2018 | Sharma et al. |
| 2018/0099678 A1 | 4/2018 | Absmeier et al. |
| 2018/0194343 A1 | 7/2018 | Lorenz |
| 2018/0224844 A1 | 8/2018 | Zhang et al. |
| 2018/0231979 A1 | 8/2018 | Miller |
| 2018/0284807 A1 | 10/2018 | Wood et al. |
| 2018/0307250 A1 | 10/2018 | Harvey |
| 2018/0326991 A1 | 11/2018 | Wendt et al. |
| 2018/0345811 A1 | 12/2018 | Michels et al. |
| 2019/0005464 A1 | 1/2019 | Harris et al. |
| 2019/0005745 A1 | 1/2019 | Patil et al. |
| 2019/0051173 A1 | 2/2019 | Kang |
| 2019/0146491 A1 | 5/2019 | Hu et al. |
| 2019/0146496 A1 | 5/2019 | Woodrow et al. |

FOREIGN PATENT DOCUMENTS

| | | |
|---|---|---|
| EP | 700009 A2 | 3/1996 |
| EP | 3239686 A1 | 11/2017 |
| GB | 2268608 A | 1/1994 |
| GB | 2488956 A | 9/2012 |
| GB | 2494727 A | 3/2013 |
| JP | 2002-259708 A | 9/2002 |
| KR | 10-1515496 B1 | 5/2015 |
| WO | WO-2005/083605 A1 | 9/2005 |
| WO | WO-2010/034909 A1 | 4/2010 |
| WO | 2010/062899 A1 | 6/2010 |
| WO | 2014/092769 A1 | 6/2014 |
| WO | 2014139821 A1 | 9/2014 |
| WO | WO-2014/139821 A1 | 9/2014 |
| WO | WO-2014/148976 A1 | 9/2014 |
| WO | 2016/067610 A1 | 5/2016 |
| WO | WO-2016/156236 A1 | 10/2016 |
| WO | 2017142931 A1 | 8/2017 |

OTHER PUBLICATIONS

Quora, "What is baseline testing?" Oct. 24, 2015, 4 pages, Accessed at https://www.quora.com/What-is-baseline-testing (Year: 2015).

Synnott et al. "Simulation of Smart Home Activity Datasets". Sensors 2015, 15, 14162-14179; doi:10.3390/s150614162. 18 Pages.

Vanus et al. "Development and testing of a visualization application

(56) References Cited

OTHER PUBLICATIONS software, implemented with wireless control system in smart home care". Human-centric Computing and Information Sciences 4, Article No. 18 (Dec. 2014) |26 Pages.
"The Influence of Telematics on Customer Experience: Case Study of Progressive's Snapshot Program", J.D. Power nsightsk, McGaw Hill Financial (2013).
Al-Shihabi, Talal et al., "A Framework for Modeling Human-like Driving Behaviors for Autonomous Vehicles in Driving Simulators", Copyright 2001, Northeastern University, 6 pages.
Birch, Stuart, "Mercedes-Ben' world class driving simulator complex enhances moose safety", Nov. 13, 2010, SAE International, Automobile Engineering (Year: 2010).
Davies, Alex, "Here's How Mercedes-Benz Tested Its New Self-Driving Car", Nov. 20, 2012, Business Insider, 4 pages (Year: 2012).
Dittrich et al. "Multi-Sensor Navigation System for an Autonomous Helicopter" IEEE, 9 pages (Year: 2002).
Duffy et al., Sit, Stay, Drive: The Future of Autonomous Car Liability, SMU Science & Technology Law Review, vol. 16, DD. 101-23 (Winter 2013).
Fanke et al., "Autonomous Driving Goes Downtown", IEEE Intelligent Systems. 13, 1998, pp. 40-48.
Filev et al., Future Mobility: Integrating Vehicle Control with Cloud Computing, Mechanical Engineering, 135.3:S18-S24 American Society of Mechanical Engineers (Mar. 2013).
Funkhouse, Kevin, "Paving the Road Ahead: Autonomous Vehicles, Products Liability, and the Need for a New Approach", Copyright 2013, Issue 1, 2013 Utah L. Rev. 437 2013, 33 pages.
Garza, Andrew P., "Look Ma, No Hands: Wrinkles and Wrecks in the Age of Autonomous Vehicles", 46 New Eng. L. Rev. 581, 616 (2012).
Gerdes et al., Implementable ethics for autonomous vehicles, Chapter 5, In: Maurer et al. (eds.), Autonomes Fahren, Soringer Vieweg, Berlin (2015).
Gietelink et al. "Development of advanced driver assistance systems with vehicle hardware-in-the-loop simulations", Vehicle System Dynamics, vol. 44, No. 7, pp. 569-590, Jul. 2006. (Year: 2006).
Gleeson, "How much is a monitored alarm insurance deduction?", Demand Media (Oct. 30, 2014).
Gray et al., A unified approach to threat assessment and control for automotive active safety, IEEE, 14(3):1490-9 (Sep. 2013).
Gumey, Jeffrey K., "Sue My Car Not Me: Products Liability and Accidents Involving Autonomous Vehicles", Nov. 15, 2013, 2013 U. III. J.L. Tech. & Pol'y 247, 31 pages.
Lattner et al., Knowledge-based risk assessment for intelligent vehicles, pp. 191-196, IEEE KIMAS, Apr. 18-21, 2005, Waltham, Massachusetts (Apr. 2005).
Lewis, The History of Driverless Cars, downloaded from the Internet at: <www.thefacesite.com/2017/06/driverless-cars-history. html> (Jun. 2017).
Marchant et al., The coming collision between autonomous vehicles and the liability system, Santa Clara Law Review, 52(4): Article 6 (2012).
Martin et al. "Certification for Autonomous Vehicles", 34 pages. (Year: 2015).
Mercedes-Benz, "Press Information", Nov. 2012 , Mercedes-Benz Driving Simulator (Year; 2012).
Peterson, Robert W., "New Technology—Old Law: Autonomous Vehicles and California's Insurance Framework", Dec. 18, 2012, Santa Clara Law Review, vol. 52, No. 4, Article 7, 60 pages.
Pohanka et al., Sensors simulation environment for sensor data fusion, 14th International Conference on Information Fusion, Chicaao, IL, pp. 1-8 (2011).
Private Ownership Costs, RACO, Wayback Machine, http://www.racq.com.au:80/-/media/pdf/racqpdfs/cardsanddriving/cars/0714_vehicle_running_costs.ashx/ (Oct. 6, 2014).
Saberi et al. "An Approach for Functional Safety Improvement of an Existing Automotive System" IEEE, 6 pages. (Year: 2015).

Sepulcre et al., "Cooperative Vehicle-to-Vehicle Active Safety Testing Under Challenging Conditions", Transportation Research Part C 26 (2013), Jan. 2013, pp. 233-255.
Tiberkak et al., An architecture for policy-based home automation system (PBHAS), 2010 IEEE Green Technologies Conference (Apr. 15-16, 2010).
Vasudevan et al., Safe semi-autonomous control with enhanced driver modeling, 2012 American Control Conference, Fairmont Queen Elizabeth, Montreal, Canada (Jun. 27-29, 2012).
Villasenor, Products liability and driverless cars: Issues and guiding principles for legislation, Brookinas Center for Technoloav Innovation, 25 paaes (Apr. 2014).
Wang et al., Shader-based sensor simulation for autonomous car testing, 15th International IEEE Conference on Intelligent Transportation Systems, Anchorage, Alaska, pp. 224-229 (2012).
Wardzinski, Dynamic risk assessment in autonomous vehicles motion planning, Proceedings of the 2008 1st International Conference on Information Technology, IT 2008, Gdansk, Poland (May 19-21, 2008).
EP-3239686-A1 EPO english publication NPL.
"Driverless Cars . . . The Future is Already Here", AutoInsurance Center, downloaded from the Internet at: <http://www.autoinsurancecenter.com/driverless-cars...the-future-is-already-here.htm> (2010; downloaded on Mar. 27, 2014).
"Integrated Vehicle-Based Safety Systems (IVBSS)", Research and Innovative Technology Administration (RITA), http://www.its.dot.gov/ivbss/, retrieved from the internet on Nov. 4, 2013, 3 pages.
"Linking Driving Behavior to Automobile Accidents and Insurance Rates: An Alaysis of Five Billion Miles Driven", Progressive Insurance brochure (Jul. 2012).
"Self-Driving Cars: The Next Revolution", KPMG, Center for Automotive Research (2012).
The Influence of Telematics on Customer Experience: Case Study of Progressive's Snapshot Program, J.D. Power Insights, McGraw Hill Financial (2013).
Alberi et al., A proposed standardized testing procedure for autonomous ground vehicles, Virginia Polytechnic Institute and State University, 63 pages (Apr. 29, 2008).
Broggi et al., Extensive Tests of Autonomous Driving Technologies, IEEE Trans on Intelligent Transportation Systems, 14(3):1403-15 (May 30, 2013).
Campbell et al., Autonomous Driving in Urban Environments: Approaches, Lessons, and Challenges, Phil. Trans. R. Soc. A, 368:4649-72 (2010).
Carroll et al. "Where Innovation is Sorely Needed", http://www.technologyreview.com/news/422568/where-innovation-is-sorely-needed/?nlid, retrieved from the internet on Nov. 4, 2013, 3 pages.
Davies, Avoiding Squirrels and Other Things Google's Robot Car Can't Do, downloaded from the Internet at: <http://www.wired.com/2014/05/google-self-driving-car-can-cant/ (downloaded on May 28, 2014).
Figueiredo et al., An Approach to Simulate Autonomous Vehicles in Urban Traffic Scenarios, University of Porto, 7 pages (Nov. 2009).
Gechter et al., Towards a Hybrid Real/Virtual Simulation of Autonomous Vehicles for Critical Scenarios, International Academy Research and Industry Association (IARIA), 4 pages (2014).
Hancock et al., "The Impact of Emotions and Predominant Emotion Regulation Technique on Driving Performance," pp. 5882-5885 (2012).
Hars, Autonomous Cars: The Next Revolution Looms, Inventivio GmbH, 4 pages (Jan. 2010).
Lee et al., Autonomous Vehicle Simulation Project, Int. J. Software Eng. and its Applications, 7(5):393-402 (2013).
Levendusky, Advancements in automotive technology and their effect on personal auto insurance, downloaded from the Internet at: <http://www.verisk.com/visualize/advancements-in-automotive-technology-and-their-effect> (2013).
McCraty et al., "The Effects of Different Types of Music on Mood, Tension, and Mental Clarity." Alternative Therapies in Health and Medicine 4.1 (1998): 75-84. NCBI PubMed. Web. Jul. 11, 2013.
Miller, A simulation and regression testing framework for autonomous workers, Case Western Reserve University, 12 pages (Aug. 2007).

(56) References Cited

OTHER PUBLICATIONS

Mui, Will auto insurers survive their collision with driverless cars? (Part 6), downloaded from the Internet at: <http://www.forbes.com/sites/chunkamui/2013/03/28/will-auto-insurers-survive-their-collision> (Mar. 28, 2013).
Pereira, An Integrated Architecture for Autonomous Vehicle Simulation, University of Porto., 114 pages (Jun. 2011).
Quianlan et al., Bringing Simulation to Life: A Mixed Reality Autonomous Intersection, Proc. IROS 2010—IEEE/RSJ International Conference on Intelligent Robots and Systems, Taipei Taiwan, 6 pages (Oct. 2010).
Read, Autonomous cars & the death of auto insurance, downloaded from the Internet at: <http://www.thecarconnection.com/news/1083266_autonomous-cars-the-death-of-auto-insurance> (Apr. 1, 2013).
Reddy, The New Auto Insurance Ecosystem: Telematics, Mobility and the Connected Car, Cognizant (Aug. 2012).
Reifel et al., "Telematics: The Game Changer—Reinventing Auto Insurance", A.T. Kearney (2010).
Roberts, "What is Telematics Insurance?", MoneySupermarket (Jun. 20, 2012).
Ryan, Can having safety features reduce your insurance premiums? (Dec. 15, 2010).
Search Report in EP Application No. 13167206.5 dated Aug. 13, 2013, 6 pages.
Sharma, Driving the future: the legal implications of autonomous vehicles conference recap, downloaded from the Internet at: <http://law.scu.edu/hightech/autonomousvehicleconfrecap2012> (2012).
Stavens, Learning to Drive: Perception for Autonomous Cars, Stanford University, 104 pages (May 2011).
Stienstra, Autonomous Vehicles & the Insurance Industry, 2013 CAS Annual Meeting—Minneapolis, MN (2013).
U.S. Appl. No. 14/215,789, filed Mar. 17, 2014, Baker et al., "Split Sensing Method".
U.S. Appl. No. 14/339,652, filed Jul. 24, 2014, Freeck et al., "System and Methods for Monitoring a Vehicle Operator and Monitoring an Operating Environment Within the Vehicle".
U.S. Appl. No. 14/511,712, filed Oct. 10, 2014, Fields et al., "Real-Time Driver Observation and Scoring for Driver's Education".
U.S. Appl. No. 14/511,750, filed Oct. 10, 2014, Fields et al., "Real-Time Driver Observation and Scoring for Driver's Education".
U.S. Appl. No. 14/528,424, filed Oct. 30, 2014, Christensen et al., "Systems and Methods for Processing Trip-Based Insurance Policies".
U.S. Appl. No. 14/528,642, filed Oct. 30, 2014, Christensen et al., "Systems and Methods for Managing Units Associated with Time-Based Insurance Policies".
U.S. Appl. No. 14/713,184, filed May 15, 2015, Konrardy et al., "Autonomous Vehicle Insurance Pricing".
U.S. Appl. No. 14/713,188, filed May 15, 2015, Konrardy et al., "Autonomous Feature Use Monitoring and Insurance Pricing".
U.S. Appl. No. 14/713,194, filed May 15, 2015, Konrardy et al., "Autonomous Communication Feature Use and Insurance Pricing".
U.S. Appl. No. 14/713,201, filed May 15, 2015, Konrardy et al., "Autonomous Vehicle Insurance Pricing and Offering Based Upon Accident Risk Factors".
U.S. Appl. No. 14/713,206, filed May 15, 2015, Konrardy et al., "Determining Autonomous Vehicle Technology Performance for Insurance Pricing and Offering".
U.S. Appl. No. 14/713,214, filed May 15, 2015, Konrardy et al., "Accident Risk Model Determination Using Autonomous Vehicle Operating Data".
U.S. Appl. No. 14/713,217, filed May 15, 2015, Konrardy et al., "Autonomous Vehicle Operation Feature Usage Recommendations".
U.S. Appl. No. 14/713,223, filed May 15, 2015, Konrardy et al., "Driver Feedback Alerts Based Upon Monitoring Use of Autonomous Vehicle Operation Features".
U.S. Appl. No. 14/713,226, filed May 15, 2015, Konrardy et al., "Accident Response Using Autonomous Vehicle Monitoring".
U.S. Appl. No. 14/713,230, filed May 15, 2015, Konrardy et al., "Accident Fault Determination for Autonomous Vehicles".
U.S. Appl. No. 14/713,237, filed May 15, 2015, Konrardy et al., "Autonomous Vehicle Technology Effectiveness Determination for Insurance Pricing".
U.S. Appl. No. 14/713,240, filed May 15, 2015, Konrardy et al., "Fault Determination with Autonomous Feature Use Monitoring".
U.S. Appl. No. 14/713,244, filed May 15, 2015, Konrardy et al., "Autonomous Vehicle Operation Feature Evaluation".
U.S. Appl. No. 14/713,249, filed May 15, 2015, Konrardy et al., "Autonomous Vehicle Operation Feature Monitoring and Evaluation of Effectiveness".
U.S. Appl. No. 14/713,254, filed May 15, 2015, Konrardy et al., "Accident Fault Determination for Autonomous Vehicles".
U.S. Appl. No. 14/713,261, filed May 15, 2015, Konrardy et al., "Accident Fault Determination for Autonomous Vehicles".
U.S. Appl. No. 14/713,266, filed May 15, 2015, Konrardy et al., "Autonomous Vehicle Operation Feature Monitoring and Evaluation of Effectiveness".
U.S. Appl. No. 14/713,271, flied May 15, 2015, Konrardy et al. "Fully Autonomous Vehicle Insurance Pricing".
U.S. Appl. No. 14/729,290, filed Jun. 3, 2015, Fields et al., "Advanced Vehicle Operator Intelligence System".
U.S. Appl. No. 14/857,242, filed Sep. 17, 2015, Fields et al., "Advanced Vehicle Operator Intelligence System".
U.S. Appl. No. 14/934,326, filed Nov. 6, 2015, Fields et al., "Autonomous Vehicle Operating Status Assessment".
U.S. Appl. No. 14/934,333, filed Nov. 6, 2015, Fields et al., "Autonomous Vehicle Control Assessment and Selection".
U.S. Appl. No. 14/934,339, filed Nov. 6, 2015, Fields et al., "Autonomous Vehicle Operator Identification".
U.S. Appl. No. 14/934,343, flied Nov. 6, 2015, Fields et al., "Autonomous Vehicle Operating Style and Mode Monitoring".
U.S. Appl. No. 14/934,345, filed Nov. 6, 2015, Fields et al., "Autonomous Vehicle Feature Recommendations".
U.S. Appl. No. 14/934,347, filed Nov. 6, 2015, Fields et al., "Autonomous Vehicle Software Version Assessment".
U.S. Appl. No. 14/934,352, filed Nov. 6, 2015, Fields et al., "Autonomous Vehicle Automatic Parking".
U.S. Appl. No. 14/934,355, filed Nov. 6, 2015, Fields et al., "Autonomous Vehicle Insurance Based Upon Usage".
U.S. Appl. No. 14/934,357, filed Nov. 6, 2015, Fields et al., "Autonomous Vehicle Salvage and Repair".
U.S. Appl. No. 14/934,361, filed Nov. 6, 2015, Fields et al., "Autonomous Vehicle Infrastructure Communication Device".
U.S. Appl. No. 14/934,371, filed Nov. 6, 2015, Fields et al., "Autonomous Vehicle Accident and Emergency Response".
U.S. Appl. No. 14/934,381, filed Nov. 6, 2015, Fields et al., "Personal Insurance Policies".
U.S. Appl. No. 14/934,385, filed Nov. 6, 2015, Fields et al., "Autonomous Vehicle Operating Status Assessment".
U.S. Appl. No. 14/934,388, filed Nov. 6, 2015, Fields et al., "Autonomous Vehicle Control Assessment and Selection".
U.S. Appl. No. 14/934,393, filed Nov. 6, 2015, Fields et al., "Autonomous Vehicle Control Assessment and Selection".
U.S. Appl. No. 14/934,400, filed Nov. 6, 2015, Fields et al., "Autonomous Vehicle Control Assessment and Selection".
U.S. Appl. No. 14/934,405, filed Nov. 6, 2015, Fields et al., "Autonomous Vehicle Automatic Parking".
U.S. Appl. No. 14/951,774, filed Nov. 25, 2015, Konrardy et al., "Fully Autonomous Vehicle Insurance Pricing".
U.S. Appl. No. 14/951,798, filed Nov. 25, 2015, Konrardy et al., "Accident Fault Determination for Autonomous Vehicles".
U.S. Appl. No. 14/951,803, filed Nov. 25, 2015, Konrardy et al., "Accident Fault Determination for Autonomous Vehicles".
U.S. Appl. No. 14/978,266, filed Dec. 22, 2015, Konrardy et al., "Autonomous Feature Use Monitoring and Telematics".
U.S. Appl. No. 15/241,769, filed Aug. 19, 2016, Fields et al., "Vehicular Traffic Alerts for Avoidance of Abnormal Traffic Conditions".

(56) References Cited

OTHER PUBLICATIONS

U.S. Appl. No. 15/241,812, filed Aug. 19, 2016, Fields et al., "Using Personal Telematics Data for Rental or Insurance Discounts".
U.S. Appl. No. 15/241,817, filed Aug. 19, 2016, Fields et al., "Vehicular Accident Risk Monitoring and Assessment".
U.S. Appl. No. 15/241,826, filed Aug. 19, 2016, Fields et al., "Shared Vehicle Usage, Monitoring and Feedback".
U.S. Appl. No. 15/241,832, filed Aug. 19, 2016, Fields et al., "Vehicular Driver Evaluation".
U.S. Appl. No. 15/241,842, filed Aug. 19, 2016, Fields et al., "Vehicular Driver Warnings".
U.S. Appl. No. 15/241,849, filed Aug. 19, 2016, Fields et al., "Vehicular Warnings Based Upon Pedestrian or Cyclist Presence".
U.S. Appl. No. 15/241,859, filed Aug. 19, 2016, Fields et al., "Determination of Drvier or Vehicle Discounts and Risk Profiles Based Upon Vehicular Travel Environment".
U.S. Appl. No. 15/241,916, filed Aug. 19, 2016, Fields et al., "Determination and Reconstruction of Vehicular Cause and Collision".
U.S. Appl. No. 15/241,922, filed Aug. 19, 2016, Fields et al., "Electric Vehicle Battery Conservation".
U.S. Appl. No. 15/241,932, filed Aug. 19, 2016, Fields et al., "Vehiclular Driver Profiles and Discounts".
U.S. Appl. No. 15/409,092, filed Jan. 18, 2017, Konrardy et al., "Autonomous Vehicle Action Communications".
U.S. Appl. No. 15/409,099, filed Jan. 18, 2017, Konrardy et al., "Autonomous Vehicle Path Coordination".
U.S. Appl. No. 15/409,107, filed Jan. 18, 2017, Konrardy et al., "Autonomous Vehicle Signal Control".
U.S. Appl. No. 15/409,115, filed Jan. 18, 2017, Konrardy et al., "Autonomous Vehicle Application".
U.S. Appl. No. 15/409,136, filed Jan. 18, 2017, Konrardy et al., "Method and System for Enhancing the Functionality of a Vehicle".
U.S. Appl. No. 15/409,143, filed Jan. 18, 2017, Konrardy et al., "Autonomous Operation Suitability Assessment and Mapping".
U.S. Appl. No. 15/409,148, filed Jan. 18, 2017, Konrardy et al., "System and Method for Autonomous Vehicle Sharing Using Facial Recognition".
U.S. Appl. No. 15/409,149, filed Jan. 18, 2017, Konrardy et al., "Autonomous Vehicle Routing During Emergencies".
U.S. Appl. No. 15/409,159, filed Jan. 18, 2017, Konrardy et al., "Autonomous Vehicle Trip Routing".
U.S. Appl. No. 15/409,163, filed Jan. 18, 2017, Konrardy et al., "Autonomous Vehicle Parking".
U.S. Appl. No. 15/409,167, filed Jan. 18, 2017, Konrardy et al., "Autonomous Vehicle Retrieval".
U.S. Appl. No. 15/409,180, filed Jan. 18, 2017, Konrardy et al., "Method and System for Repairing a Malfunctioning Autonomous Vehicle".
U.S. Appl. No. 15/409,198, filed Jan. 18, 2017, Konrardy et al., "System and Method for Autonomous Vehicle Ride Sharing Using Facial Recognition".
U.S. Appl. No. 15/409,213, filed Jan. 18, 2017, Konrardy et al., "Coordinated Autonomous Vehicle Automatic Area Scanning".
U.S. Appl. No. 15/409,215, filed Jan. 18, 2017, Konrardy et al., "Autonomous Vehicle Sensor Malfunction Detection".
U.S. Appl. No. 15/409,220, filed Jan. 18, 2017, Konrardy et al., "Autonomous Electric Vehicle Charging".
U.S. Appl. No. 15/409,228, filed Jan. 18, 2017, Konrardy et al., "Operator-Specific Configuration of Autonomous Vehicle Operation".
U.S. Appl. No. 15/409,236, filed Jan. 18, 2017, Konrardy et al., "Autonomous Vehicle Operation Adjustment Based Upon Route".
U.S. Appl. No. 15/409,239, filed Jan. 18, 2017, Konrardy et al., "Autonomous Vehicle Component Maintenance and Repair".
U.S. Appl. No. 15/409,243, filed Jan. 16, 2017, Konrardy et al., "Anomalous Condition Detection and Response for Autonomous Vehicles".
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/410,192, filed Jan. 19, 2017, Konrardy et al., "Autonomous Vehicle Operation Feature Monitoring and Evaluation of Effectiveness".
U.S. Appl. No. 15/413,796, filed Jan. 24, 2017, Konrardy et al., "Autonomous Vehicle Refueling".
U.S. Appl. No. 15/421,508, filed Feb. 1, 2017, Konrardy et al., "Autonomous Vehicle Operation Feature Monitoring arid Evaluation of Effectiveness".
U.S. Appl. No. 15/421,521, filed Feb. 1, 2017, Konrardy et al., "Autonomous Vehicle Operation Feature Monitoring and Evaluation of Effectiveness".
U.S. Appl. No. 15/472,813, filed Mar. 29, 2017, Konrardy et al., "Accident Response Using Autonomous Vehicle Monitoring".
U.S. Appl. No. 15/491,487, filed Apr. 19, 2017, Konrardy et al., "Autonomous Vehicle Insurance Pricing and Offering Based Upon Accident Risk Factors".
Wiesenthal et al., "The Influence of Music on Driver Stress," Journal of Applied Social Psychology 30(8):1709-19 (2000).
Wiesenthal, David L., Dwight A. Hennessy, and Brad Totten, "The Influence of Music on Driver Stress," Journal of Applied Social Psychology 30, 8, pp. 1709-1719, 2000.
Young et al., "Cooperative Collision Warning Based Highway Vehicle Accident Reconstruction", Eighth International Conference on Intelligent Systems Design and Applications, Nov. 26-28, 2008, pp. 561-565.
Zhou et al., A Simulation Model to Evaluate and Verify Functions of Autonomous Vehicle Based on Simulink, Tongji University, 12 pages (2009).
U.S. Appl. No. 15/409,305, filed Jan. 18, 2017, Konrardy et al., "Component Malfunction Impact Assessment".
"Rupak Rathore, Carroll Gau, Integrating Biometric Sensors into Automotive Internet of Things (2014), International Conference on Cloud Computing and Internet of Things (CCIOT 2014), 178-179" (Year: 2014).
Schindler et al. "JDVE: A Joint Driver-Vehicle-Environment Simulation Platform for the Development and Accelerated Testing of Automotive Assistance and Automation Systems", Jan. 2011, 6 pages. (Year: 2011).

\* cited by examiner

AUTONOMOUS VEHICLE ROUTING

CROSS-REFERENCE TO RELATED APPLICATIONS

Tis application is a continuation of, and claims the benefit of, U.S. patent application Ser. No. 15/409,146, filed Jan. 18, 2017 and entitled "Autonomous Vehicle Routing," which claims priority to and the benefit of the filing date of the following applications: (1) provisional U.S. Patent Application No. 62/286,017 entitled "Autonomous Vehicle Routing, Maintenance, & Fault Determination," filed on Jan. 22, 2016; (2) provisional U.S. Patent Application No. 62/287,659 entitled "Autonomous Vehicle Technology," filed on Jan. 27, 2016; (3) provisional U.S. Patent Application No. 62/302,990 entitled "Autonomous Vehicle Routing," filed on Mar. 3, 2016; (4) provisional U.S. Patent Application No. 62/303,500 entitled "Autonomous Vehicle Routing." filed on Mar. 4, 2016; (5) provisional U.S. Patent Application No. 62/312,109 entitled "Autonomous Vehicle Routing," filed on Mar. 23, 2016; (6) provisional U.S. Patent Application No. 62/349,884 entitled "Autonomous Vehicle Component and System Assessment," filed on Jun. 14, 2016; (7) provisional U.S. Patent Application No. 62/351,559 entitled "Autonomous Vehicle Component and System Assessment," filed on Jun. 17, 2016; (8) provisional U.S. Patent Application No. 62/373,084 entitled "Autonomous Vehicle Communications," filed on Aug. 10, 2016; (9) provisional U.S. Patent Application No. 62/376,044 entitled "Autonomous Operation Expansion through Caravans," filed on Aug. 17, 2016; (10) provisional U.S. Patent Application No. 62/380,686 entitled "Autonomous Operation Expansion through Caravans," filed on Aug. 29, 2016; (11) provisional U.S. Patent Application No. 62/381,848 entitled "System and Method for Autonomous Vehicle Sharing Using Facial Recognition," filed on Aug. 31, 2016; (12) provisional U.S. Patent Application No. 62/406,595 entitled "Autonomous Vehicle Action Communications," filed on Oct. 11, 2016; (13) provisional U.S. Patent Application No. 62/406,600 entitled "Autonomous Vehicle Path Coordination," filed on Oct. 11, 2016; (14) provisional U.S. Patent Application No. 62/406,605 entitled "Autonomous Vehicle Signal Control," filed on Oct. 11, 2016; (15) provisional U.S. Patent Application No. 62/406,611 entitled "Autonomous Vehicle Application," filed on Oct. 11, 2016; (16) provisional U.S. Patent Application No. 62/415,668 entitled "Method and System for Enhancing the Functionality of a Vehicle," filed on Nov. 1, 2016; (17) provisional U.S. Patent Application No. 62/415,672 entitled "Method and System for Repairing a Malfunctioning Autonomous Vehicle," filed on Nov. 1, 2016 (18) provisional U.S. Patent Application No. 62/415,673 entitled "System and Method for Autonomous Vehicle Sharing Using Facial Recognition," filed on Nov. 1, 2016; (19) provisional U.S. Patent Application No. 62/415,678 entitled "System and Method for Autonomous Vehicle Ride Sharing Using Facial Recognition." filed on Nov. 1, 2016; (20) provisional U.S. Patent Application No. 62/418,988 entitled "Virtual Testing of Autonomous Vehicle Control System," filed on Nov. 8, 2016; (21) provisional U.S. Patent Application No. 62/418,999 entitled "Detecting and Responding to Autonomous Vehicle Collisions," filed on Nov. 8, 2016: (22) provisional U.S. Patent Application No. 62/419,002 entitled "Automatic Repair on Autonomous Vehicles," filed on Nov. 8, 2016; (23) provisional U.S. Patent Application No. 62/419,009 entitled "Autonomous Vehicle Component Malfunction Impact Assessment," filed on Nov. 8, 2016; (24) provisional U.S. Patent Application No. 62/419,017 entitled "Autonomous Vehicle Sensor Malfunction Detection," filed on Nov. 8, 2016; (25) provisional U.S. Patent Application No. 62/419,023 entitled "Autonomous Vehicle Damage and Salvage Assessment" filed on Nov. 8, 2016; (26) provisional U.S. Patent Application No. 62/424,078 entitled "Systems and Methods for Sensor Monitoring," filed Nov. 18, 2016; (27) provisional U.S. Patent Application No. 62/424,093 entitled "Autonomous Vehicle Sensor Malfunction Detection," filed on Nov. 18, 2016; (28) provisional U.S. Patent Application No. 62/428,843 entitled "Autonomous Vehicle Control," filed on Dec. 1, 2016; (29) provisional U.S. Patent Application No. 62/430,215 entitled "Autonomous Vehicle Environment and Component Monitoring," filed on Dec. 5, 2016: (30) provisional U.S. Patent Application No. 62/434,355 entitled "Virtual Testing of Autonomous Environment Control System," filed Dec. 14, 2016; (31) provisional U.S. Patent Application No. 62/434,359 entitled "Detecting and Responding to Autonomous Environment Incidents." filed Dec. 14, 2016; (32) provisional U.S. Patent Application No. 62/434,361 entitled "Component Damage and Salvage Assessment," filed Dec. 14, 2016; (33) provisional U.S. Patent Application No. 62/434,365 entitled "Sensor Malfunction Detection," filed Dec. 14, 2016; (34) provisional U.S. Patent Application No. 62/434,368 entitled "Component Malfunction Impact Assessment" filed Dec. 14, 2016; and (35) provisional U.S. Patent Application No. 62/434,370 entitled "Automatic Repair of Autonomous Components," filed Dec. 14, 2016. The entire contents of each of the preceding applications are hereby expressly incorporated herein by reference.

Additionally, the present application is related to the following U.S. patent applications: (1) U.S. patent application Ser. No. 15/409,143 entitled "Autonomous Operation Suitability Assessment and Mapping," filed Jan. 18, 2017; (2) U.S. patent application Ser. No. 15/409,149 entitled "Autonomous Vehicle Routing During Emergencies," filed Jan. 18, 2017; (3) U.S. patent application Ser. No. 15/409,159 entitled "Autonomous Vehicle Trip Routing," filed Jan. 18, 2017; (4) U.S. patent application Ser. No. 15/409,163 entitled "Autonomous Vehicle Parking," filed Jan. 18, 2017; (5) U.S. patent application Ser. No. 15/409,167 entitled "Autonomous Vehicle Retrieval," filed Jan. 18, 2017; (6) U.S. patent application Ser. No. 15/409,092 entitled "Autonomous Vehicle Action Communications," filed Jan. 18, 2017; (7) U.S. patent application Ser. No. 15/409,099 entitled "Autonomous Vehicle Path Coordination," filed Jan. 18, 2017; (8) U.S. patent application Ser. No. 15/409,107 entitled "Autonomous Vehicle Signal Control." filed Jan. 18, 2017; (9) U.S. patent application Ser. No. 15/409,115 entitled "Autonomous Vehicle Application," filed Jan. 18, 2017; (10) U.S. patent application Ser. No. 15/409,136 entitled "Method and System for Enhancing the Functionality of a Vehicle," filed Jan. 18, 2017; (11) U.S. patent application Ser. No. 15/409,180 entitled "Method and System for Repairing a Malfunctioning Autonomous Vehicle." filed Jan. 18, 2017; (12) U.S. patent application Ser. No. 15/409,148 entitled "System and Method for Autonomous Vehicle Sharing Using Facial Recognition," filed Jan. 18, 2017; (13) U.S. patent application Ser. No. 15/409.,198 entitled "System and Method for Autonomous Vehicle Ride Sharing Using Facial Recognition," filed Jan. 18, 2017; (14) U.S. patent application Ser. No. 15/409,215 entitled "Autonomous Vehicle Sensor Malfunction Detection," filed Jan. 18, 2017; (15) U.S. patent application Ser. No. 15/409, 248 entitled "Sensor Malfunction Detection," filed Jan. 18, 2017; (16) U.S. patent application Ser. No. 15/409,271 entitled "Autonomous Vehicle Component Malfunction Impact Assessment," filed Jan. 18, 2017; (17) U.S. patent application Ser. No. 15/409,305 entitled "Component Malfunction Impact Assessment," filed Jan. 18, 2017; (18) U.S. patent application Ser. No. 15/409,318 entitled "Automatic Repair of Autonomous Vehicles," filed Jan. 18, 2017; (19) U.S. patent application Ser. No. 15/409,336 entitled "Automatic Repair of Autonomous Components," filed Jan. 18, 2017; (20) U.S. patent application Ser. No. 15/409,340 entitled "Autonomous Vehicle Damage and Salvage Assessment." filed Jan. 18, 2017; (21) U.S. patent application Ser. No. 15/409,349 entitled "Component Damage and Salvage Assessment." filed Jan. 18, 2017; (22) U.S. patent application Ser. No. 15/409.,359 entitled "Detecting and Responding to Autonomous Vehicle Collisions," filed Jan. 18, 2017; (23) U.S. patent application Ser. No. 15/409,371 entitled "Detecting and Responding to Autonomous Environment Incidents," filed Jan. 18, 2017; (24) U.S. patent application Ser. No. 15/409,445 entitled "Virtual Testing of Autonomous Vehicle Control System," filed Jan. 18, 2017; (25) U.S. patent application Ser. No. 15/409.,473 entitled "Virtual Testing of Autonomous Environment Control System" filed Jan. 18, 2017; (26) U.S. patent application Ser. No. 15/409,220 entitled "Autonomous Electric Vehicle Charging," filed Jan. 18, 2017; (27) U.S. patent application Ser. No. 15/409,213 entitled "Coordinated Autonomous Vehicle Automatic Area Scanning," filed Jan. 18, 2017; (28) U.S. patent application Ser. No. 15/409,228 entitled "Operator-Specific Configuration of Autonomous Vehicle Operation," filed Jan. 18, 2017; (29) U.S. patent application Ser. No. 15/409,236 entitled "Autonomous Vehicle Operation Adjustment Based Upon Route" filed Jan. 18, 2017; (30) U.S. patent application Ser. No. 15/409,239 entitled "Autonomous Vehicle Component Maintenance and Repair." filed Jan. 18, 2017; and (31) U.S. patent application Ser. No. 15/409,243 entitled "Anomalous Condition Detection and Response for Autonomous Vehicles," filed Jan. 18, 2017.

FIELD the present disclosure generally relates to systems and methods for autonomous or semi-autonomous vehicle control, including data analysis and route determination.

BACKGROUND

Vehicles are typically operated by a human vehicle operator who controls both steering and motive controls. Operator error, inattention, inexperience, misuse, or distraction leads to many vehicle collisions each year, resulting in injury and damage. Autonomous or semi-autonomous vehicles augment vehicle operators' information or replace vehicle operators' control commands to operate the vehicle, in whole or part, with computer systems based upon information from sensors within, or attached to, the vehicle. Such vehicles may be operated with or without passengers, thus requiring different means of control than traditional vehicles. Such vehicles also may include a plurality of advanced sensors, capable of providing significantly more data (both in type and quantity) than is available even from GPS navigation assistance systems installed in traditional vehicles.

Ensuring safe operation of such autonomous or semi-autonomous vehicles is of the utmost importance because the automated systems of these vehicles may not function properly in all environments. Although autonomous operation may be safer than manual operation under ordinary driving conditions, unusual or irregular environmental conditions may significantly impair the functioning of the autonomous operation features controlling the autonomous vehicle. Under some conditions, autonomous operation may become impractical or excessively dangerous. As an example, fog or heavy rain may greatly reduce the ability of autonomous operation features to safely control the vehicle. Additionally, damage or other impairment of sensors or other components of autonomous systems may significantly increase the risks associated with autonomous operation. Such conditions may change frequently, thereby changing the safety of autonomous vehicle operation.

BRIEF SUMMARY

The present embodiments may be related to autonomous or semi-autonomous vehicle operation, including driverless operation of fully autonomous vehicles. The embodiments described herein relate particularly to various aspects of route determination and navigation of autonomous vehicles. This may include determining suitability of roads or road segments for varying levels of autonomous operation, which may include generating maps indicating roadway suitability for autonomous operation. This may further include route planning, adjustment, or optimization, including risk management by avoidance of road segments associated with high risk levels for vehicle accidents involving autonomous vehicles. This may yet further include autonomous route generation and/or implementation in emergency or non-emergency situations. Yet further embodiments may be related to parking autonomous vehicles and retrieving parked autonomous vehicles, which may similarly involve autonomous route determination and/or vehicle control.

In one aspect, a computer-implemented method for analyzing roadway suitability for autonomous or semi-autonomous vehicle operation may be provided. The method may include (1) receiving map data including indications of a plurality of road segments; (2) receiving operating data from a plurality of vehicles having at least one autonomous operation feature; (3) identifying a road segment to analyze from the plurality of road segments; (4) associating a subset of the operating data with the identified road segment based upon the location data; (5) determining one or more risk levels associated with the road segment based upon the associated subset of the operating data; (6) determining one or more suitability scores for the road segment based upon the one or more risk levels; and/or (7) storing the one or more suitability scores in a database. Each suitability score may indicate a category of suitability for autonomous or semi-autonomous vehicle operation. Additionally, each suitability score may be stored with an indication of the associated road segment. The one or more suitability scores may include a minimum safety rating for the road segment. The method may include additional, less, or alternate actions, including those discussed elsewhere herein.

For instance, the received operating data may include location data associated with operation of the plurality of vehicles. The operating data may further include usage information regarding one or more autonomous operation feature settings. Similarly, the operating data may include data regarding a plurality of environmental conditions associated with the plurality of vehicles. The operating data for one or more of the plurality of vehicles may be generated by a data application running on a mobile device associated with the vehicle. Additionally, or alternatively, the method may include receiving additional data regarding a plurality of vehicle accidents or other hazardous events, such that each of the plurality of hazardous events is associated with one of the plurality of road segments. Moreover, the one or more risk levels associated with the road segment may be determined based in part upon at least part of this additional data. In further embodiments, determining the one or more risk factors may include using machine learning techniques to identify one or more salient risk factors.

In some embodiments, the method may further include generating one or more map tiles including visual representations of the one or more suitability scores. The method may further include requesting the map data from a third-party data source using an application program interface (API) associated with the third-party data source. In further embodiments, the map data may include one or more indications of location for each of the plurality of road segments utilizing a first format for indicating geospatial location, but the location data may utilize a second format distinct from the first format for indicating geospatial location. In such embodiments, associating subset of the operating data with the identified road segment may include converting one or both of the indication of location or the location data to a compatible format for association.

In another aspect, a computer-implemented method for autonomous or semi-autonomous vehicle routing may be provided. The method may include (1) receiving a request to determine an optimal route for a vehicle; (2) receiving a first geospatial location indicating a starting location; (3) receiving a second geospatial location indicating a destination location; (4) receiving a set of parameters indicating requirements for the optimal route; (5) accessing map data including a plurality of road segments including one or more suitability scores for each road segment (indicating the road segment's suitability for autonomous or semi-autonomous vehicle operation); (5) identifying a set of suitable road segments that meet the requirements indicated by the set of parameters from the plurality of road segments; (6) determining one or more paths between the first geospatial location and the second geospatial location composed of one or more of the suitable road segments of the set of suitable road segments; and/or (7) selecting the optimal route from the one or more paths. The method may include additional, less, or alternate actions, including those discussed elsewhere herein.

For instance, the parameters may indicate a minimum safety rating for fully autonomous vehicle operation. Such minimum safety rating may be associated with a risk level for fully autonomous operation of the vehicle below a risk threshold. The first geospatial location may be automatically determined based upon the current location of the vehicle in response to the request to determine the optimal route, which current location of the vehicle may be obtained from a global positioning system (GPS) receiver within the vehicle.

The optimal route may be selected from the one or more paths based upon maximization or minimization of one or more optimization criteria determined for each path, which optimization criteria may include distance, time, risk, cost, amount of manual driving required, and/or average level of autonomous feature operation available. In some embodiments, the method may further comprise transmitting, from a server to a computing device associated with the vehicle via a communication network, an indication of the optimal route. The method may further include causing, by a vehicle control system of the vehicle, the vehicle to operate along the optimal route from the first geospatial location to the second geospatial location.

In some embodiments, the method may further include determining that no path exists between the first geospatial location and the second geospatial location using the suitable road segments of the set of suitable road segments meeting the requirements indicated by the received parameters. In such a case, a second set of parameters may be determined based upon the received set of parameters, and the one or more suitable road segments meeting the requirements indicated by the second set of parameters may be added to the set of suitable road segments. The one or more paths between the first geospatial location and the second geospatial location may then be determined, which paths may include the added suitable road segments. Additionally, or alternatively, a substitute destination location along one of the suitable road segments may be determined, and the second geospatial location may be adjusted to indicate the substitute destination location In another aspect, a computer-implemented method for automatically routing a vehicle capable of autonomous operation may be provided. The method may include (1) receiving an indication of an emergency condition; (2) determining a target location associated with emergency assistance to which to route the vehicle; (3) determining a route to the target location using only road segments meeting a minimum safety rating for fully autonomous vehicle operation; and/or (4) causing a vehicle control system of the vehicle to operate the vehicle along the determined route to the target location. The minimum safety rating of the road segments may be associated with a risk level for fully autonomous operation of the vehicle below a risk threshold. The method may be implemented by a data application running on a mobile device and/or on-board computer associated with the vehicle. The method may include additional, less, or alternate actions, including those discussed elsewhere herein.

For instance, the indication of the emergency condition may be automatically generated based upon sensor data regarding health of a vehicle user within the vehicle. Alternatively, the indication of the emergency condition may be automatically generated based upon sensor data indicating the vehicle has been involved in a collision. The indication of the emergency condition may alternatively be generated by operation of an emergency button by a vehicle user within the vehicle, which emergency button may be presented on an electronic display screen within the vehicle. The indication of the emergency condition may further include information indicating a type of the emergency condition. In such embodiments, the target location may be determined based upon the type of the emergency condition.

The method may further include presenting a message requesting confirmation of the emergency condition to a person within the vehicle, by a display or speaker within the vehicle. Such message may include an option to suppress the indication of the emergency condition, such as by selecting an option to cancel the emergency determination. The vehicle may then be operated along the determined route to the target location unless the option to suppress the indication is selected.

In some embodiments, the method may include generating an alert including information regarding the emergency condition and the target location, which may be communicated via a communication network to an interested party remote from the vehicle to inform such interested party of the emergency condition and the target location. In further embodiments, the target location may be a geospatial location on a road segment meeting the minimum safety rating that is located in proximity to an emergency care facility. Upon reaching the target location, the method may include causing a vehicle control system of the vehicle to operate one or more signaling components of the vehicle to draw attention to the vehicle.

In another aspect, another computer-implemented method for automatically routing a vehicle capable of autonomous operation may be provided. The method may include (1) receiving a request from a user to initiate an autonomous vehicle trip; (2) receiving an indication of a starting location from which to begin the autonomous vehicle trip; (3) receiving an indication of a target location to which to route the vehicle during the autonomous vehicle trip; (4) determining an autonomous route from the starting location to the target location using only road segments suitable for fully autonomous vehicle travel; (5) causing a vehicle control system of the vehicle to operate the vehicle autonomously along the autonomous route from the starting location to the target location; and/or (6) causing the vehicle control system of the vehicle to stop at the target location to allow one or more passengers to exit the vehicle. The road segments suitable for fully autonomous vehicle travel may be road segments associated with risk levels for fully autonomous operation of the vehicle below a risk threshold. The method may include additional, less, or alternate actions, including those discussed elsewhere herein.

For instance, the indication of the starting location may be automatically generated as a current location of the vehicle or may be received from the user via a mobile device. The vehicle may be selected from a plurality of autonomous vehicles based upon a distance of each of the plurality of vehicles to the starting location. The method may further include causing the vehicle control system to operate the vehicle autonomously from a current location of the vehicle to the starting location, and causing the vehicle to stop at the starting location to allow the one or more passengers to board the vehicle. The method may further include receiving an indication of a departure time or an arrival time, and causing the vehicle to be at the starting location at the departure time or to be at the target location at the arrival time.

The method may further include determining a plurality of likely target locations based upon prior vehicle trips associated with the user, indications of which may be presented to the user for selection. Thus, the indication of the target location may be selected by the user from the presented indications of the plurality of likely target locations. The indication of the target location may identify a first location inaccessible by the vehicle through fully autonomous operation within a range of risk levels below a risk threshold, in which case the target location may be adjusted to be a second location accessible by the vehicle through fully autonomous operation below the risk threshold that is in proximity to the first location.

In some embodiments, the method may further include receiving an indication of an interim target location. When such interim target location is received, the method may adjust the autonomous route to include the interim target location and cause the vehicle control system of the vehicle to operate the vehicle autonomously along the adjusted autonomous route to the interim target location. The vehicle control system may cause the vehicle to stop at the interim target location to allow the one or more passengers to exit the vehicle. A command to resume travel along the autonomous route may be received while at the interim location, which may cause the vehicle control system of the vehicle to resume operating the vehicle autonomously along the adjusted autonomous route to the target location.

In further embodiments, the method may include monitoring environmental conditions along the autonomous route to identify problematic conditions. When it is determined that one or more of the road segments included in the autonomous route have become unsuitable for fully autonomous vehicle travel based upon the monitored environmental conditions, the autonomous route may be adjusted to exclude the one or more road segments determined to have become unsuitable for fully autonomous vehicle travel. The environmental conditions along the autonomous route may be monitored using communication data received from one or more other autonomous vehicles or infrastructure communication components via a communication network.

Systems or computer-readable media storing instructions for implementing all or part of the system described above may also be provided in some aspects. Systems for implementing such methods may include one or more of the following: a mobile computing device, an on-board computer, a remote server, one or more sensors, one or more communication modules configured to communicate wirelessly via radio links, radio frequency links, and/or wireless communication channels, and/or one or more program memories coupled to one or more processors of the mobile computing device, on-board computer, or remote server. Such program memories may store instructions to cause the one or more processors to implement part or all of the method described above. Additional or alternative features described herein below may be included in some aspects.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1A:
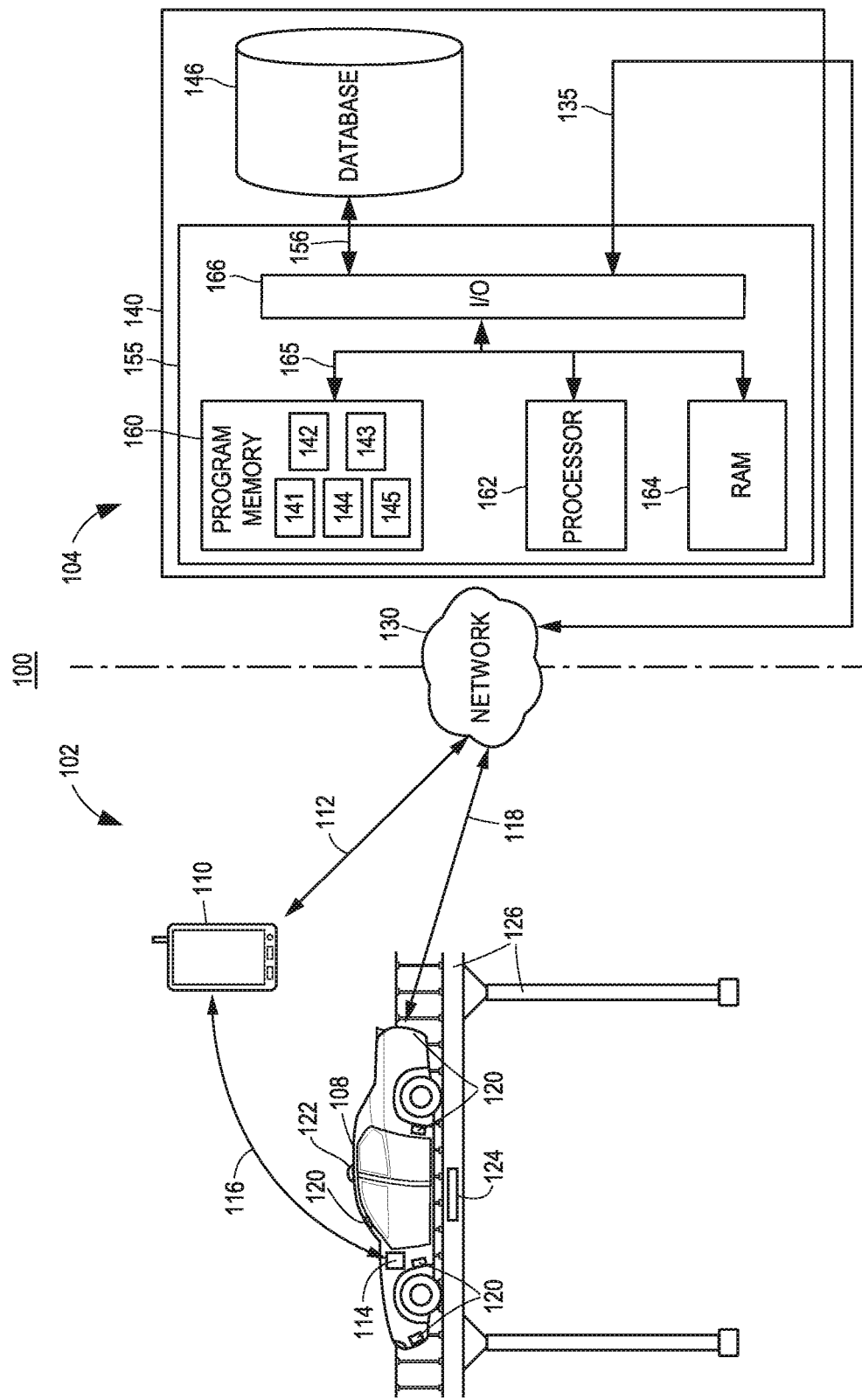
FIG. 1A illustrates a block diagram of an exemplary autonomous vehicle data system for autonomous vehicle operation, monitoring, and related functions.

The systems and methods disclosed herein generally relate to collecting, communicating, evaluating, predicting, and/or utilizing data associated with autonomous or semi-autonomous operation features for controlling a vehicle. The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially controls aspects of vehicle operation.

Optimal route planning for fully or partially autonomous vehicles may be provided using the systems and methods described herein. A user may input an origin and a destination (e.g., A and B locations), whether they want to drive fully autonomous or take the fastest route, and/or whether they will need to park the vehicle nearby or close to the destination. Routes may be optimized for private passengers based upon road safety for autonomous vehicles (e.g., predetermined "safe for autonomous vehicle" roads), whether or not the roads allow autonomous vehicles, or other factors (e.g., routes with the least manual intervention required, fastest routes, etc.). Alerts may be provided or generated when the autonomous vehicle is approaching an area or road where manual intervention may be needed. Optimal routes may also be determined for carpooling or vehicle sharing, delivery or other commercial use, emergency response (e.g., a "self-driving to hospital" mode), non-driving passenger pick-up and drop-off (e.g., children, elderly, etc.), autonomous parking and retrieval, or other purposes. In some embodiments, vehicle-infrastructure technology may be used and/or collect data to develop a most efficient/safest route. The presence of smart stoplights, railroad crossings, and other infrastructure may be mapped, and routes may be optimized to include traveling by the most incidences of smart infrastructure.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous vehicles or features may be used to assess the autonomous features themselves while in operation or to provide pertinent information to non-autonomous vehicles through an electronic communication network. These and other advantages are further described below.

Autonomous operation features utilize data not available to a human operator, respond to conditions in the vehicle operating environment faster than human operators, and do not suffer fatigue or distraction. Thus the autonomous operation features may also significantly affect various risks associated with operating a vehicle. Moreover, combinations of autonomous operation features may further affect operating risks due to synergies or conflicts between features. To account for these effects on risk, some embodiments evaluate the quality of each autonomous operation feature and/or combination of features. This may be accomplished by testing the features and combinations in controlled environments, as well as analyzing the effectiveness of the features in the ordinary course of vehicle operation. New autonomous operation features may be evaluated based upon controlled testing and/or estimating ordinary-course performance based upon data regarding other similar features for which ordinary-course performance is known.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with vehicle operation with and without the autonomous operation features may be used to determine risk categories or premiums for a vehicle insurance policy covering a vehicle with autonomous operation features, as described elsewhere herein. Risk category or price may be determined based upon factors relating to the evaluated effectiveness of the autonomous vehicle features. The risk or price determination may also include traditional factors, such as location, vehicle type, and level of vehicle use. For fully autonomous vehicles, factors relating to vehicle operators may be excluded entirely. For partially autonomous vehicles, factors relating to vehicle operators may be reduced in proportion to the evaluated effectiveness and monitored usage levels of the autonomous operation features. For vehicles with autonomous communication features that obtain information from external sources (e.g., other vehicles or infrastructure), the risk level and/or price determination may also include an assessment of the availability of external sources of information. Location and/or timing of vehicle use may thus be monitored and/or weighted to determine the risk associated with operation of the vehicle.

Exemplary Autonomous Vehicle Operation System

FIG. 1A illustrates a block diagram of an exemplary autonomous vehicle data system 100 on which the exemplary methods described herein may be implemented. The high-level architecture includes both hardware and software applications, as well as various data communications channels for communicating data between the various hardware and software components. The autonomous vehicle data system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature or to assist the vehicle operator in operating the vehicle 108. To monitor the vehicle 108, the front-end components 102 may include one or more sensors 120 installed within the vehicle 108 that may communicate with the on-board computer 114. The front-end components 102 may further process the sensor data using the on-board computer 114 or a mobile device 110 (e.g., a smart phone, a tablet computer, a special purpose computing device, smart watch, wearable electronics, etc.) to determine when the vehicle is in operation and information regarding the vehicle.

In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, store the received data, process the received data, and/or communicate information associated with the received or processed data.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114.

The front end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the mobile server 140 via the network 130, such as over one or more radio frequency links or wireless communication channels. In other embodiments, the on-board computer 114 may perform all of the functions of the mobile device 110 described herein, in which case no mobile device 110 may be present in the system 100.

Either or both of the mobile device 110 or on-board computer 114 may communicate with the network 130 over links 112 and 118, respectively. Either or both of the mobile device 110 or on-board computer 114 may run a Data Application for collecting, generating, processing, analyzing, transmitting, receiving, and/or acting upon data associated with the vehicle 108 (e.g., sensor data, autonomous operation feature settings, or control decisions made by the autonomous operation features) or the vehicle environment (e.g., other vehicles operating near the vehicle 108). Additionally, the mobile device 110 and on-board computer 114 may communicate with one another directly over link 116.

The mobile device 110 may be either a general-use personal computer, cellular phone, smart phone, tablet computer, smart watch, wearable electronics, or a dedicated vehicle monitoring or control device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. In some embodiments or under certain conditions, the mobile device 110 or on-board computer 114 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, an inductance sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108 (e.g., via GPS coordinates, dead reckoning, wireless signal triangulation, etc.). Other sensors 120 may be directed to the interior or passenger compartment of the vehicle 108, such as cameras, microphones, pressure sensors, thermometers, or similar sensors to monitor the vehicle operator and/or passengers within the vehicle 108. Information generated or received by the sensors 120 may be communicated to the on-board computer 114 or the mobile device 110 for use in autonomous vehicle operation.

In further embodiments, the front-end components may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting information relating to the condition of the infrastructure component 126. The sensors (not shown) may generate data relating to weather conditions, traffic conditions, or operating status of the infrastructure component 126.

The infrastructure communication device 124 may be configured to receive the sensor data generated and determine a condition of the infrastructure component 126, such as weather conditions, road integrity, construction, traffic, available parking spaces, etc. The infrastructure communication device 124 may further be configured to communicate information to vehicles 108 via the communication component 122. In some embodiments, the infrastructure communication device 124 may receive information from one or more vehicles 108, while, in other embodiments, the infrastructure communication device 124 may only transmit information to the vehicles 108. The infrastructure communication device 124 may be configured to monitor vehicles 108 and/or communicate information to other vehicles 108 and/or to mobile devices 110.

In some embodiments, the communication component 122 may receive information from external sources, such as other vehicles or infrastructure. The communication component 122 may also send information regarding the vehicle 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to generate and implement control commands to control the steering, braking, or throttle of the vehicle 108. To facilitate such control, the on-board computer 114 may be communicatively connected to control components of the vehicle 108 by various electrical or electromechanical control components (not shown). When a control command is generated by the on-board computer 114, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these. The network 130 may include one or more radio frequency communication links, such as wireless communication links 112 and 118 with mobile devices 110 and on-board computers 114, respectively. Where the network 130 comprises the Internet, data communications may take place over the network 130 via an Internet communication protocol.

The back-end components 104 include one or more servers 140. Each server 140 may include one or more computer processors adapted and configured to execute various software applications and components of the autonomous vehicle data system 100, in addition to other software applications. The server 140 may further include a database 146, which may be adapted to store data related to the operation of the vehicle 108 and its autonomous operation features. Such data might include, for example, dates and times of vehicle use, duration of vehicle use, use and settings of autonomous operation features, information regarding control decisions or control commands generated by the autonomous operation features, speed of the vehicle 108, RPM or other tachometer readings of the vehicle 108, lateral and longitudinal acceleration of the vehicle 108, vehicle accidents, incidents or near collisions of the vehicle 108, hazardous or anomalous conditions within the vehicle operating environment (e.g., construction, accidents, etc.), communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The server 140 may access data stored in the database 146 when executing various functions and tasks associated with the evaluating feature effectiveness or assessing risk relating to an autonomous vehicle.

Although the autonomous vehicle data system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and hundreds or thousands of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for various types of information, such as autonomous operation feature information, vehicle accidents, road conditions, vehicle insurance policy information, or vehicle use information. Additional databases (not shown) may be communicatively connected to the server 140 via the network 130, such as databases maintained by third parties (e.g., weather, construction, or road network databases). The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the IO circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features (which may include control commands or decisions of the autonomous operation features), a feature evaluation application 142 for determining the effectiveness of autonomous operation features under various conditions and/or determining operating condition of autonomous operation features or components, a risk mapping application 143 for determining the risks associated with autonomous operation feature use along a plurality of road segments associated with an electronic map, a route determination application 144 for determining routes suitable for autonomous or semi-autonomous vehicle operation, and an autonomous parking application 145 for assisting in parking and retrieving an autonomous vehicle. The various software applications may be executed on the same computer processor or on different computer processors.

Figure 1B:
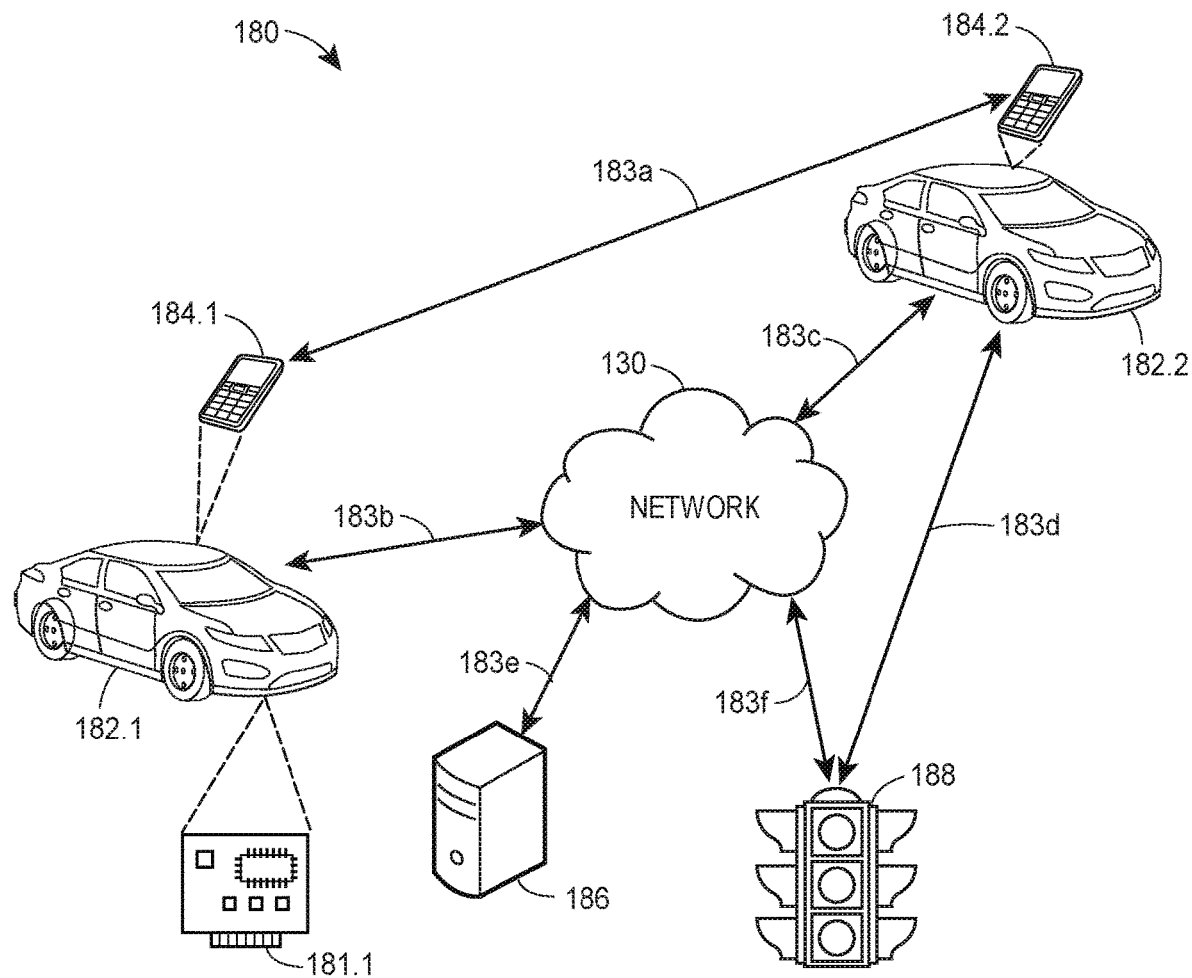
FIG. 1B illustrates a block diagram of an exemplary autonomous vehicle monitoring system, showing a plurality of vehicles and smart infrastructure components.

FIG. 1B illustrates a block diagram of an exemplary autonomous vehicle monitoring system 180 on which the exemplary methods described herein may be implemented. In one aspect, system 180 may include a network 130, N number of vehicles 182.1-182.N and respective mobile computing devices 184.1-184.N, an external computing device 186, and/or a smart infrastructure component 188. In one aspect, mobile computing devices 184 may be an implementation of mobile computing device 110, while vehicles 182 may be an implementation of vehicle 108. The vehicles 182 may include a plurality of vehicles 108 having autonomous operation features, as well as a plurality of other vehicles not having autonomous operation features. As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as vehicle-to-vehicle (V2V) wireless communication and/or data transmission via the communication component 122, directly via the mobile computing devices 184, or otherwise.

Although system 180 is shown in FIG. 1A as including one network 130, two mobile computing devices 184.1 and 184.2, two vehicles 182.1 and 182.2, one external computing device 186, and/or one smart infrastructure component 188, various embodiments of system 180 may include any suitable number of networks 130, mobile computing devices 184, vehicles 182, external computing devices 186, and/or infrastructure components 188. The vehicles 182 included in such embodiments may include any number of vehicles 182.i having vehicle controllers 181.n (such as vehicle 182.1 with vehicle controller 181.1) and vehicles 182.j not having vehicles controllers (such as vehicle 182.2). Moreover, system 180 may include a plurality of external computing devices 186 and more than two mobile computing devices 184, any suitable number of which being interconnected directly to one another and/or via network 130.

In one aspect, each of mobile computing devices 184.1 and 184.2 may be configured to communicate with one another directly via peer-to-peer (P2P) wireless communication and/or data transfer over a radio link or wireless communication channel. In other aspects, each of mobile computing devices 184.1 and 184.2 may be configured to communicate indirectly with one another and/or any suitable device via communications over network 130, such as external computing device 186 and/or smart infrastructure component 188, for example. In still other aspects, each of mobile computing devices 184.1 and 184.2 may be configured to communicate directly and/or indirectly with other suitable devices, which may include synchronous or asynchronous communication.

Each of mobile computing devices 184.1 and 184.2 may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183*a*, which may utilize, for example, a Wi-Fi direct protocol, an ad-hoc cellular communication protocol, etc. Mobile computing devices 184.1 and 184.2 may also be configured to communicate with vehicles 182.1 and 182.2, respectively, utilizing a BLUETOOTH communication protocol (radio link not shown). In some embodiments, this may include communication between a mobile computing device 184.1 and a vehicle controller 181.1. In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

To provide additional examples, mobile computing devices 184.1 and 184.2 may be configured to communicate with one another via radio links 183*b* and 183*c* by each communicating with network 130 utilizing a cellular communication protocol. As an additional example, mobile computing devices 184.1 and/or 184.2 may be configured to communicate with external computing device 186 via radio links 183*b*, 183*c*, and/or 183*e*. Still further, one or more of mobile computing devices 184.1 and/or 184.2 may also be configured to communicate with one or more smart infrastructure components 188 directly (e.g., via radio link 183*d*) and/or indirectly (e.g., via radio links 183*c* and 183*f* via network 130) using any suitable communication protocols. Similarly, one or more vehicle controllers 181.1 may be configured to communicate directly to the network 130 (via radio link 183*b*) or indirectly through mobile computing device 184.1 (via radio link 183*b*). Vehicle controllers 181.1 may also communicate with other vehicle controllers and/or mobile computing devices 184.2 directly or indirectly through mobile computing device 184.1 via local radio links 183*a*. As discussed elsewhere herein, network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 183*a*-183*f* may represent wired links, wireless links, or any suitable combination thereof. For example, the links 183*e* and/or 183*f* may include wired links to the network 130, in addition to, or instead of, wireless radio connections.

In some embodiments, the external computing device 186 may medicate communication between the mobile computing devices 184.1 and 184.2 based upon location or other factors. In embodiments in which mobile computing devices 184.1 and 184.2 communicate directly with one another in a peer-to-peer fashion, network 130 may be bypassed and thus communications between mobile computing devices 184.1 and 184.2 and external computing device 186 may be unnecessary. For example, in some aspects, mobile computing device 184.1 may broadcast geographic location data and/or telematics data directly to mobile computing device 184.2. In this case, mobile computing device 184.2 may operate independently of network 130 to determine operating data, risks associated with operation, control actions to be taken, and/or alerts to be generated at mobile computing device 184.2 based upon the geographic location data, sensor data, and/or the autonomous operation feature data. In accordance with such aspects, network 130 and external computing device 186 may be omitted.

However, in other aspects, one or more of mobile computing devices 184.1 and/or 184.2 may work in conjunction with external computing device 186 to determine operating data, risks associated with operation, control actions to be taken, and/or alerts to be generated. For example, in some aspects, mobile computing device 184.1 may broadcast geographic location data and/or autonomous operation feature data, which is received by external computing device 186. In this case, external computing device 186 may be configured to determine whether the same or other information should be sent to mobile computing device 184.2 based upon the geographic location data, autonomous operation feature data, or data derived therefrom.

Mobile computing devices 184.1 and 184.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications. Such functionality may, in some embodiments be controlled in whole or part by a Data Application operating on the mobile computing devices 184, as discussed elsewhere herein. Such Data Application may communicate between the mobile computing devices 184 and one or more external computing devices 186 (such as servers 140) to facilitate centralized data collection and/or processing.

In some embodiments, the Data Application may facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. The user profile may further include information regarding user skill or risk levels in operating a vehicle manually or using semi-autonomous operation features, which information may vary by location, time, type of operation, environmental conditions, etc. In further embodiments, the Data Application may monitor vehicle operation or sensor data in real-time to make recommendations or for other purposes as described herein. The Data Application may further facilitate monitoring and/or assessment of the vehicle 182, such as by evaluating operating data to determine the condition of the vehicle or components thereof (e.g., sensors, autonomous operation features, etc.).

External computing device 186 may be configured to execute various software applications, algorithms, and/or other suitable programs. External computing device 186 may be implemented as any suitable type of device to facilitate the functionality as described herein. For example, external computing device 186 may be a server 140 as discuses elsewhere herein. As another example, the external computing device 186 may be another computing device associated with an operator or owner of a vehicle 182, such as a desktop or notebook computer. Although illustrated as a single device in FIG. 1B, one or more portions of external computing device 186 may be implemented as one or more storage devices that are physically co-located with external computing device 186, or as one or more storage devices utilizing different storage locations as a shared database structure (e.g. cloud storage).

In some embodiments, external computing device 186 may be configured to perform any suitable portion of the processing functions remotely that have been outsourced by one or more of mobile computing devices 184.1 and/or 184.2 (and/or vehicle controllers 181.1). For example, mobile computing device 184.1 and/or 184.2 may collect data (e.g., geographic location data and/or telematics data) as described herein, but may send the data to external computing device 186 for remote processing instead of processing the data locally. In such embodiments, external computing device 186 may receive and process the data to determine whether an anomalous condition exists and, if so, whether to send an alert notification to one or more mobile computing devices 184.1 and 184.2 or take other actions.

In one aspect, external computing device 186 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. Such insurance-related functions may include assisting insurance customers in evaluating autonomous operation features, limiting manual vehicle operation based upon risk levels, providing information regarding risk levels associated with autonomous and/or manual vehicle operation along routes, and/or determining repair/salvage information for damaged vehicles. For example, external computing device 186 may facilitate the receipt of autonomous operation or other data from one or more mobile computing devices 184.1-184.N, which may each be running a Data Application to obtain such data from autonomous operation features or sensors 120 associated therewith.

In aspects in which external computing device 186 facilitates communications with an insurer computing system (or is part of such a system), data received from one or more mobile computing devices 184.1-184.N may include user credentials, which may be verified by external computing device 186 or one or more other external computing devices, servers, etc. These user credentials may be associated with an insurance profile, which may include, for example, insurance policy numbers, a description and/or listing of insured assets, vehicle identification numbers of insured vehicles, addresses of insured structures, contact information, premium rates, discounts, etc. In this way, data received from one or more mobile computing devices 184.1-184.N may allow external computing device 186 to uniquely identify each insured customer and/or whether each identified insurance customer has installed the Data Application. In addition, external computing device 186 may facilitate the communication of the updated insurance policies, premiums, rates, discounts, etc., to insurance customers for their review, modification, and/or approval—such as via wireless communication or data transmission to one or more mobile computing devices 184.1-184.N over one or more radio frequency links or wireless communication channels.

In some aspects, external computing device 186 may facilitate indirect communications between one or more of mobile computing devices 184, vehicles 182, and/or smart infrastructure component 188 via network 130 or another suitable communication network, wireless communication channel, and/or wireless link. Smart infrastructure components 188 may be implemented as any suitable type of traffic infrastructure components configured to receive communications from and/or to send communications to other devices, such as mobile computing devices 184 and/or external computing device 186. Thus, smart infrastructure components 188 may include infrastructure components 126 having infrastructure communication devices 124. For example, smart infrastructure component 188 may be implemented as a traffic light, a railroad crossing signal, a construction notification sign, a roadside display configured to display messages, a billboard display, a parking garage monitoring device, etc.

In some embodiments, the smart infrastructure component 188 may include or be communicatively connected to one or more sensors (not shown) for detecting information relating to the condition of the smart infrastructure component 188, which sensors may be connected to or part of the infrastructure communication device 124 of the smart infrastructure component 188. The sensors (not shown) may generate data relating to weather conditions, traffic conditions, or operating status of the smart infrastructure component 188. The smart infrastructure component 188 may be configured to receive the sensor data generated and determine a condition of the smart infrastructure component 188, such as weather conditions, road integrity, construction, traffic, available parking spaces, etc.

In some aspects, smart infrastructure component 188 may be configured to communicate with one or more other devices directly and/or indirectly. For example, smart infrastructure component 188 may be configured to communicate directly with mobile computing device 184.2 via radio link 183d and/or with mobile computing device 184.1 via links 183b and 183f utilizing network 130. As another example, smart infrastructure component 188 may communicate with external computing device 186 via links 183e and 183f utilizing network 130. To provide some illustrative examples of the operation of the smart infrastructure component 188, if smart infrastructure component 188 is implemented as a smart traffic light, smart infrastructure component 188 may change a traffic light from green to red (or vice-versa) or adjust a timing cycle to favor traffic in one direction over another based upon data received from the vehicles 182. If smart infrastructure component 188 is implemented as a traffic sign display, smart infrastructure component 188 may display a warning message that an anomalous condition (e.g., an accident) has been detected ahead and/or on a specific road corresponding to the geographic location data.

Figure 2:
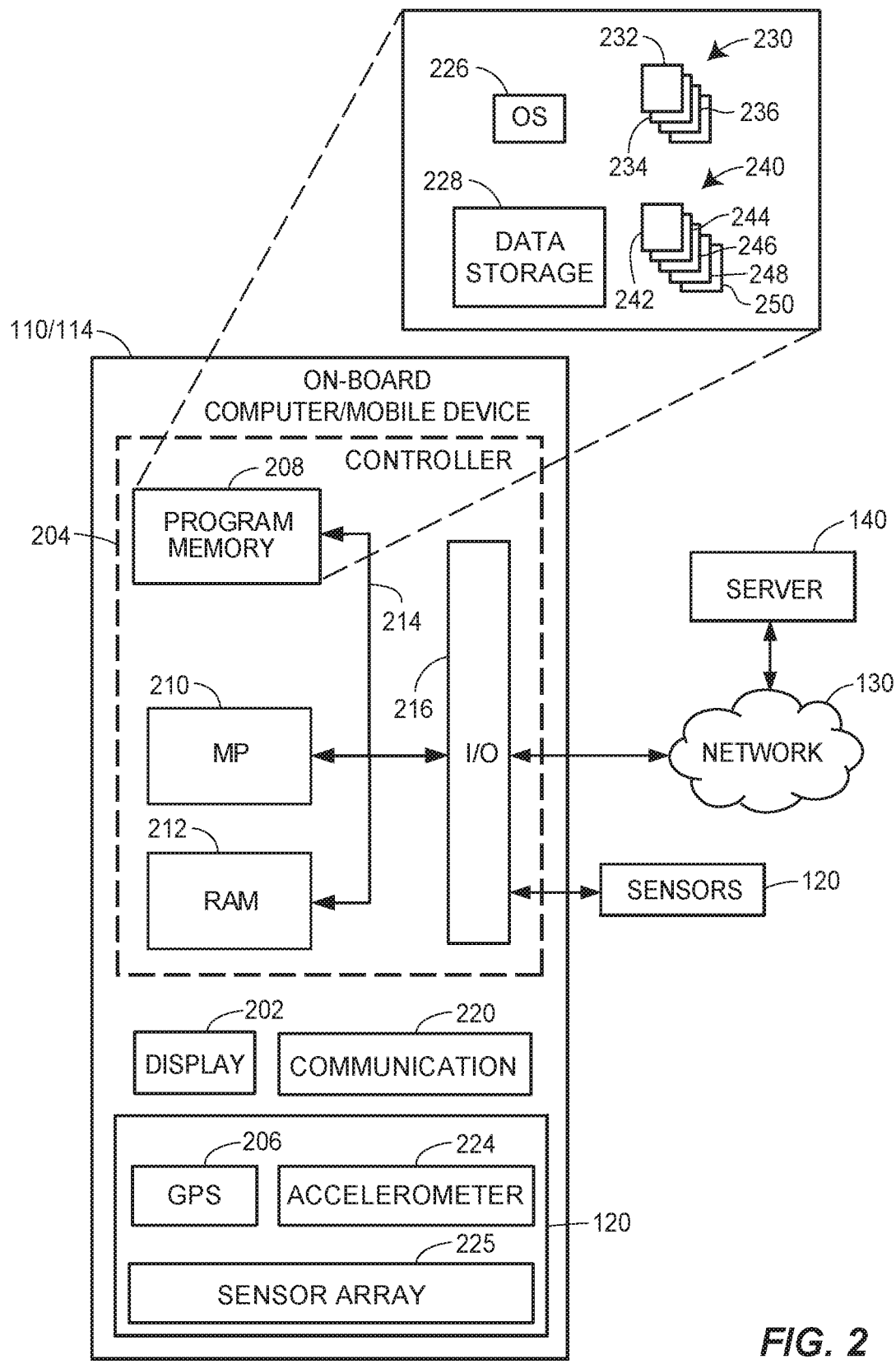
FIG. 2 illustrates a block diagram of an exemplary on-board computer or mobile device.

FIG. 2 illustrates a block diagram of an exemplary mobile device 110 or an exemplary on-board computer 114 consistent with the system 100 and the system 180. The mobile device 110 or on-board computer 114 may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 may be integrated into a single device, or either may perform the functions of both. The on-board computer 114 (or mobile device 110) interfaces with the sensors 120 to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an V/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300, described further below. Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include an autonomous operation monitoring application 236 that may be implemented as a series of machine-readable instructions for sending information regarding autonomous operation of the vehicle to the server 140 via the network 130. The Data Application for collecting, generating, processing, analyzing, transmitting, receiving, and/or acting upon autonomous operation feature data may also be stored as one of the plurality of applications 230 in the program memory 208 of the mobile computing device 110 or on-board computer 114, which may be executed by the one or more processors 210 thereof.

The plurality of software applications 230 may call various of the plurality of software routines 240 to perform functions relating to autonomous vehicle operation, monitoring, or communication. One of the plurality of software routines 240 may be a configuration routine 242 to receive settings from the vehicle operator to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 140 via the network 130. Yet another of the plurality of software routines 240 may be an autonomous communication routine 250 for receiving and transmitting information between the vehicle 108 and external sources to improve the effectiveness of the autonomous operation features. Any of the plurality of software applications 230 may be designed to operate independently of the software applications 230 or in conjunction with the software applications 230.

When implementing the exemplary autonomous vehicle operation method 300, the controller 204 of the on-board computer 114 may implement the autonomous vehicle operation application 232 to communicate with the sensors 120 to receive information regarding the vehicle 108 and its environment and process that information for autonomous operation of the vehicle 108. In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), or other sources of relevant information (e.g., weather, traffic, local amenities). Some external sources of information may be connected to the controller 204 via the network 130, such as the server 140 or internet-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

When implementing the autonomous operation feature monitoring method 400, the controller 204 may further implement the autonomous operation monitoring application 236 to communicate with the server 140 to provide information regarding autonomous vehicle operation. This may include information regarding settings or configurations of autonomous operation features, data from the sensors 120 regarding the vehicle environment, data from the sensors 120 regarding the response of the vehicle 108 to its environment, communications sent or received using the communication component 122 or the communication unit 220, operating status of the autonomous vehicle operation application 232 and the autonomous communication application 234, and/or control commands sent from the on-board computer 114 to the control components (not shown) to operate the vehicle 108. In some embodiments, control commands generated by the on-board computer 114 but not implemented may also be recorded and/or transmitted for analysis of how the autonomous operation features would have responded to conditions if the features had been controlling the relevant aspect or aspects of vehicle operation. The information may be received and stored by the server 140 implementing the autonomous operation information monitoring application 141, and the server 140 may then determine the effectiveness of autonomous operation under various conditions by implementing the feature evaluation application 142, which may include an assessment of autonomous operation features compatibility. The effectiveness of autonomous operation features and the extent of their use may be further used to determine one or more risk levels associated with operation of the autonomous vehicle by the server 140.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the vehicle 108 for autonomous operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the vehicle 108. Furthermore, the communication unit 220 may communicate with other autonomous vehicles, infrastructure, or other external sources of information to transmit and receive information relating to autonomous vehicle operation. The communication unit 220 may communicate with the external sources via the network 130 or via any suitable wireless communication protocol network, such as wireless telephony (e.g., GSM, CDMA, LTE, etc.), Wi-Fi (802.11 standards). WiMAX, Bluetooth, infrared or radio frequency communication, etc. Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Data Application

The mobile device 110 and/or on-board computer 114 may run a Data Application to collect, transmit, receive, and/or process autonomous operation feature data. Such autonomous operation feature data may include data directly generated by autonomous operation features, such as control commands used in operating the vehicle 108. Similarly, such autonomous operation feature data may include shadow control commands generated by the autonomous operation features but not actually used in operating the vehicle, such as may be generated when the autonomous operation features are disabled. The autonomous operation feature data may further include non-control data generated by the autonomous operation features, such as determinations regarding environmental conditions in the vehicle operating environment in which the vehicle 108 operates (e.g., traffic conditions, construction locations, pothole locations, worn lane markings, corners with obstructed views, etc.). The environmental data may include data or information associated with (i) road construction; (ii) flooded roads; (iii) pot holes; (iv) debris in the road; (v) road marking visibility; (vi) presence of bicycle lanes; (vii) inoperable traffic lights; (viii) degree of road lighting from street lights: (ix) number of pedestrians nearby; (x) presence of school bus stops; (xi) presence of school zones; (xii) traffic directed by emergency personnel; (xiii) traffic accidents; (xiv) detours, and/or (xv) other anomalies. The autonomous operation feature data may yet further include sensor data generated by (or derived from sensor data generated by) sensors 120 utilized by the autonomous operation features. For example, data from LIDAR and ultrasonic sensors may be used by vehicles for autonomous operation. Such data captures a much more detailed and complete representation of the conditions in which the vehicle 108 operates than traditional vehicle operation metrics (e.g. miles driven) or non-autonomous telematics data (e.g., acceleration, position, and time).

Autonomous operation feature data may be processed and used by the Data Application to determine information regarding the vehicle 108, its operation, or its operating environment. The autonomous operation feature data may further be communicated by the Data Application to a server 140 via network 130 for processing and/or storage. In some embodiments, the autonomous operation feature data (or information derived therefrom) may be transmitted directly via radio links 183 or indirectly via network 130 from the vehicle 108 to other vehicles (or to mobile devices 110). By communicating information associated with the autonomous operation feature data to other nearby vehicles, the other vehicles or their operators may make use of such data for routing, control, or other purposes. This may be particularly valuable in providing detailed information regarding a vehicle environment (e.g., traffic, accidents, flooding, ice, etc.) collected by a Data Application of an autonomous vehicle 108 to a driver of a non-autonomous vehicle via a Data Application of a mobile device 110 associated with the driver. For example, ice patches may be identified by an autonomous operation feature of a vehicle controller 181.1 of vehicle 182.1 and transmitted via the Data Application operating in the mobile computing device 184.1 over the network 130 to the mobile computing device 184.2, where a warning regarding the ice patches may be presented to the driver of vehicle 182.2. As another example, locations of emergency vehicles or accidents may be determined and communicated between vehicles 182, such as between an autonomous vehicle 182.1 and a traditional (non-autonomous) vehicle 182.2.

In further embodiments, a Data Application may serve as an interface between the user and an autonomous vehicle 108, via the user's mobile device 110 and/or the vehicle's on-board computer 114. The user may interact with the Data Application to locate, retrieve, park, control, or monitor the vehicle 108. For example, the Data Application may be used to select a destination and route the vehicle 108 to the destination, which may include controlling the vehicle to travel to the destination in a fully autonomous mode. In some embodiments, the Data Application may further determine and/or provide information regarding the vehicle 108, such as the operating status or condition of autonomous operation features, sensors, or other vehicle components (e.g., tire pressure). In yet further embodiments, the Data Application may be configured to assess risk levels associated with vehicle operation based upon location, autonomous operation feature use (including settings), operating conditions, or other factors. Such risk assessment may be further used in recommending autonomous feature use levels, generating warnings to a vehicle operator, or adjusting an insurance policy associated with the vehicle 108.

Data Applications may be installed and running on a plurality of mobile devices 110 and/or on-board computers 114 in order to facilitate data sharing and other functions as described herein. Additionally, such Data Applications may provide data to, and receive data from, one or more servers 140. For example, a Data Application running on a user's mobile device 110 may communicate location data to a server 140 via the network 130. The server 140 may then process the data to determine a route, risk level, recommendation, or other action. The server 140 may then communicate the determined information to the mobile device 110 and/or on-board computer 114, which may cause the vehicle 108 to operate in accordance with the determined information (e.g., travel along a determined optimal route). Thus, the Data Application may facilitate data communication between the front-end components 102 and the back-end components 104, allowing more efficient processing and data storage.

Data Acquisition

In one aspect, the present embodiments may relate to data acquisition. Data may be gathered via devices employing wireless communication technology, such as Bluetooth or other IEEE communication standards. In one embodiment, a Bluetooth enabled smartphone or mobile device, and/or an in-dash smart and/or communications device may collect data. The data associated with the vehicle, and/or vehicle or driver performance, that is gathered or collected at, or on, the vehicle may be wirelessly transmitted to a remote processor or server, such as a remote processor or server associated with an insurance provider. The mobile device 110 may receive the data from the on-board computer 114 or the sensors 120, and may transmit the received data to the server 140 via the network 130, and the data may be stored in the database 146. In some embodiments, the transmitted data may include real-time sensor data, a summary of the sensor data, processed sensor data, operating data, environmental data, communication data, or a log such data.

Data may be generated by autonomous or semi-autonomous vehicles and/or vehicle mounted sensors (or smart sensors), and then collected by vehicle mounted equipment or processors, including Bluetooth devices, and/or an insurance provider remote processor or server. The data gathered may be used to analyze vehicle decision making. A processor may be configured to generate data on what an autonomous or semi-autonomous vehicle would have done in a given situation had the driver not taken over manual control/driving of the vehicle or alternative control actions not taken by the autonomous or semi-autonomous operation features. This type of control decision data (related to vehicle decision making) may be useful with respect to analyzing hypothetical situations.

In one embodiment, an application (i.e., the Data Application), or other computer or processor instructions, may interact with a vehicle to receive and/or retrieve data from autonomous or semi-autonomous processors and sensors 120. The data retrieved may be related to radar, cameras, sensor output, computer instructions, or application output. Other data related to a smart vehicle controller, car navigation unit information (including route history information and typical routes taken), GPS unit information, odometer and/or speedometer information, and smart equipment data may also be gathered or collected. The application and/or other computer instructions may be associated with an insurance provider remote processor or server.

The control decision data may further include information regarding control decisions generated by one or more autonomous operation features within the vehicle. The operating data and control decision data gathered, collected, and/or acquired may facilitate remote evaluation and/or analysis of what the autonomous or semi-autonomous vehicle was "trying to do" (brake, slow, turn, accelerate, etc.) during operation, as well as what the vehicle actually did do. The data may reveal decisions, and the appropriateness thereof, made by the artificial intelligence or computer instructions associated with one or more autonomous or semi-autonomous vehicle technologies, functionalities, systems, and/or pieces of equipment. The data may include information related to what the vehicle would have done in a situation if the driver had not taken over (beginning manual vehicle control). Such data may include both the control actions taken by the vehicle and control actions the autonomous or semi-autonomous operation features would have caused the vehicle to take. Thus, in some embodiments, the control decisions data may include information regarding control decisions not implemented by the autonomous operation features to control the vehicle. This may occur when an autonomous operation feature generates a control decision or associated control signal, but the control decision or signal is prevented from controlling the vehicle because the autonomous feature or function is disabled, the control decision is overridden by the vehicle operator, the control signal would conflict with another control signal generated by another autonomous operation feature, a more preferred control decision is generated, or an error occurs in the on-board computer 114 or the control system of the vehicle.

For example, a vehicle operator may disable or constrain the operation of some or all autonomous operation features, such as where the vehicle is operated manually or semi-autonomously. The disabled or constrained autonomous operation features may, however, continue to receive sensor data and generate control decision data that is not implemented. Similarly, one or more autonomous operation features may generate more than one control decision in a relevant period of time as alternative control decisions. Some of these alternative control decisions may not be selected by the autonomous operation feature or an autonomous operation control system to control the vehicle. For example, such alternative control decisions may be generated based on different sets of sensor or communication data from different sensors 120 or include or excluding autonomous communication data. As another example, the alternative control decisions may be generated faster than they can be implemented by the control system of the vehicle, thus preventing all control decisions from being implemented.

In addition to control decision data, other information regarding the vehicle, the vehicle environment, or vehicle operation may be collected, generated, transmitted, received, requested, stored, or recorded in connection with the control decision data. As discussed elsewhere herein, additional operating data including sensor data from the sensors 120, autonomous communication data from the communication component 122 or the communication module 220, location data, environmental data, time data, settings data, configuration data, and/or other relevant data may be associated with the control decision data. In some embodiments, a database or log may store the control decision data and associated information. In further embodiments, the entries in such log or database may include a timestamp indicating the date, time, location, vehicle environment, vehicle condition, autonomous operation feature settings, and/or autonomous operation feature configuration information associated with each entry. Such data may facilitate evaluating the autonomous or semi-autonomous technology, functionality, system, and/or equipment in hypothetical situations and/or may be used to calculate risk, and in turn adjust insurance policies, premiums, discounts, etc.

The data gathered may be used to evaluate risk associated with the autonomous or semi-autonomous operation feature or technology at issue. As discussed elsewhere herein, information regarding the operation of the vehicle may be monitored or associated with test data or actual loss data regarding losses associated with insurance policies for other vehicles having the autonomous technology or feature to determine risk levels and/or risk profiles. Specifically, the control decision data, sensor data, and other operating data discussed above may be used to determine risk levels, loss models, and/or risk profiles associated with one or more autonomous or semi-autonomous operation features. External data may further be used to determine risk, as discussed below. Such determined risk levels may further be used to determine insurance rates, premiums, discounts, or costs as discussed in greater detail below.

In one embodiment, the data gathered may be used to determine an average distance to another vehicle ahead of, and/or behind, the vehicle during normal use of the autonomous or semi-autonomous vehicle technology, functionality, system, and/or equipment. A safe driving distance to other vehicles on the road may lower the risk of accident. The data gathered may also relate to how quickly the technology, functionality, system, and/or equipment may properly stop or slow a vehicle in response to a light changing from green to yellow, and/or from yellow to red. Timely stopping at traffic lights may also positively impact risk of collision. The data gathered may indicate issues not entirely related to the autonomous or semi-autonomous technology, functionality, system, and/or equipment. For instance, tires spinning and low vehicle speed may be monitored and identified to determine that vehicle movement was being affected by the weather (as compared to the technology, functionality, system, and/or equipment during normal operation). Vehicle tires may spin with little or no vehicle movement in snow, rain, mud, ice, etc.

The data gathered may indicate a current version of artificial intelligence or computer instructions that the autonomous or semi-autonomous system or equipment is utilizing. A collision risk factor may be assigned to each version of computer instructions. The insurance provider may then adjust or update insurance policies, premiums, rates, discounts, and/or other insurance-related items based upon the collision risk factor and/or the artificial intelligence or computer instruction versions presently employed by the vehicle (and/or upgrades there to).

The decision and operating data gathered may be merged with outside data, such as information related to weather, traffic, construction, and/or other factors, and/or collected from sources besides the vehicle. In some embodiments, such data from outside the vehicle may be combined with the control decision data and other operating data discussed above to determine risks associated with the operation of one or more autonomous or semi-autonomous operation features. External data regarding the vehicle environment may be requested or received via the network 130 and associated with the entries in the log or database based on the timestamp. For example, the location, date, and time of a timestamp may be used to determine weather and traffic conditions in which vehicle operation occurred. Additional external data may include road conditions, weather conditions, nearby traffic conditions, type of road, construction conditions, presence of pedestrians, presence of other obstacles, and/or availability of autonomous communications from external sources. For instance, weather may impact certain autonomous or semi-autonomous technology, functionality, system, and/or equipment performance, such as fog, visibility, wind, rain, snow, and/or ice. Certain autonomous or semi-autonomous functionality may have degraded performance: (1) on ice covered roads; (2) during snow or rain, and/or on snow or rain covered roads; (3) during poor visibility conditions, such as foggy weather; (4) in "stop and go" traffic, such as during rush hour traffic, or slow moving traffic through high construction areas or downtown areas; and/or (5) caused by other factors.

The system and method may consider the geographical area associated with the user, or the owner or operator of a vehicle. For instance, rain mitigation functionality or technology for vehicles may be pertinent to reducing the amount of accidents and/or the severity of such accidents in areas of high rain fall, such as the Pacific Northwest or Florida. On the other hand, such functionality may have less of a beneficial impact on accidents or potential accidents in desert locations, such as Nevada or New Mexico. Construction-related data may also be collected and analyzed. Construction-related accident avoidance and/or mitigation technology, functionality, systems, or associated equipment may be more pertinent in large urban areas involving significant and lengthy construction or road connector projects that may include frequently changing travel patterns with little notice to drivers.

The data gathered may relate to autonomous vehicle telematics variables. Usage of other technologies and functionalities (including the technologies and functionalities discussed elsewhere herein) may be monitored, and recommended usages thereof (and associated insurance savings) may be provided to the insured or driver for their review and/or approval. Other manners of saving money on existing auto insurance coverage may be provided to the driver via wireless communication. For instance, a percentage of time that the vehicle is in a (1) "manual" mode or operation; (2) semi-automated, semi-automatic, or "semi-autonomous" mode or operation; and/or (3) fully automated, fully automatic, or fully "autonomous" mode or operation may be determined from vehicle sensor data that is remotely collected, such as at or by an insurance provider remote processor or server.

Also, the data gathered may be used to provide feedback to the customer or insured. For instance, if the vehicle is presently traveling on the highway, a recommendation or offer may be presented to the driver, such as via wireless communication with the vehicle that indicates that if the driver places the vehicle into autonomous or semi-autonomous driving mode, the risk of collision may be reduced and/or the driver may be receive a discount, and/or lower premium on his or her auto insurance. Other manners of potential risk reductions may also be communicated to the driver or owner of the vehicle. For instance, recommendations and/or adjustments to insurance policies, premiums, rates, discounts, rewards, and/or other insurance-related items may be based upon driver characteristics or age, such as beginning or teenage drivers.

The data gathered may originate from various smart parts and/or pieces of smart equipment mounted on a vehicle, including parts configured for wired or wireless communication. For instance, a vehicle may be equipped with smart brakes; smart tail, head, or turn lights; smart tires; etc. Each piece of smart equipment may have a wired or wireless transmitter. Each piece of smart equipment may be configured to monitor its operation, and/or indicate or communicate a warning to the driver when it is not operating properly. Such smart equipment may be included within the sensors 120.

As an example, when a rear brake light is out, such as from faulty repair or from normal burn out, that fact may be detected by smart vehicle functionality and the driver may be promptly notified. As a result, the driver may be able to repair the faulty brake light before an accident caused by the faulty brake light occurs. In another embodiment, the data gathered may also indicate window wipers are not operating properly, and need to be replaced. The insurance provider may adjust or update insurance policies, premiums, rates, discounts, and/or other insurance-related items based upon the smart equipment warning functionality that may alert drivers of vehicle equipment or vehicle safety equipment (lights, brakes, etc.) that need to be replaced or repaired, and thus may reduce collision risk. In addition to addressing liability for collision risk, the technology may also reduce risk of theft. For instance, stolen vehicles may be tracked via on-board GPS units and wireless transmitters. Also, the breaking and entering, and/or hot wiring, of vehicles may be more difficult through the use of anti-hacking measures for smart vehicles or vehicles with electrical or electronic control systems. The insurance provider may adjust insurance premiums, rates, and/or other insurance-related items based upon the reduced risk of theft.

Exemplary Autonomous Vehicle Operation Method

Figure 3:
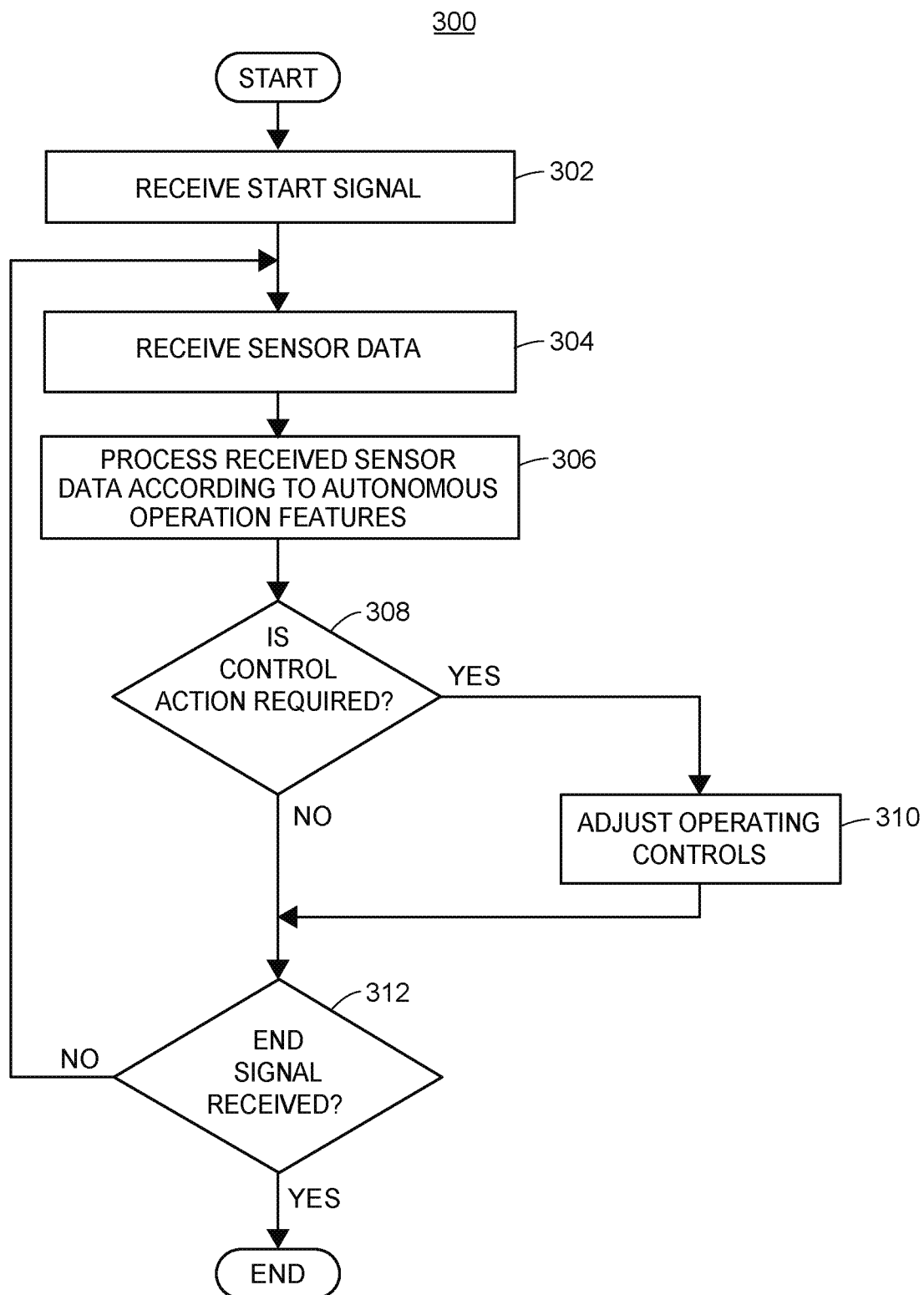
FIG. 3 illustrates a flow diagram of an exemplary autonomous vehicle operation method.

FIG. 3 illustrates a flow diagram of an exemplary autonomous vehicle operation method 300, which may be implemented by the autonomous vehicle data system 100. The method 300 may begin when the controller 204 receives a start signal (block 302). The start signal may be a command from the vehicle operator through the user-input device to enable or engage one or more autonomous operation features of the vehicle 108. In some embodiments, the vehicle operator 108 may further specify settings or configuration details for the autonomous operation features. For fully autonomous vehicles, the settings may relate to one or more destinations, route preferences, fuel efficiency preferences, speed preferences, or other configurable settings relating to the operation of the vehicle 108. In some embodiments, fully autonomous vehicles may include additional features or settings permitting them to operate without passengers or vehicle operators within the vehicle. For example, a fully autonomous vehicle may receive an instruction to find a parking space within the general vicinity, which the vehicle may do without the vehicle operator. The vehicle may then be returned to a selected location by a request from the vehicle operator via a mobile device 110 or otherwise. This feature may further be adapted to return a fully autonomous vehicle if lost or stolen.

For other autonomous vehicles, the settings may include enabling or disabling particular autonomous operation features, specifying thresholds for autonomous operation, specifying warnings or other information to be presented to the vehicle operator, specifying autonomous communication types to send or receive, specifying conditions under which to enable or disable autonomous operation features, or specifying other constraints on feature operation. For example, a vehicle operator may set the maximum speed for an adaptive cruise control feature with automatic lane centering. In some embodiments, the settings may further include a specification of whether the vehicle 108 should be operating as a fully or partially autonomous vehicle.

In embodiments where only one autonomous operation feature is enabled, the start signal may consist of a request to perform a particular task (e.g., autonomous parking) or to enable a particular feature (e.g., autonomous braking for collision avoidance). In other embodiments, the start signal may be generated automatically by the controller 204 based upon predetermined settings (e.g. when the vehicle 108 exceeds a certain speed or is operating in low-light conditions). In some embodiments, the controller 204 may generate a start signal when communication from an external source is received (e.g., when the vehicle 108 is on a smart highway or near another autonomous vehicle). In some embodiments, the start signal may be generated by or received by the Data Application running on a mobile device 110 or on-board computer 114 within the vehicle 108. The Data Application may further set or record settings for one or more autonomous operation features of the vehicle 108.

After receiving the start signal at block 302, the controller 204 receives sensor data from the sensors 120 during vehicle operation (block 304). In some embodiments, the controller 204 may also receive information from external sources through the communication component 122 or the communication unit 220. The sensor data may be stored in the RAM 212 for use by the autonomous vehicle operation application 232. In some embodiments, the sensor data may be recorded in the data storage 228 or transmitted to the server 140 via the network 130. The Data Application may receive the sensor data, or a portion thereof, and store or transmit the received sensor data. In some embodiments, the Data Application may process or determine summary information from the sensor data before storing or transmitting the summary information. The sensor data may alternately either be received by the controller 204 as raw data measurements from one of the sensors 120 or may be preprocessed by the sensor 120 prior to being received by the controller 204. For example, a tachometer reading may be received as raw data or may be preprocessed to indicate vehicle movement or position. As another example, a sensor 120 comprising a radar or LIDAR unit may include a processor to preprocess the measured signals and send data representing detected objects in 3-dimensional space to the controller 204.

The autonomous vehicle operation application 232 or other applications 230 or routines 240 may cause the controller 204 to process the received sensor data in accordance with the autonomous operation features (block 306). The controller 204 may process the sensor data to determine whether an autonomous control action is required or to determine adjustments to the controls of the vehicle 108 (i.e., control commands). For example, the controller 204 may receive sensor data indicating a decreasing distance to a nearby object in the vehicle's path and process the received sensor data to determine whether to begin braking (and, if so, how abruptly to slow the vehicle 108). As another example, the controller 204 may process the sensor data to determine whether the vehicle 108 is remaining with its intended path (e.g., within lanes on a roadway). If the vehicle 108 is beginning to drift or slide (e.g., as on ice or water), the controller 204 may determine appropriate adjustments to the controls of the vehicle to maintain the desired bearing. If the vehicle 108 is moving within the desired path, the controller 204 may nonetheless determine whether adjustments are required to continue following the desired route (e.g., following a winding road). Under some conditions, the controller 204 may determine to maintain the controls based upon the sensor data (e.g., when holding a steady speed on a straight road).

In some embodiments, the Data Application may record information related to the processed sensor data, including whether the autonomous operation features have determined one or more control actions to control the vehicle and/or details regarding such control actions. The Data Application may record such information even when no control actions are determined to be necessary or where such control actions are not implemented. Such information may include information regarding the vehicle operating environment determined from the processed sensor data (e.g., construction, other vehicles, pedestrians, anomalous environmental conditions, etc.). The information collected by the Data Application may further include an indication of whether and/or how the control actions are implemented using control components of the vehicle 108.

When the controller 204 determines an autonomous control action is required (block 308), the controller 204 may cause the control components of the vehicle 108 to adjust the operating controls of the vehicle to achieve desired operation (block 310). For example, the controller 204 may send a signal to open or close the throttle of the vehicle 108 to achieve a desired speed. Alternatively, the controller 204 may control the steering of the vehicle 108 to adjust the direction of movement. In some embodiments, the vehicle 108 may transmit a message or indication of a change in velocity or position using the communication component 122 or the communication module 220, which signal may be used by other autonomous vehicles to adjust their controls. As discussed elsewhere herein, the controller 204 may also log or transmit the autonomous control actions to the server 140 via the network 130 for analysis. In some embodiments, an application (which may be a Data Application) executed by the controller 204 may communicate data to the server 140 via the network 130 or may communicate such data to the mobile device 110 for further processing, storage, transmission to nearby vehicles or infrastructure, and/or communication to the server 140 via network 130.

The controller 204 may continue to receive and process sensor data at blocks 304 and 306 until an end signal is received by the controller 204 (block 312). The end signal may be automatically generated by the controller 204 upon the occurrence of certain criteria (e.g., the destination is reached or environmental conditions require manual operation of the vehicle 108 by the vehicle operator). Alternatively, the vehicle operator may pause, terminate, or disable the autonomous operation feature or features using the user-input device or by manually operating the vehicle's controls, such as by depressing a pedal or turning a steering instrument. When the autonomous operation features are disabled or terminated, the controller 204 may either continue vehicle operation without the autonomous features or may shut off the vehicle 108, depending upon the circumstances.

Where control of the vehicle 108 must be returned to the vehicle operator, the controller 204 may alert the vehicle operator in advance of returning to manual operation. The alert may include a visual, audio, or other indication to obtain the attention of the vehicle operator. In some embodiments, the controller 204 may further determine whether the vehicle operator is capable of resuming manual operation before terminating autonomous operation. If the vehicle operator is determined not to be capable of resuming operation, the controller 204 may cause the vehicle to stop or take other appropriate action.

To control the vehicle 108, the autonomous operation features may generate and implement control decisions relating to the control of the motive, steering, and stopping components of the vehicle 108. The control decisions may include or be related to control commands issued by the autonomous operation features to control such control components of the vehicle 108 during operation. In some embodiments, control decisions may include decisions determined by the autonomous operation features regarding control commands such feature would have issued under the conditions then occurring, but which control commands were not issued or implemented. For example, an autonomous operation feature may generate and record shadow control decisions it would have implemented if engaged to operate the vehicle 108 even when the feature is disengaged (or engaged using other settings from those that would produce the shadow control decisions).

Data regarding the control decisions actually implemented and/or the shadow control decisions not implemented to control the vehicle 108 may be recorded for use in assessing autonomous operation feature effectiveness, accident reconstruction and fault determination, feature use or settings recommendations, risk determination and insurance policy adjustments, or other purposes as described elsewhere herein. For example, actual control decisions may be compared against control decisions that would have been made by other systems, software versions, or with additional sensor data or communication data.

As used herein, the terms "preferred" or "preferably made" control decisions mean control decisions that optimize some metric associated with risk under relevant conditions. Such metric may include, among other things, a statistical correlation with one or more risks (e.g., risks related to a vehicle collision) or an expected value associated with risks (e.g., a risk-weighted expected loss associated with potential vehicle accidents). The preferably made, or preferred or recommended, control decisions discussed herein may include control decisions or control decision outcomes that are less risky, have lower risk or the lowest risk of all the possible or potential control decisions given various operating conditions, and/or are otherwise ideal, recommended, or preferred based upon various operating conditions, including autonomous system or feature capability; current road, environmental or weather, traffic, or construction conditions through which the vehicle is traveling; and/or current versions of autonomous system software or components that the autonomous vehicle is equipped with and using.

The preferred or recommended control decisions may result in the lowest level of potential or actual risk of all the potential or possible control decisions given a set of various operating conditions and/or system features or capabilities. Alternatively, the preferred or recommended control decisions may result in a lower level of potential or actual risk (for a given set of operating conditions) to the autonomous vehicle and passengers, and other people or vehicles, than some of the other potential or possible control decisions that could have been made by the autonomous system or feature.

Exemplary Monitoring Method

Figure 4A:
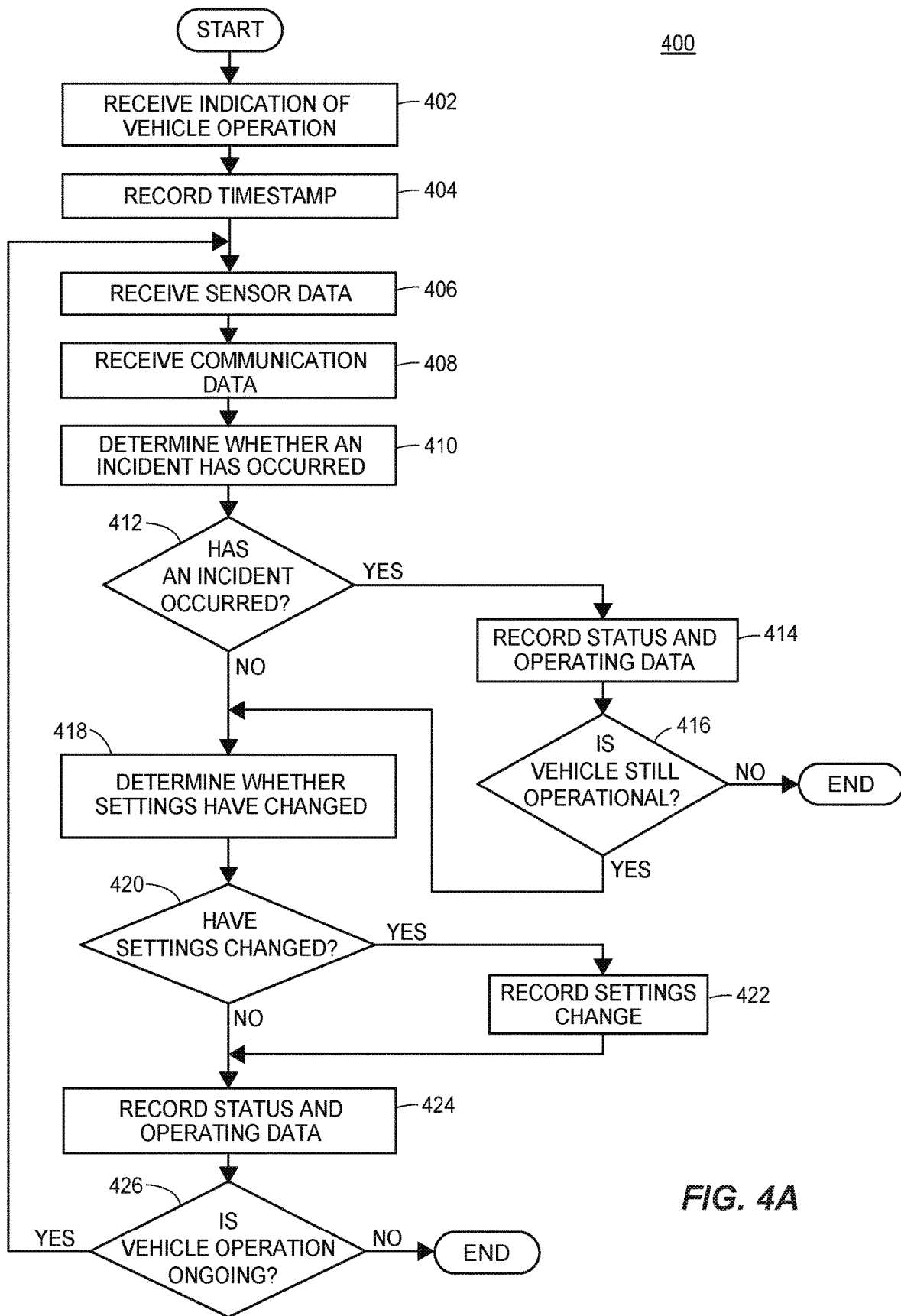
FIGS. 4A-B illustrate flow diagrams of exemplary autonomous vehicle operation monitoring methods for obtaining and recording information during vehicle operation.

FIG. 4A is a flow diagram depicting an exemplary autonomous vehicle operation monitoring method 400, which may be implemented by the autonomous vehicle data system 100. The method 400 monitors the operation of the vehicle 108 and transmits information regarding the vehicle 108 to the server 140, which information may then be used to determine autonomous operation feature usage or effectiveness. The method 400 may be used for monitoring the state of the vehicle 108, for providing data to other vehicles 182, for responding to emergencies or unusual situations during vehicle use, for testing autonomous operation features in a controlled environment, for determining actual feature use during vehicle operation outside a test environment, for assessment of feature operation, and/or for other purposes described herein. In alternative embodiments, the method 400 may be implemented whenever the vehicle 108 is in operation (manual or autonomous) or only when the autonomous operation features are enabled. The method 400 may likewise be implemented as either a real-time process, in which information regarding the vehicle 108 is communicated to the server 140 while monitoring is ongoing, or as a periodic process, in which the information is stored within the vehicle 108 and communicated to the server 140 at intervals (e.g., upon completion of a trip or when an incident occurs). In some embodiments, the method 400 may communicate with the server 140 in real-time when certain conditions exist (e.g., when a sufficient data connection through the network 130 exists or when no roaming charges would be incurred). In further embodiments, a Data Application executed by the mobile device 110 and/or on-board computer 114 may perform such monitoring, recording, and/or communication functions, including any of the functions described below with respect to blocks 402-434.

The method 400 may begin when the controller 204 receives an indication of vehicle operation (block 402). The indication may be generated when the vehicle 108 is started or when an autonomous operation feature is enabled by the controller 204 or by input from the vehicle operator, as discussed above. In response to receiving the indication, the controller 204 may create a timestamp (block 404). The timestamp may include information regarding the date, time, location, vehicle environment, vehicle condition, and autonomous operation feature settings or configuration information. The date and time may be used to identify one vehicle trip or one period of autonomous operation feature use, in addition to indicating risk levels due to traffic or other factors. The additional location and environmental data may include information regarding the position of the vehicle 108 from the GPS unit 206 and its surrounding environment (e.g., road conditions, weather conditions, nearby traffic conditions, type of road, construction conditions, presence of pedestrians, presence of other obstacles, availability of autonomous communications from external sources, etc.). Vehicle condition information may include information regarding the type, make, and model of the vehicle 108, the age or mileage of the vehicle 108, the status of vehicle equipment (e.g., tire pressure, non-functioning lights, fluid levels, etc.), or other information relating to the vehicle 108. In some embodiments, vehicle condition information may further include information regarding the sensors 120, such as type, configuration, or operational status (which may be determined, for example, from analysis of actual or test data from the sensors). In some embodiments, the timestamp may be recorded on the client device 114, the mobile device 110, or the server 140.

The autonomous operation feature settings may correspond to information regarding the autonomous operation features, such as those described above with reference to the autonomous vehicle operation method 300. The autonomous operation feature configuration information may correspond to information regarding the number and type of the sensors 120 (which may include indications of manufacturers and models of the sensors 120), the disposition of the sensors 120 within the vehicle 108 (which may include disposition of sensors 120 within one or more mobile devices 110), the one or more autonomous operation features (e.g., the autonomous vehicle operation application 232 or the software routines 240), autonomous operation feature control software, versions of the software applications 230 or routines 240 implementing the autonomous operation features, or other related information regarding the autonomous operation features.

For example, the configuration information may include the make and model of the vehicle 108 (indicating installed sensors 120 and the type of on-board computer 114), an indication of a malfunctioning or obscured sensor 120 in part of the vehicle 108, information regarding additional after-market sensors 120 installed within the vehicle 108, a software program type and version for a control program installed as an application 230 on the on-board computer 114, and software program types and versions for each of a plurality of autonomous operation features installed as applications 230 or routines 240 in the program memory 208 of the on-board computer 114.

During operation, the sensors 120 may generate sensor data regarding the vehicle 108 and its environment, which may include other vehicles 182 within the operating environment of the vehicle 108. In some embodiments, one or more of the sensors 120 may preprocess the measurements and communicate the resulting processed data to the on-board computer 114 and/or the mobile device 110. The controller 204 may receive sensor data from the sensors 120 (block 406). The sensor data may include information regarding the vehicle's position, speed, acceleration, direction, and responsiveness to controls. The sensor data may further include information regarding the location and movement of obstacles or obstructions (e.g., other vehicles, buildings, barriers, pedestrians, animals, trees, or gates), weather conditions (e.g. precipitation, wind, visibility, or temperature), road conditions (e.g., lane markings, potholes, road material, traction, or slope), signs or signals (e.g., traffic signals, construction signs, building signs or numbers, or control gates), or other information relating to the vehicle's environment. In some embodiments, sensors 120 may indicate the number of passengers within the vehicle 108, including an indication of whether the vehicle is entirely empty.

In addition to receiving sensor data from the sensors 120, in some embodiments the controller 204 may receive autonomous communication data from the communication component 122 or the communication module 220 (block 408). The communication data may include information from other autonomous vehicles (e.g., sudden changes to vehicle speed or direction, intended vehicle paths, hard braking, vehicle failures, collisions, or maneuvering or stopping capabilities), infrastructure (road or lane boundaries, bridges, traffic signals, control gates, or emergency stopping areas), or other external sources (e.g., map databases, weather databases, or traffic and accident databases). In some embodiments, the communication data may include data from non-autonomous vehicles, which may include data regarding vehicle operation or anomalies within the operating environment determined by a Data Application operating on a mobile device 110 or on-board computer 114. The communication data may be combined with the received sensor data received to obtain a more robust understanding of the vehicle environment. For example, the server 140 or the controller 204 may combine sensor data indicating frequent changes in speed relative to tachometric data with map data relating to a road upon which the vehicle 108 is traveling to determine that the vehicle 108 is in an area of hilly terrain. As another example, weather data indicating recent snowfall in the vicinity of the vehicle 108 may be combined with sensor data indicating frequent slipping or low traction to determine that the vehicle 108 is traveling on a snow-covered or icy road.

The controller 204 may process the sensor data, the communication data, and the settings or configuration information to determine whether an incident has occurred (block 410). As used herein, an "incident" is an occurrence during operation of an autonomous vehicle outside of normal safe operating conditions, such that one or more of the following occurs: (i) there is an interruption of ordinary vehicle operation, (ii) there is damage to the vehicle or other property, (iii) there is injury to a person, (iv) the conditions require action to be taken by a vehicle operator, autonomous operation feature, pedestrian, or other party to avoid damage or injury, and/or (v) an anomalous condition is detected that requires an adjustment to or outside of ordinary vehicle operation. Incidents may include collisions, hard braking, hard acceleration, evasive maneuvering, loss of traction, detection of objects within a threshold distance from the vehicle 108, alerts presented to the vehicle operator, component failure, inconsistent readings from sensors 120, or attempted unauthorized access to the on-board computer by external sources. Incidents may also include accidents, vehicle breakdowns, flat tires, empty fuel tanks, or medical emergencies. Incidents may further include identification of construction requiring the vehicle to detour or stop, hazardous conditions (e.g., fog or road ice), or other anomalous environmental conditions.

In some embodiments, the controller 204 may anticipate or project an expected incident based upon sensor or external data, allowing the controller 204 to send control signals to minimize the negative effects of the incident. For example, the controller 204 may cause the vehicle 108 to slow and move to the shoulder of a road immediately before running out of fuel. As another example, adjustable seats within the vehicle 108 may be adjusted to better position vehicle occupants in anticipation of a collision, windows may be opened or closed, or airbags may be deployed.

When an incident is determined to have occurred (block 412), information regarding the incident and the vehicle status may be recorded (block 414), either in the data storage 228 or the database 146. The information recorded may include sensor data, communication data, and settings or configuration information prior to, during, and immediately following the incident. In some embodiments, a preliminary determination of fault may also be produced and stored. The information may further include a determination of whether the vehicle 108 has continued operating (either autonomously or manually) or whether the vehicle 108 is capable of continuing to operate in compliance with applicable safety and legal requirements. If the controller 204 determines that the vehicle 108 has discontinued operation or is unable to continue operation (block 416), the method 400 may terminate. If the vehicle 108 continues operation, then the method 400 may continue as described below with reference to block 418.

Figure 4B:
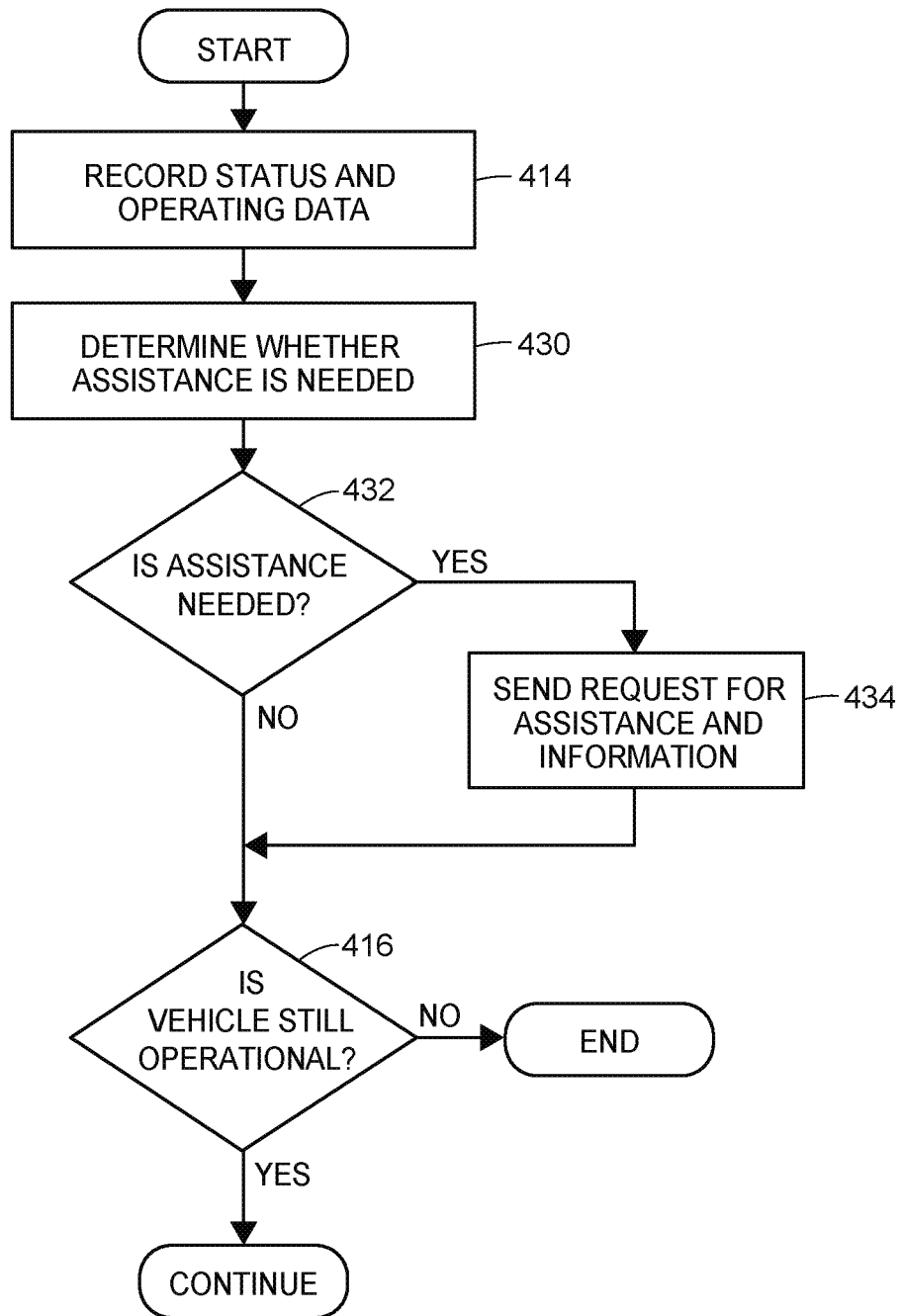

FIG. 4B illustrates an alternative portion of the method 400 following an incident. When an incident is determined to have occurred (block 412), the controller 204 or the server 140 may record status and operating information (block 414), as above. In some instances, the incident may interrupt communication between the vehicle 108 and the server 140 via network 130, such that not all information typically recorded will be available for recordation and analysis by the server 140. Based upon the recorded data, the server 140 or the controller 204 may determine whether assistance may be needed at the location of the vehicle 108 (block 430). For example, the controller may determine that a head-on collision has occurred based upon sensor data (e.g., airbag deployment, automatic motor shut-off, LIDAR data indicating a collision, etc.) and may further determine based upon information regarding the speed of the vehicle 108 and other information that medical, police, and/or towing services will be necessary. The determination that assistance is needed may further include a determination of types of assistance needed (e.g., police, ambulance, fire, towing, vehicle maintenance, fuel delivery, etc.). This determination may include analysis of the type of incident, the sensor data regarding the incident (e.g., images from outward facing or inward facing cameras installed within the vehicle, identification of whether any passengers were present within the vehicle, determination of whether any pedestrians or passengers in other vehicles were involved in the incident, etc.). The determination of whether assistance is needed may further include information regarding the determined status of the vehicle 108.

In some embodiments, the determination regarding whether assistance is needed may be supplemented by a verification attempt, such as a phone call or communication through the on-board computer 114. Where the verification attempt indicates assistance is required or communication attempts fail, the server 140 or controller 204 would then determine that assistance is needed, as described above. For example, when assistance is determined to be needed following an accident involving the vehicle 108, the server 140 may direct an automatic telephone call to a mobile telephone number associated with the vehicle 108 or the vehicle operator. If no response is received, or if the respondent indicates assistance is required, the server 140 may proceed to cause a request for assistance to be generated.

When assistance is determined to be needed (block 432), the controller 204 or the server 140 may send a request for assistance (block 434). The request may include information regarding the vehicle 108, such as the vehicle's location, the type of assistance required, other vehicles involved in the incident, pedestrians involved in the incident, vehicle operators or passengers involved in the incident, and/or other relevant information. The request for assistance may include telephonic, data, or other requests to one or more emergency or vehicular service providers (e.g., local police, fire departments, state highway patrols, emergency medical services, public or private ambulance services, hospitals, towing companies, roadside assistance services, vehicle rental services, local claims representative offices, etc.). After sending a request for assistance (block 434) or when assistance is determined not to be needed (block 432), the controller 204 or the server 140 may next determine whether the vehicle is operational (block 416), as described above. The method 400 may then end or continue as indicated in FIG. 4A.

In some embodiments, the controller 204 may further determine information regarding the likely cause of a collision or other incident. Alternatively, or additionally, the server 140 may receive information regarding an incident from the on-board computer 114 and determine relevant additional information regarding the incident from the sensor data. For example, the sensor data may be used to determine the points of impact on the vehicle 108 and another vehicle involved in a collision, the relative velocities of each vehicle, the road conditions at the time of the incident, and the likely cause or the party likely at fault. This information may be used to determine risk levels associated with autonomous vehicle operation, as described below, even where the incident is not reported to the insurer.

The controller 204 may determine whether a change or adjustment to one or more of the settings or configuration of the autonomous operation features has occurred (block 418). Changes to the settings may include enabling or disabling an autonomous operation feature or adjusting the feature's parameters (e.g., resetting the speed on an adaptive cruise control feature). For example, a vehicle operator may selectively enable or disable autonomous operation features such as automatic braking, lane centering, or even fully autonomous operation at different times. If the settings or configuration are determined to have changed, the new settings or configuration may be recorded (block 422), either in the data storage 228 or the database 146. For example, the Data Application may log autonomous operation feature use and changes in a log file, including timestamps associated with the features in use.

Next, the controller 204 may record the operating data relating to the vehicle 108 in the data storage 228 or communicate the operating data to the server 140 via the network 130 for recordation in the database 146 (block 424). The operating data may include the settings or configuration information, the sensor data, and/or the communication data discussed above. In some embodiments, operating data related to normal autonomous operation of the vehicle 108 may be recorded. In other embodiments, only operating data related to incidents of interest may be recorded, and operating data related to normal operation may not be recorded. In still other embodiments, operating data may be stored in the data storage 228 until a sufficient connection to the network 130 is established, but some or all types of incident information may be transmitted to the server 140 using any available connection via the network 130.

The controller 204 may then determine whether operation of the vehicle 108 remains ongoing (block 426). In some embodiments, the method 400 may terminate when all autonomous operation features are disabled, in which case the controller 204 may determine whether any autonomous operation features remain enabled. When the vehicle 108 is determined to be operating (or operating with at least one autonomous operation feature enabled), the method 400 may continue through blocks 406-426 until vehicle operation has ended. When the vehicle 108 is determined to have ceased operating (or is operating without autonomous operation features enabled), the controller 204 may record the completion of operation (block 428), either in the data storage 228 or the database 146. In some embodiments, a second timestamp corresponding to the completion of vehicle operation may likewise be recorded, as above.

Exemplary Methods of Mapping Suitability of Autonomous Operation

Figure 5:
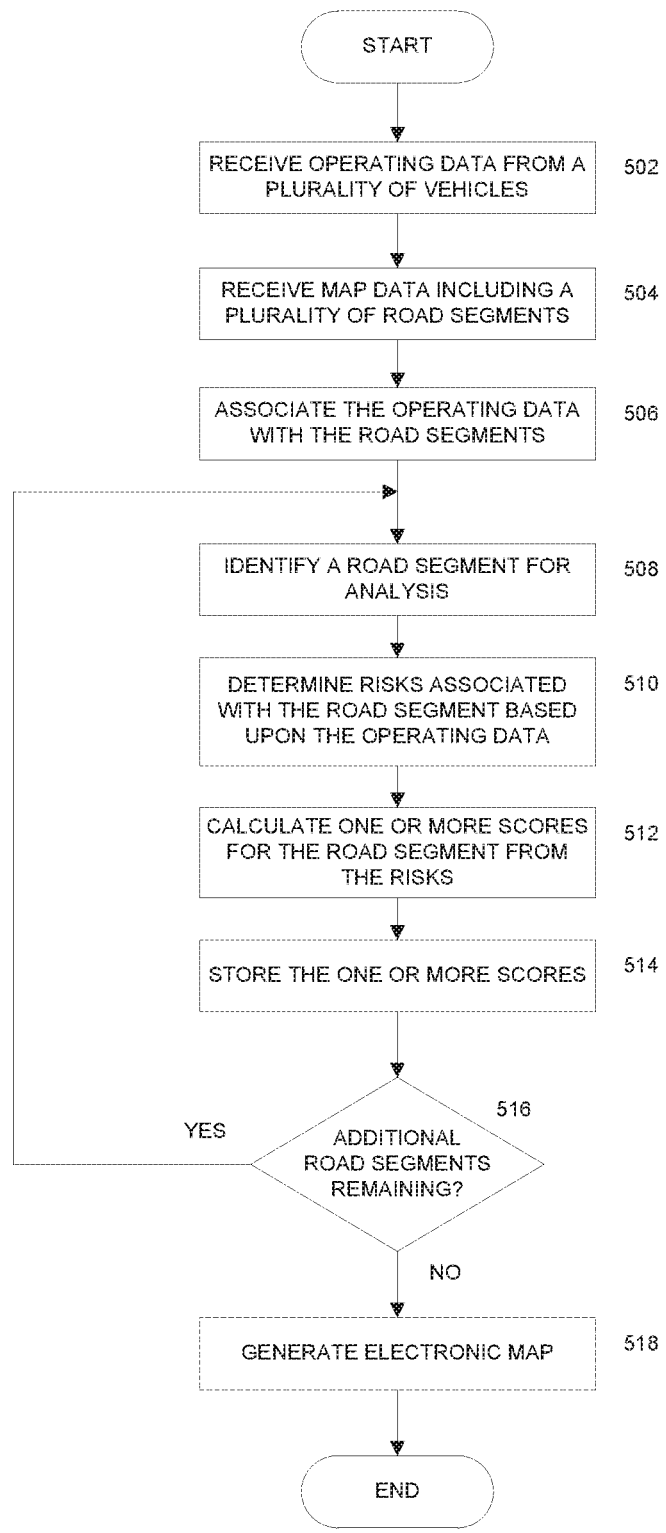
FIG. 5 illustrates a flow diagram of an exemplary autonomous operation suitability mapping method for determining the suitability of various locations for autonomous and/or semi-autonomous operation of vehicles.

FIG. 5 illustrates a flow diagram of an exemplary autonomous operation suitability mapping method 500 for determining the suitability of various locations for autonomous and/or semi-autonomous operation of vehicles. The method 500 may be used to obtain and process data from multiple sources to determine suitability of locations such as road segments for various degrees of autonomous or semi-autonomous vehicle operation. For example, operating data from a plurality of autonomous vehicles may be used to determine whether each of a plurality of road segments may be safely traversed by vehicles using particular autonomous operation features or technologies. Such plurality of vehicles may include a fleet of vehicles commonly owned, operated, or controlled or otherwise operated in a coordinated manner by one or more parties (e.g., a fleet of taxi cabs, delivery vehicles, etc.). This information regarding whether autonomous vehicles may safely operate in various autonomous or semi-autonomous modes along particular roadways may further be used to establish permissions or recommendations regarding the roadways for autonomous operation feature use by other vehicles. For example, a control system of an autonomous vehicle 108 may not allow (e.g., may disable) aspects of autonomous or semi-autonomous operation along road segments rated below a minimum threshold safety level for the use of relevant autonomous operation features.

The method 500 may begin by receiving operating data from a plurality of autonomous vehicles (block 502) and map data including a plurality of road segments from a map database (block 504). The operating data may be associated with the road segments based upon GPS or other location indications of the operating data (block 506). The method 500 may then process the operating data to analyze each of a number of road segments. A road segment may be identified for analysis (block 508), and risks associated with a level of autonomous or semi-autonomous operation on the road segment may be determined (block 510). From such determinations, one or more autonomous operation scores may be calculated for the road segment (block 512) and stored for further use (block 514). The method 500 may then check whether additional road segments remain to be analyzed (block 516). When no further road segments remain to be analyzed, the method 500 may (in some embodiments) generate an electronic map based upon the calculated scores for the road segments (block 518). Generating the electronic map may include generating graphical map tiles, overlay tiles in a map database, or data entries in a map database to store the electronic map data for further use in generating a visible map or for autonomous vehicle navigation. The generated electronic map (or portions thereof) may be displayed or presented to a user to aid in vehicle operation or route selection, in some embodiments.

At block 502, an external computing device 186 (such as a server 140) may receive operating data from a plurality of autonomous or semi-autonomous vehicles 182 (such as the vehicle 108). The operating data may be received via a Data Application running on a mobile device 110 and/or on-board computer 114. In some embodiments, operating data may be received from both autonomous and semi-autonomous vehicles 182. In further embodiments, this data may be supplemented with data from additional sources. Such additional sources may include databases of road or other environmental conditions (e.g., weather conditions, construction zones, traffic levels, estimated travel times, etc.), databases of vehicle collisions (e.g., insurance claims, insurance losses, police reports, etc.), or other databases of relevant information. For example, the additional data may include data regarding vehicle accidents, collisions, or other loss events obtained from a database maintained by an insurer or a governmental agency. In some embodiments, further data may include information regarding other hazardous events, regardless of whether a loss was incurred. Such hazardous events may include not only accidents and other events causing damage, but also occurrences of loss of control, hard braking or acceleration (i.e., beyond a threshold level of force in the direction of travel), hard swerving (i.e., beyond a threshold level of force in a direction perpendicular to the direction of travel), or near collisions (i.e., times when a vehicle came within an unsafe distance of another object). Regardless of the source, the data received may be associated with geographic locations. Such associations may be indicated by geospatial coordinates (e.g., GPS position), relative location data (e.g., street addresses, intersections, etc.), or area indications (e.g., cities, counties, types of roads, etc.).

At block 504, the external computing device 186 (such as a server 140) may similarly receive map data indicating a plurality of known road segments. The map data may be obtained upon requesting such data from a map database storing roadway data. For example, a map database may include a plurality (frequently thousands or millions, depending upon the geographic scope of the database) of line segments indicated by geopositioning coordinates of the endpoints of the segments. The road segments may individually include only portions of a stretch of roadway (e.g., a block, a quarter mile, etc.), which interconnect to form a representation of a roadway system or network. In some embodiments, such map data may be obtained from a third party as a copy of a database or via access through an Application Program Interface (API). The map data (and the operating data discussed above) may be received for a limited geographic area for which road segments are to be evaluated.

At block 506, the external computing device 186 (such as a server 140) may associate the received operating data with the road segments in the received map data. This may include converting one or both types of the received data (viz., the operating data and the map data) to a common location identification system. For example, part of the operating data may include street addresses or intersections, which may be converted into GPS coordinates for matching with the road segment data. In some embodiments, some road segments may be grouped or combined into relevant segments. For example, several segments of a long and winding road between intersections may be combined to facilitate more efficient analysis because visual mapping of the road segments may be irrelevant to the evaluation. The road segment data and the operating data may further be associated by a cross-reference table, by merging the data, or using other known data management techniques. In some embodiments, the operating data may not be associated with the road segments until each relevant road segment is selected for analysis, which may be more efficient when a small number of road segments are to be rated.

Once the operating data has been associated with the map data, one or more road segments may be analyzed to determine risks associated with autonomous or semi-autonomous operation thereupon. Blocks 508-516 may be repeated in a loop until all road segments (or all road segment selected for analysis) have been analyzed and scored. In some embodiments, not all road segments in the received map data will be analyzed. For example, road segments for which no corresponding operating has been received may not be analyzed. Similarly road segments for which too little operating data has been received (e.g., less than a threshold number of independent data points, less than a threshold number of separate vehicle trips associated with the road segment, etc.) may not be analyzed. In some such embodiments, such unanalyzed road segments may nonetheless receive a default score or flag indicative of their unanalyzed status. In other embodiments, such as where the method 500 is used to update existing autonomous operation suitability map data, such unanalyzed road segments may retain their previously assigned score and other data. As another example, a subset of the received road segments may be selected for analysis, either by a user or automatically. A user may select a group of road segments to analyze or may select characteristics of road segments to generate a group (e.g., by selecting road segments within a geographic area, highway road segments, urban area road segments, etc.). Alternatively, a group of road segments may be automatically identified for analysis upon the occurrence of an event, such as a request from a vehicle 108 for data near the vehicle's current position or along a route.

At block 508, the external computing device 186 (such as a server 140) may identify a particular road segment from the map data to analyze. The road segment may be identified by its position in a list of road segments, which may be sorted or unsorted. In some embodiments, an index or counter may be used to indicate the next road segment to be analyzed. When the road segment is identified, the operating data and any other data associated with the road segment may be accessed, copied, or moved into volatile memory to facilitate analysis.

At block 510, the external computing device 186 (such as a server 140) may determine one or more risk levels associated with the road segment. Machine learning techniques (e.g., support vectors, neural networks, random forests, naïve Bayesian classifiers, etc.) may be used to identify or estimate the magnitude of salient risk factors associated with autonomous operation feature use on the road segment. Such risk factors may include time of day, weather conditions, traffic conditions, speed, type of vehicle, types of sensors used by the vehicle, types of autonomous operation features in use, versions of autonomous operation features, interactions between autonomous operation features, autonomous operation feature settings or configurations, driver behavior, or other similar factors that may be derived from the data. Alternatively, statistical regression using a set of predetermined models may be used to estimate the effects of selected risk factors determinable from the data. In either case, the external computing device 186 may use the determined effects of the risk factors to further determine one or more risks associated with autonomous or semi-autonomous vehicle operation on the road segment.

The one or more risk levels may include summary levels associated with groupings of combinations of risk factors, such as fully autonomous operation or semi-autonomous operation in which the driver actively steers the vehicle. In some embodiments, a risk level may be determined for each autonomous operation feature or category of autonomous operation features (which risk level may ignore or assume a default effect of interactions between autonomous operation features). In further embodiments, average risk levels for the road segment may be determined for a small number of categories of general levels of autonomous operation, such as the NHTSA's five categories of vehicle automation (ranging from category 0 with no autonomous operation through category 4 with fully autonomous operation). Of course, the quantity of operating data available for the road segment will affect the level of detail at which risk levels may be determined, both in terms of specificity of the risk levels and the number of separate risk levels determined for the road segment. In a preferred embodiment, operating data from a large number of vehicle trips along the road segment (i.e., hundreds or thousands of separate vehicle trips by at least several types of autonomous vehicles using different types and settings of autonomous operation features) may be used to determine risk levels associated with a plurality of autonomous operation feature use levels, configurations, and settings for a plurality of types of autonomous vehicles in various environmental conditions.

At block 512, the external computing device 186 (such as a server 140) may calculate one or more scores for autonomous or semi-autonomous operation associated with the road segment (i.e., suitability scores). This may include determining a score representing a risk level category (e.g., a score of 5 indicating high risk, a score of 4 indicating medium-high risk, a score of 1 indicating low risk, a score of 0 indicating that the road segment has not been analyzed, etc.) based upon a risk level determined as discussed above. The score may similarly represent a maximum recommended (or permitted) level of autonomous operation feature use on the road segment, which may depend upon environmental conditions or other factors as discussed above. In some embodiments, the score may be constrained by a statutory proscription regarding levels or types of autonomous or semi-autonomous vehicle feature use on the road segment (e.g., limitations on fully autonomous operation in certain locations), information regarding which may be obtained from one or more servers associated with government agencies or other sources. Thus, the scores may indicate recommended or allowed autonomous operation feature usage or usage levels for road segments or areas.

In further embodiments, the score may indicate an adjustment factor for an insurance policy metric, such as a premium or deductible. For example, a high-risk usage profile along the road segment may be associated with an adjustment factor greater than one (indicating an increase in a cost due to the high-risk usage), while a low-risk usage profile along the road segment may be associated with an adjustment factor less than one (indicating a lower cost due to low-risk usage). In some embodiments, scores for a plurality of road segments along a vehicle route may be used to determine a cost, estimate, or quote for a usage-based insurance charge, premium, or other cost, which may be presented to a vehicle operator at the time of route selection to assist in selecting a route based upon safety, speed, cost, or other considerations.

Once the one or more scores are calculated, they may be stored in program memory 160 or database 146 (block 514). At block 516, the external computing device 186 may then determine whether there remain any further road segments to be analyzed. If additional road segments are to be analyzed, the method 500 may continue by identifying another road segment at block 508. If no additional road segments are to be analyzed, the method 500 may continue to block 518. In some embodiments, block 518 may be excluded, in which case the method 500 may terminate when no additional road segments are to be analyzed.

At block 518, the external computing device 186 (such as a server 140) may generate an electronic map in some embodiments. The electronic map may comprise a plurality of map tiles including indications of the scores of road segments. In some embodiments, the map tiles may be overlay to be superimposed upon other map tiles to indicate scores of road segments. In further embodiments, the electronic map may include map tiles indicating only road segments for which one or more autonomous operation features (e.g., a set of particular autonomous operation features, particular types of autonomous operation features, or particular levels of autonomous operation features) may be safely used (i.e., road segments meeting a minimum score threshold for safe use of the relevant autonomous operation features). In embodiments in which map tiles or overlay map tiles are generated, such tiles may be generated either as needed or in advance, but it is preferable to generate such tiles in advance because of the processing time and resources required to generate such tiles. In other embodiments, the electronic map may comprise an autonomous operation suitability map database of one or more scores (preferably a plurality of scores) for each road segment. Such database may be accessed to determine autonomous or semi-autonomous routes for vehicles, as discussed elsewhere herein. In some embodiments, the electronic map (or portions thereof) may be communicated to a user device (e.g., the mobile device 110) to be displayed to a user.

Exemplary Autonomous Vehicle Routing Methods

Figure 6:
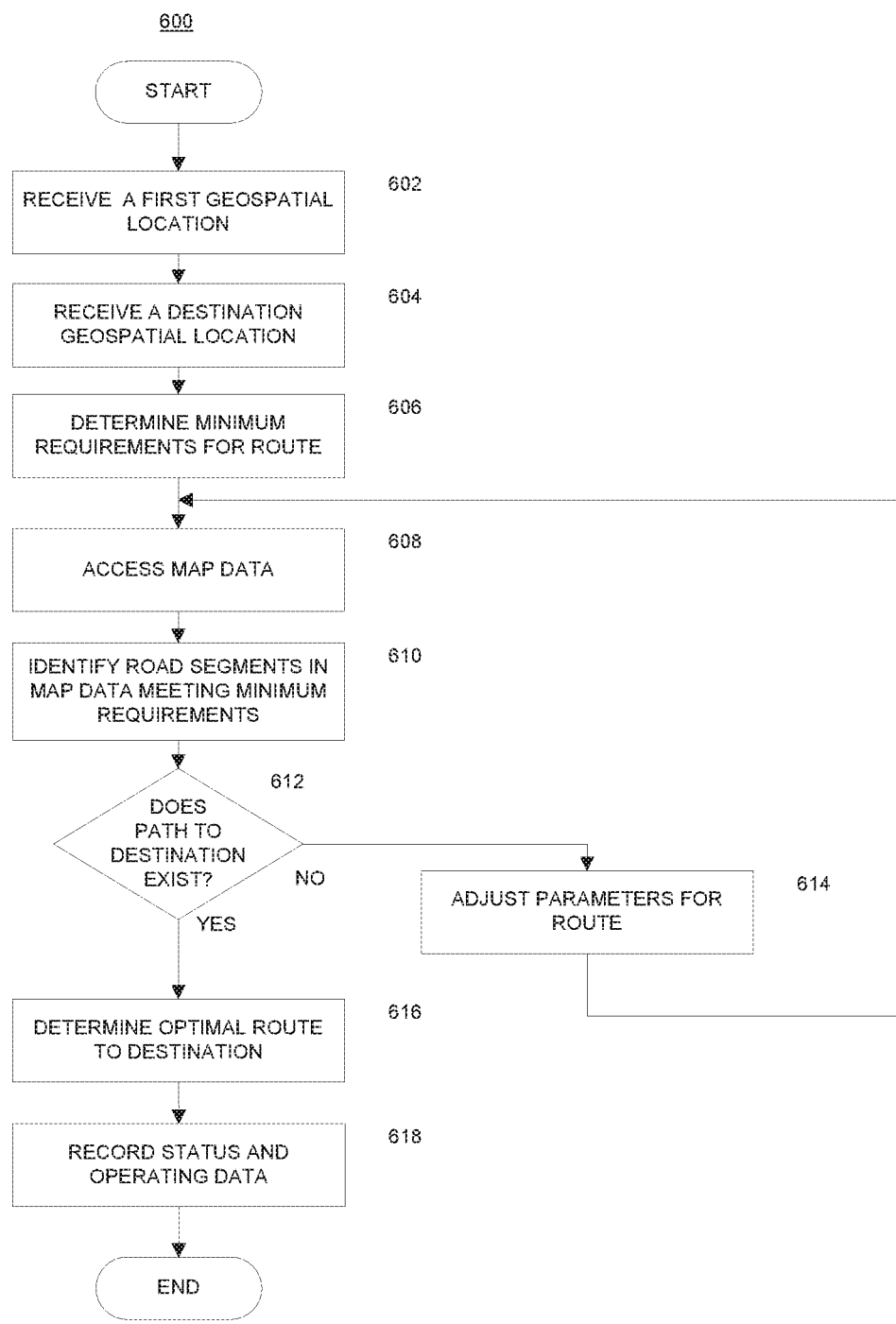
FIG. 6 illustrates a flow diagram of an exemplary autonomous vehicle routing method for determining a route between predetermined locations to provide autonomous vehicle navigation support.

FIG. 6 illustrates a flow diagram of an exemplary autonomous vehicle routing method 600 for determining a route between predetermined locations to provide autonomous vehicle navigation support. The method 600 may be used to identify and avoid locations where it may be difficult or dangerous for the vehicle 108 to use autonomous operation features. For example, autonomous operation may be unpredictable or hazardous when the vehicle encounters unexpected or temporary traffic patterns, such as temporary lane shifts during construction. In certain circumstances, it may be desirable to determine routes that avoid or minimize travel along road segments that are unsuitable for autonomous operation feature use. The method 600 may be implemented to determine routes that allow safe and fully autonomous travel (or any desired level of autonomous feature use).

The method 600 may begin by receiving a first geospatial location (block 602) and a destination geospatial location (block 604). Minimum requirements for the route may be determined (block 606.) Relevant map data associated with autonomous operation scores of road segments may then be accessed (block 608), such as from an autonomous operation suitability map database, and the map data may then be used to identify road segments within the relevant map data meeting the minimum requirements (block 610). The identified road segments may be examined to determine whether at least one path between the first geospatial position and the destination geospatial position exists (block 612). If no such path exists that meets the minimum requirements, one or more parameters of the routing method may be adjusted (block 614) until such path exists. When one or more paths are determined to exist, an optimal route between the first geospatial position and the destination geospatial position may be determined (block 616). An indication of the optimal route may then be provided to a mapping or navigation system for use in controlling the vehicle (block 618). The method 600 may be performed by a server 140, by a mobile device 110 and/or on-board computer 114, or by a combination of such components communicating via network 130. Although the description below is presented using a mobile device 110 and server 140 for simplicity, the description below may be easily modified for implementation by other systems including one or more of a mobile device 110, on-board computer 114, or server 140.

At block 602, the mobile device 140 may receive a first geospatial position. The mobile device 140 may further receive a destination geospatial position at block 604. The geospatial positions may be received as GPS or similar coordinates, street addresses, intersections, or any other indication of a specific location. In some embodiments, the first geospatial position may be received from a GPS unit 206 of the mobile device 110. Such GPS data may indicate the current location of the vehicle 108 or a location of a user, such as a location from which the user wishes to depart. Alternatively, the user may select the first geospatial position by indicating a starting location of the route, such as by entering an indication of the first geospatial position into the mobile device 110. The user may similarly select the destination geospatial location directly or indirectly. As an example of indirect selection, the user may indicate that travel to a type of location (e.g., a gas station, a hospital, etc.) is desired, from which the mobile device 110 may determine the destination geospatial location via communication with a map service via network 130. In some embodiments, both the first geospatial location and the destination geospatial location may be determined automatically in response to detected conditions, as described further below. In further embodiments, either or both of the first and destination geospatial locations may be identified or selected from a plurality of received common locations or routes for a fleet of vehicles, such as frequent origin or destination locations for a fleet of personal transportation, commercial delivery, or other vehicles 108.

At block 606, the minimum requirements for the route may be determined by the mobile device 110. The minimum requirements may relate to the acceptable range of scores for road segments along the route, such as requiring a minimum score for each road segment. Such minimum requirements may be selected by the user or may be automatically determined based upon conditions of vehicle operation. For example, the user may request a route suitable for fully autonomous operation. As another example, automatic emergency operation may require fully autonomous operation throughout the route. In some embodiments, the user may specify different minimum requirements for different types of road segments. For example, the user may require fully autonomous operation on highway road segments, but may allow semi-autonomous operation on residential street road segments. In further embodiments, a user profile may be created to indicate general user preferences regarding minimum route requirements, which may vary by time, location, weather, other environmental conditions, or whether the vehicle is operating in an emergency mode. For example, the user profile may indicate that a user prefers fully autonomous operation during weekday rush-hour operation. As another example, a user profile associated with a new driver may require fully autonomous operation after a certain time or in inclement weather.

At block 608, the mobile device 110 may communicate the geospatial locations and minimum requirements to the server 140 via the network 130, causing the server 140 to access relevant map data from one or more databases 146. In some embodiments, the mobile device 110 may communicate additional information to the server 140 to facilitate determination of an optimal route. Such additional information may include details regarding available types, configurations, settings, and operating status of autonomous operation features (which may include information regarding sensors 120 or software versions). Part or all of the additional information may be stored in a vehicle profile within the database 146 to reduce data transmission over the network. The relevant map data may be limited to road segments in a predefined or algorithmically determined distance from the geospatial locations. For example, the map data may be accessed for the smallest map tile in the map database that includes both the first and destination geospatial positions. Because the conditions of the operating environment (e.g., time of day, traffic levels, weather, construction, etc.) impact the effectiveness of the autonomous operation features, the server 140 may determine the condition of the relevant operating environment and access the map data associated with operation within the relevant operating environment. For example, map data relating to autonomous or semi-autonomous operation of vehicles on road segments at night may be accessed if the route is to be traveled at night, while corresponding road segment data associated with daytime travel may be ignored as irrelevant.

At block 610, the server 140 may identify the road segments meeting the minimum requirements for types and/or levels of autonomous operation feature use from the accessed map data. This may include selecting road segments from the accessed map data that match multiple facets of the minimum requirements, such as meeting the separate minimum requirements for the operation of a plurality of autonomous operation features. Thus, the set of road segments identified as meeting the minimum requirements may be the intersection of the sets of road segments that meet each facet of the minimum requirements. In some embodiments, considerations of legal proscriptions regarding use of autonomous operation features on road segments may be used to determine whether such road segments meet the minimum requirements. For example, some road segments may generally meet the minimum requirements but may ban or require certain autonomous operation feature use during certain periods (e.g., weekday rush hour periods).

At block 612, the server 140 may determine whether at least one route exists that forms a connected path between the first geospatial location and the destination geospatial location along the identified road segments that meet the minimum requirements. This may include iteratively checking road segments until either a connecting path is found or all road segments have been checked. In some embodiments, this may include a preliminary step of determining whether both the first and destination geospatial positions lie along road segments that meet the minimum requirements, which may be used to quickly determine that no suitable route exists if one or both geospatial locations are not upon a road segment meeting the minimum requirements. If at least one path between the first and destination geospatial locations is found, the method 600 may continue with determining an optimal route (block 616). If no paths meeting the minimum requirements are found, the method 600 may instead attempt to adjust the parameters (block 614) to find a suitable route. Once the parameters have been adjusted (block 614), the method 600 may continue by accessing map data using the new parameters (block 608). Alternatively, the method 600 may notify the user that no suitable route exists or may terminate with an error message if no suitable path is found.

At block 614, the server 140 may adjust one or more parameters in an attempt to find a route suitable for the requested type of autonomous or semi-autonomous operation. This may include adjusting the minimum requirements to include road segments that are near the original minimum requirements (e.g., within 5% of the original minimum score threshold). If a legal proscription against certain types or levels of autonomous operation along particular road segments exists, however, such road segments may be separately treated as unavailable for adjustment. In some embodiments, the adjusted parameters may be parameters other than the minimum requirements. Such other parameters may include distance from the first and destination geospatial locations, use of toll roads, or similar parameters involving the scope of the accessed the map data. For example, additional map data tiles may be included, such as overlapping or larger map data tiles. This may correspond to driving generally away from the destination geospatial location before traveling towards it. Although such routes may be longer, the additional road segments may facilitate travel in a manner that meets the minimum requirements everywhere along the route.

In further embodiments, adjusting the parameters may include allowing for the inclusion of short distances of road segments that may be suitable for significantly less autonomous or semi-autonomous operation. For example, road segments of less than one mile that connect on both ends to road segments meeting the minimum requirements (or that connect to or contain the first or destination geospatial locations) may be included, even if such road segments are not suitable for any autonomous operation feature use (or are suitable for only the lowest levels of such feature use). This may allow the driver to travel most of the trip autonomously using an efficient route, but the route may require the driver to take control for a short distance (e.g., while passing through a construction zone).

Similarly, in instances in which a suitable route cannot be found because the first geospatial location or the destination geospatial location are not located along a road segment that meets the minimum requirements, a substitute geospatial location along a road segment that meets the minimum requirements may be determined. Such substitute geospatial position may be used to determine routes between a substitute first geospatial position and the destination geospatial position, between the first geospatial position and a substitute destination geospatial position, or between a substitute first geospatial position and a substitute destination geospatial position. For example, a pick-up or drop-off location requested by the user may be adjusted to facilitate autonomous or semi-autonomous operation along a route of road segments meeting the minimum requirements.

Once at least one route is found that forms a connected path between the first geospatial location and the destination geospatial location along the identified road segments that meet the minimum requirements, the server 140 may determine one or more optimal routes between the geospatial positions at block 616. Where substitute geospatial positions have been determined, of course, the route will use such substitute geospatial positions as origin or terminal points. Routes may be optimized relative to metrics such as time, distance, total risk, continuity of progress (i.e., avoiding stops), amount of fully autonomous operation, amount of manual operation, amount of operation at or above the minimum requirements, fuel use, and/or other metrics. For example, the optimized route may maximize a distance or an amount of time that the autonomous vehicle travels in autonomous mode, or the optimized route may minimize a distance or time that the autonomous vehicle travels in manual mode. In some instances, a unique optimal route may be determined, while other instances may identify multiple optimal routes that are equivalent (or within statistical margins of error) for the relevant one or more metrics. The optimal route may be the safest route, the route associated with a least amount of pedestrian traffic or cross walks, the quickest route, the shortest route, or the route with most highway driving.

The optimal route may include the highest percentage of autonomous feature usage or autonomous mode operation, or may include 95% to 100% autonomous mode operation along the route. The optimal route may be the shortest route (in time or mileage) that includes the highest percentage of autonomous feature usage or autonomous mode operation. The optimal route may be the shortest route (in time or mileage) that includes a percentage of autonomous feature usage or autonomous mode operation over a predetermined threshold, such as 50%, 60%, 75%, 80%, or 90%. The optimal route may be the shortest route (in time or mileage) that includes 100% autonomous feature usage or autonomous mode operation over the route. The optimal route may similarly be a route associated with the lowest risk, or the fastest or shortest route below a maximum tolerable risk threshold. The risk may be determined based upon a risk profile for the vehicle 108 and/or a user profile for the vehicle operator.

Some embodiments may include determining a plurality of optimal routes, each of which optimizes some set of one or more metrics (e.g., the fastest route, the shortest route, or the cheapest route based upon total costs of operation including fuel, wear, insurance, tolls, etc.). In embodiments in which a route may include one or more road segments where manual operation or semi-autonomous operation is required, the optimal routes may further be determined based at least in part upon the amount of manual or semi-autonomous operation required, or the level of manual or semi-autonomous operation required. In further embodiments, one optimal route may be selected from alternative optimal routes, either by application of automated decision criteria or by receiving a user selection.

At block 618, the server 140 may then provide the determined optimal route (or routes) to the mobile device 110 for use in vehicle navigation. The mobile device 110 may present the optimal route (or routes) to the user for review and approval in some embodiments. For example, one or more optimal routes determined above may be presented to the user via a display 202 associated with the mobile device 110 or on-board computer 114 as recommendations. Such recommendations may include additional information regarding risks, time, or costs associated therewith. For example, costs associated with adjustments to insurance policy premiums, discounts, or other terms may be presented to the user with one or more recommendations. In further embodiments, the optimal route may be communicated to the on-board computer 114 of the vehicle 108 to cause the vehicle 108 to operate autonomously along the optimal route, such as in emergency situations or when a fully autonomous trip is requested. In still further embodiments, presenting the optimal route or routes may include generating notifications of where (and when) autonomous mode or manual mode is required or recommended along individual routes or roads, such as notifications of (1) when or where the driver should manually operate/drive the autonomous vehicle, (2) when or where the autonomous system should drive or control the autonomous vehicle, and/or (3) when or where certain autonomous features or system should be engaged or utilized, and at which setting or configuration individual autonomous systems or features should be engaged. In some embodiments, the optimal route may be further used to determine a cost, estimate, or quote for a usage-based insurance charge, premium, or other cost, which may be presented to a vehicle operator at the time of route selection to assist in selecting a route based upon safety, speed, cost, or other considerations. Vehicle use may further be monitored to determine whether the recommended optimal route is followed, which may be used to adjust risk levels and/or costs associated with insurance accordingly.

In another aspect, a computer system configured to facilitate optimal autonomous vehicle feature usage may be provided. The computer system may include one or more processors and/or transceivers configured to: (1) collect or receive road data indicating whether individual roads allow autonomous vehicle usage or not (and/or an amount of autonomous feature usage that is permitted for autonomous vehicles traveling on each road), such as via wireless communication or data transmission from a $3^{rd}$ party server (e.g., DMV server) via one or more radio links; (2) generate a virtual or electronic navigation map of routes that indicates whether or not each road within the navigation map allows or permits autonomous vehicles to be operated in autonomous or self-driving mode, or requires vehicles to be operated in a manual mode of operation; (3) collect or receive route data for a fleet of autonomous vehicles via wireless communication or data transmission over one or more radio links from a remote server associated with an autonomous vehicle fleet owner (such as a delivery company or taxi service company), the route data including GPS locations for each route origination point and destination point; (4) input the route data and navigation map (indicating roads that allow autonomous vehicles) into a machine learning program (or deep learning program, neural network, a program that combines deep multitask reinforcement learning with deep-transfer learning, or a cross-learning program that can learn in different domains or fields) or navigation program (stored in a memory unit) that determines optimal routes for the fleet of autonomous vehicles, the optimal routes being the shortest routes between the GPS locations for route origination point and destination point with the most miles that allow for an autonomous vehicle to be operated in autonomous or self-driving mode—or otherwise determining, via the one or more processors, the optimal routes for the fleet of autonomous vehicle based upon processor or computer analysis of the route data and the electronic or virtual navigation map indicating which roads permit vehicles to drive autonomously; and/or (5) transmit one or more of the optimal routes (that include the shortest routes with the most allowable autonomous feature usage) to the remote server or directly to the fleet of autonomous vehicles (such as via wireless communication over one or more radio links) for download into vehicle controllers for the fleet of autonomous vehicles to facilitate maximizing autonomous vehicle features or technologies that reduce the likelihood of vehicle collisions and promote safer vehicle travel. The one or more processors and/or transceivers may be further configured to: monitor whether or not the fleet of autonomous vehicles follows or utilizes the optimal routes determined; and if so, provide an incentive or discount to the fleet of autonomous vehicles owner. The one or more processors and/or transceivers may be further configured to: adjust a liability insurance premium or discount based upon the amount of vehicle travel in autonomous mode according to the optimal route or routes determined; and/or adjust another liability insurance premium or discount based upon the amount of vehicle travel in manual mode according to the optimal route or routes determined.

Exemplary Emergency Routing Methods

Figure 7:
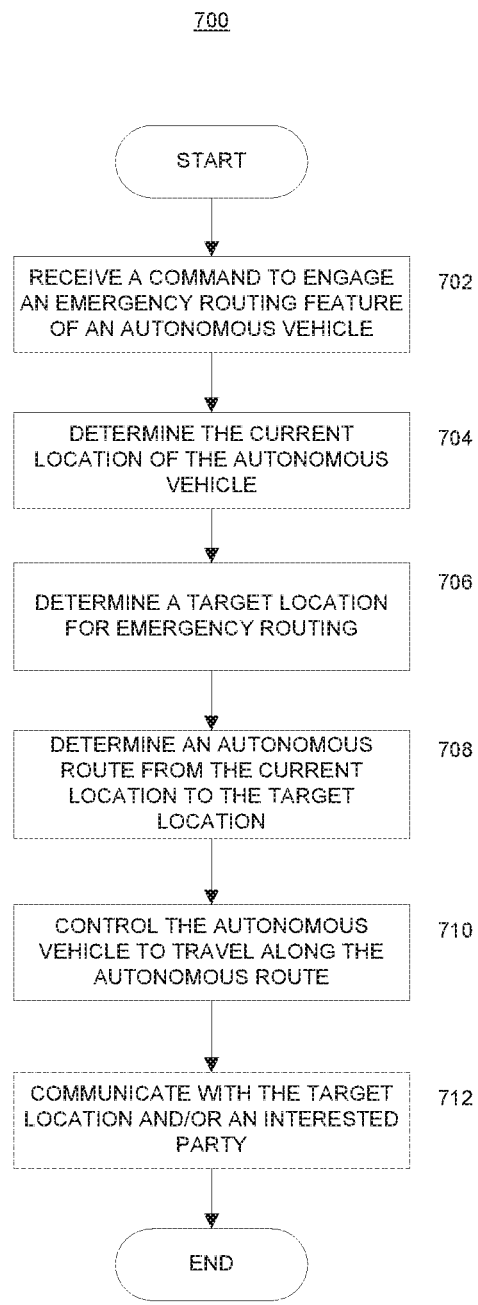
FIG. 7 illustrates a flow diagram of an exemplary emergency routing method 700 for controlling an autonomous vehicle in an emergency situation.

FIG. 7 illustrates a flow diagram of an exemplary emergency routing method 700 for controlling an autonomous vehicle in an emergency situation. The method 700 may be implemented in conjunction with the method 600 described above to route the vehicle 108 automatically to an appropriate location in the event of an emergency. Emergencies may include vehicle accidents or collisions, medical emergencies, incapacitation of a driver, threats to immediate safety, or other situations requiring an immediate response. In response to a user indication of an emergency or an automatic determination of an emergency, the method 700 may control the vehicle 108 to operate autonomously to a destination. In the case of a medical emergency, for example, the method 700 may direct the vehicle 108 to a nearby hospital.

The method 700 may begin upon receipt of a command to engage an emergency routing feature associated with the autonomous vehicle 108 (block 702). In response, the current location of the vehicle 108 may be determined (block 704), and a target location to which the vehicle 108 is to travel may be determined (block 706). The current location and target location, respectively, correspond to the first geospatial location and the destination geospatial location described above. An autonomous route from the current location to the target location may then be determined (block 708), and the vehicle 108 may be controlled to travel along the determined route (block 710). In some embodiments, a mobile device 110 or other equipment within the vehicle 108 may be used to communicate with an interested third party (block 712), such as a party located at the target location or an owner of the vehicle 108. Although the description below is presented using an on-board computer 114 and server 140 for simplicity, the description below may be easily modified for implementation by other systems including one or more of a mobile device 110, on-board computer 114, or server 140.

At block 702, the on-board computer 114 of the vehicle 108 may receive a command to engage an emergency routing feature to autonomously control the vehicle 108. The emergency routing feature may be a separate autonomous operation feature or may be integrated into one or more other autonomous operation features to control the vehicle 108 to operate autonomously in emergency conditions. The command may be received from a user or may be automatically generated upon the occurrence of certain events. In some embodiments, the command may include information regarding the type of emergency (e.g., a medical emergency, a fire, a vehicle breakdown, a collision, etc.). An automatic emergency determination routine may be executed by a processor of the on-board computer 114, a mobile device 110, or a server 140 to monitor vehicle operation and determine if an emergency is likely to exist (and the type of emergency likely to exist). For example, sensor data regarding the vehicle operator (e.g., motion data, heart rate, temperature, etc.) may be analyzed to determine that the vehicle operator has become incapacitated or is experiencing a medical emergency, such as a heart attack or stroke. Such sensor data regarding the health of the vehicle operator may be received from a personal sensor device configured to monitor one or more health metrics associated with the health of the vehicle operator, such as a wearable computer device (e.g., a smart watch, smart glasses, fitness band, pacemaker, etc.). Alternatively, the sensor data may be obtained from sensors 120 within the vehicle 108 or mobile device 110 (e.g., cameras, microphones, etc.) that may be used to determine vehicle operator health, as well as other information about the vehicle operator or the vehicle (e.g., vehicle operator identity, vehicle operator impairment, vehicle operating condition, vehicle cabin temperature, etc.). As another example, the vehicle operator may be determined to be asleep or failing asleep, which may be determined by the automatic emergency determination routine as an emergency requiring autonomous operation to locate and autonomously navigate the vehicle 108 to a location where it may be safely parked. In some embodiments, the automatic emergency determination routine may be part of a Data Application running on the mobile device 110 and/or on-board computer.

Additionally, or alternatively, a user of a computer system (i.e., the mobile device 110, the on-board computer 114, or an external computing device 186) may operate a control to indicate that an emergency exists and generate the command to engage the emergency routing feature. For example, an emergency button may be displayed on a screen within the vehicle 108, which may be operable by the driver or a passenger to engage the emergency routing feature. Alternatively, a remote party (e.g., a representative at a customer service center) may monitor the vehicle 108 and engage the emergency routing feature remotely via the network 130. In some embodiments, the remote user or an automatic emergency determination routine may attempt to confirm or verify the emergency before generating the command. For example, a remote user may attempt to contact a vehicle driver or passenger through the on-board computer 114 or via one or more mobile devices 110 upon determining a likelihood of an emergency. An automatic emergency determination routine may similarly generate a warning and present a cancellation option on a display 202 within the vehicle 108. In further embodiments, a user may be presented options to select a type of emergency (e.g., medical, safety, etc.).

At block 704, the on-board computer 114 may determine the current location of the vehicle 108. This may include obtaining a GPS coordinate location from a GPS unit of the vehicle 108 or the mobile device 110. In some embodiments, the current location may be retrieved from a memory storing a previously determined location (such as previously obtained GPS coordinate data). In some embodiments, the on-board computer 114 may communicate the current location of the vehicle 108 to a server 140 via network 130 for use in routing. In other embodiments, the on-board computer 114 may use locally stored data to determine the route. In either case, a mobile device 110 may be used for data communication, storage, or analysis.

At block 706, the server 140 may determine a target location for the vehicle 108 using the information regarding the emergency and the vehicle's current location. This may include accessing entries related to emergency facilities (e.g., hospitals, urgent care clinics, police or fire stations, parking facilities, etc.) stored in a database 146. In some embodiments, the database 146 may be a third-party database accessed by the server 146 via the network 130 using an API. The target location may be determined based upon the type of emergency, as well as the current location of the vehicle 108. For example, the server 140 may determine as the target location the nearest (by distance or time) emergency facility associated with medical treatment in response to a command that indicates a medical emergency. In some embodiments, the target location may be selected based upon user preferences stored in a profile accessible by the server 140, which may indicate preferred emergency facilities. In further embodiments, the target location may also be determined based upon an indication of the urgency of the emergency, which may be determined or received from a user. For example, if a driver of the vehicle 108 is determined to have no pulse, the nearest emergency facility may be selected as the target location, even if such facility would not ordinarily be selected (e.g., a nearby police station may be selected because it likely has emergency equipment and trained personnel capable of providing emergency care, despite not being a medical care facility). In less urgent situations, such as those involving a sleeping or intoxicated driver, the server 140 may determine whether the vehicle 108 can complete its current trip autonomously, in which case the original destination may be selected as the target location. In some embodiments, the server 140 may communicate with an emergency facility to establish a target location for the vehicle 108 to meet an emergency vehicle (e.g., an ambulance), which target location may be a geospatial location along a road segment where the emergency vehicle may meet the vehicle 108 to facilitate faster provision of emergency care.

At block 708, the server 140 may determine a fully autonomous route between the current location and the target location. The exemplary autonomous vehicle routing method 600 described above may be implemented to determine the route, using the current location as the first geospatial location and the target location as the destination geospatial location. For example, the method 600 may be used to determine an optimal route along road segments having scores indicating suitability for fully autonomous travel using the autonomous operation features installed within the vehicle 108 that are functioning properly at the time of the emergency. As above, a route capable of being safely travelled by the vehicle 108 operating fully autonomously may not exist. In such instances, the server 140 may determine to either override the minimum requirements or may identify an alternative route. For example, the route may include road segments for which fully autonomous operation poses an increased risk of a vehicle accident, but the risk may be sufficiently low that the route may include such road segments in emergency situations.

Similarly, the server 140 may identify a substitute target location near the determined target location, which may include a curbside or parking space near an entrance to the emergency facility. Such substitute target locations may be particularly important when the vehicle operator or a passenger is incapacitated and cannot either navigate to a proper parking space or leave the vehicle without assistance. As an example, the substitute target location may include a driving lane within a parking lot or on a public street that is near an emergency room door of a hospital.

As above, the server 140 may determine an optimal route for fully autonomous operation, which may be the fastest route under current conditions (e.g., traffic data from a traffic data provider, weather data, etc.). In some embodiments, the server 140 may update the route periodically as the vehicle 108 progresses toward the target location. The server 140 may transmit the determined route to the on-board computer 114 via the network 130, which may include transmitting the route to a mobile device 110 that communicates with the on-board computer 114.

At block 710, the on-board computer 114 may control the vehicle 108 to travel along the determined route in a fully autonomous mode. The on-board computer 114 may operate or communicate with a navigation system to direct the vehicle 108 along the route by generating control commands used to operate control components of the vehicle 108. In some embodiments, controlling the vehicle 108 may include controlling communication components within the vehicle 108 to indicate an emergency state. For example, the vehicle 108 may use vehicle-to-vehicle wireless communication to alert nearby vehicles 182 of emergency operation. In some embodiments, the vehicle 108 may likewise communicate an emergency state to smart infrastructure components 188, which may cause such infrastructure components to adjust their state to facilitate emergency travel by the vehicle 108. For example, a smart stop light may change to grant priority passage through an intersection to the vehicle 108 upon receiving emergency communications from the vehicle 108. As another example, the vehicle 108 may sound a horn or flash lights to indicate an emergency state to nearby vehicles 182. In further embodiments, the target location may be updated during vehicle operation, as described above. For example, the target location may be associated with an emergency vehicle, such as an ambulance, that is moving to meet the vehicle 108. In such instances, the target location may be repeatedly updated during vehicle operation based upon a then-current locations of the emergency vehicle at a plurality of times as the emergency vehicle moves to meet the vehicle 108. The vehicle 108 may thus be operated to travel toward the emergency vehicle as the emergency vehicle travels to meet the vehicle 108.

At block 712, the on-board computer 114 may communicate with the emergency facility at the target location or an interested party regarding the emergency. In some embodiments, the server 140 may communicate information relating to the emergency to the emergency facility or interested party. Similarly, the mobile device 110 may be used to send automatically generated text, data, or voice communications to such parties. For example, the mobile device 110 may be controlled by a Data Application to make a wireless telephone call to the emergency facility to inform of the vehicle's approach and/or provide information regarding the nature of the emergency. Such communication may include alerts that the vehicle 108 is traveling to the target location or alerts that the vehicle 108 has reached the target location. Information may similarly be provided to interested parties, such as vehicle owners or emergency contacts. In some embodiments, the on-board computer 114 may operate components of the vehicle 108 to attract attention to the vehicle 108 when it has reached the target location, such as by sounding a horn or flashing lights of the vehicle 108. In some embodiments, speakers of the vehicle 108 may be used draw attention using repeating noises or an automated message. The method 700 may then terminate.

Exemplary Autonomous Vehicle Route Selection Methods

Figure 8:
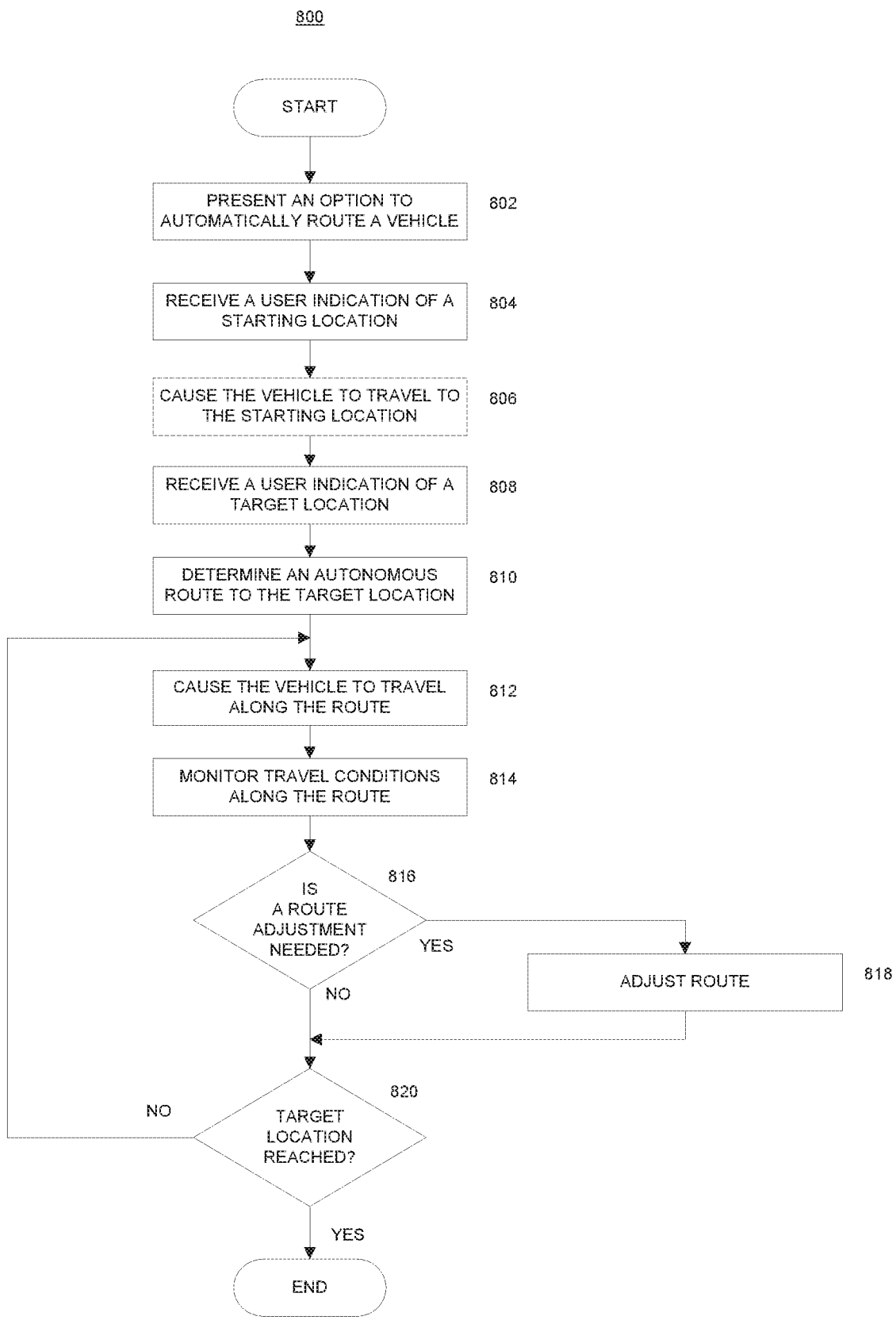
FIG. 8 illustrates a flow diagram of an exemplary autonomous route selection and navigation method for allowing a user to control autonomous vehicle operation.

FIG. 8 illustrates a flow diagram of an exemplary autonomous route selection and navigation method 800 for allowing a user to control autonomous vehicle operation. Such methods may be implemented by a user of a mobile device 110 or other computing device to control autonomous vehicle operation. The described methods may be particularly useful for use of shared vehicles or vehicles parked at a location remote from the user. For example, the method 800 may be implemented to use autonomous (i.e., driverless) taxicab services, to use shared autonomous vehicles (e.g., vehicles owned by neighborhood clubs, retirement homes, or commercial vehicle-sharing organizations), to control an autonomous vehicle for travel by a person not able or not authorized to drive the vehicle manually, or to use an autonomous vehicle for pick-up and drop-off of the user without the user manually driving the vehicle. These uses may include local or long-distance travel by the elderly, picking up children from school, picking up a vehicle owner from a meeting or an airport, or operating a vehicle owned by another party (e.g., a vehicle-sharing organization, a vehicle rental facility, an autonomous taxicab company, etc.), among other uses.

The method 800 may begin by presenting one or more options to automatically route an autonomous vehicle 108 to the user (block 802). Such options may include allowing the user to select or enter locations for operation. If the user is not already at the same location as the vehicle 108, an indication of a starting location may be received from the user (block 804), and the vehicle 108 may be contacted to cause the vehicle 108 to travel to the indicated starting location (block 806). An indication of a target location may similarly be received from the user (block 808). In response to receiving the indication of the target location, a fully autonomous route for the vehicle 108 from the starting location to the target location may be determined (block 810), as described in greater detail above. The vehicle 108 may then be controlled to travel along the route toward the target location (block 812), while monitoring the conditions along the route during the vehicle trip (block 814). If a route adjustment is requested or required during the vehicle trip (block 816), an updated route may be determined (block 818). This may include adjustments necessitated by changing weather or traffic conditions, adjustments to the target location, or selection of interim target locations along the route (e.g., additional stops, rest stops, etc.). Autonomous operation of the vehicle along the route or the updated route may continue until the target destination is reached (block 820), at which point the method 800 may terminate. Although the description below is presented using a mobile device 110 and server 140 for simplicity, the description below may be easily modified for implementation by other systems including one or more of a mobile device 110, on-board computer 114, or server 140.

At block 802, the mobile device 110 may present one or more options regarding automatic routing to the user. In the simplest embodiments, this may include simply presenting an option to the user to begin autonomous routing, such as by running an application or selecting an option within an application. In more advanced embodiments, the options may include options for indicating a starting time, starting location, target location, any interim target locations, number or identity of passengers, vehicle requirement selection (either a specific vehicle or a type or size of vehicle), or other information relating to the autonomous vehicle trip. The current location of the user may be determined by a GPS unit 206 of the mobile device 110 and presented as a selectable starting location. In some embodiments, the starting location may be set as the current location of the vehicle 108 if the vehicle 108 and the user are located at the same place (or within a threshold distance, such as ten yards). In further embodiments, an application (such as the Data Application) may present frequently used options to the user, which may be determined based upon the user's history of prior usage. For example, the user may be presented with a list of predicted starting and/or target locations, which may include common selections such as the user's current location, home, or office. Data from calendar appointments or other data sources associated with the user may also be used to generate options, in some embodiments.

Additionally, the user may be presented with options to enter locations or other data, such as street addresses or names of locations (e.g., post office, city hall, Union Station, etc.). In some embodiments, the allowable locations (particularly target locations or interim target locations) may be limited for some users. For example, a child may have access to use the vehicle 108 to travel between school, home, music lessons, and selected friends' homes, but user entry of other locations may be prohibited.

At block 804, the mobile device 110 may receive a user indication of the starting location. This may be received together with, or separately from, other received information regarding the autonomous vehicle trip. The indication of the starting location may be received as a selected or entered geospatial location or as a current location of the user, which may be determined using the GPS unit 206 or communication unit 220 (e.g., a WiFi receiver) of the mobile device 110. If the starting location is separate from the current location of the vehicle 108, the vehicle 108 may be controlled to travel to the starting location (block 806). This may be achieved by determining and communicating a fully autonomous route to the starting location (or a nearby substitute starting location), communicating such route to the vehicle 108, and transmitting an instruction for the vehicle 108 to autonomously travel to the starting location, as described elsewhere herein. In some embodiments in which the user may request one of a plurality of autonomous vehicles (e.g., from a vehicle pool, from an autonomous taxi service, etc.), the vehicle 108 may first be identified based upon the locations of the plurality of vehicles relative to the starting location, vehicle characteristics, or other relevant considerations. If the starting location is determined to be coincident with the current user location (e.g., when the user is already near or within the vehicle 108), the method may continue without block 806.

At block 808, the mobile device 110 may receive a user indication of the target location, which may also be received separately or together with other information regarding the autonomous vehicle trip (e.g., the starting location). The indication of the target location may include information regarding one or more interim target locations, such as locations for stops along one vehicle trip. In such instances, each interim target location may be treated as a separate target location in a chain of vehicle trips, where the target location of the previous vehicle trip is used as the starting location for the next vehicle trip. The indication may further include information relevant to the vehicle trip, such as a desired time to reach the target location, whether the trip will be a round trip or one-way, or other similar information.

At block 810, the mobile device 110 may determine a fully autonomous route between the starting location and the target location. This may be accomplished as described above with respect to the method 600. In some embodiments, the mobile device 110 may communicate relevant information to the server 140 via the network 130, whereupon the server 140 may determine a fully autonomous route (i.e., an optimal route) between the starting location (i.e., the first geospatial location) and the target location (i.e., the destination geospatial location). As discussed elsewhere herein, the fully autonomous route may be determined using a substitute starting location and/or a substitute target location in some instances, and the route may be optimized for time, distance, cost, safety, or other metrics.

At block 812, the on-board computer 114 may control the vehicle 108 to travel from the starting location to the target location along the determined fully autonomous route using the autonomous operation features of the vehicle 108. In some embodiments, the mobile device 110 or server 140 may communicate with the on-board computer 114 to provide information regarding the route and causing the on-board computer 114 to operate the vehicle 108 along the route. In further embodiments, the on-board computer 114 may determine the route and operate the vehicle 108 along the route without receiving information from the mobile device 110 or server 140.

At block 814, the on-board computer 114 may monitor travel conditions within the vehicle operating environment during autonomous operation. In some embodiments, the mobile device 110 or the server 140 may monitor conditions along the route, including vehicle operating environment conditions from infrastructure communication devices 124 or other vehicles 182 operating along portions of the route. Thus, the mobile device 110 or the server 140 may identify conditions that may require adjustments to the route before the vehicle 108 reaches the location of such problematic conditions (e.g., a construction zone, a vehicle accident, a flooded roadway, etc.). Such information may include autonomous communication data from other autonomous vehicles 182 or infrastructure components 126, such as data indicative of traffic congestion, road integrity, environmental hazards, accidents, or other anomalies. The mobile device 110 or on-board computer 114 may further monitor the vehicle passengers for changes in conditions. For example, the mobile device 110 may present options to a passenger to select an interim target location for a stop along the route (e.g., a shop, a restaurant, a gas station, or a rest area). In further embodiments, the on-board computer 114 may monitor the vehicle 108 to determine whether vehicle refueling or service is needed (e.g., by monitoring fuel levels, tire pressure, sensor operating status, etc.).

At block 816, the mobile device 110, on-board computer 114, or server 140 may determine whether a route adjustment is needed. A route adjustment may be determined to be needed when such adjustment is required to facilitate fully autonomous travel of the vehicle 108 to the target location, when an adjustment is requested by a vehicle passenger or controller, when an adjustment is required for vehicle service or fueling, when an emergency situation occurs, or in other situations where conditions indicate an adjustment to the route is advantageous. For example, the mobile device 110 may determine that an adjustment to the route is needed when a request to stop at a restaurant or café is received from the user. Similarly, the on-board computer 114 may determine that an adjustment is needed when the fuel levels fall below a threshold level, which may be based upon the availability of fueling stations along the remaining portions of the route.

When an adjustment to the route is determined to be needed at block 816, an updated route may be determined at block 818. Updating the route may include determining an interim target location, where appropriate. For example, a nearby restaurant or rest area may be identified as an interim target location if requested by a passenger. As another example, a gas station along the route may be identified when the on-board computer 114 determines that the vehicle 108 should be refueled. In some embodiments, the passenger or user of the mobile device 110 may be presented with a plurality of options for interim target locations (e.g., nearby restaurants or shops), which may be selected as the interim target location. Similarly, a substitute target location may be determined if the conditions change such that the target location can no longer be reached via fully autonomous operation along the route. If an interim target location or substitute target location is used, the mobile device 110, on-board computer 114, or server 140 may determine an optimal fully autonomous route to the interim target location or substitute target location, in a manner similar to that discussed above. The vehicle 108 may then be controlled by the on-board computer 114 to travel to the interim or substitute target location. If an adjusted route to an interim target location is determined, the vehicle trip may continue following the stop at the interim target location. For example, a user may select an interim target location at which one or more passengers may enter and/or exit the vehicle. The user or passenger may issue a command to continue the vehicle trip following the stop, or the vehicle 108 may resume travel upon determining that all passengers have returned to the vehicle 108. In some instances, the route may be updated without changing the target location, in which case an adjusted route may be determined as discussed above and autonomous operation may continue without interruption.

At block 820, the on-board computer 114 may determine whether the vehicle 108 has reached the (original, adjusted, or substitute) target location. In some embodiments, the on-board computer 114 may determine the vehicle's position using a GPS unit 206 to determine whether the target location has been reached. If the target location has not yet been reached, the on-board computer 114 may continue to cause the vehicle 108 to operate autonomously along the route toward the target location (block 812). Once the target location has been reached, the vehicle 108 may stop, and the method 800 may terminate. In some embodiments, the on-board computer 114 may identify a parking or stopping location at or near the target location, to which the on-board computer 114 may control the vehicle 108 before stopping or parking.

Exemplary Autonomous Vehicle Parking Methods

Figure 9:
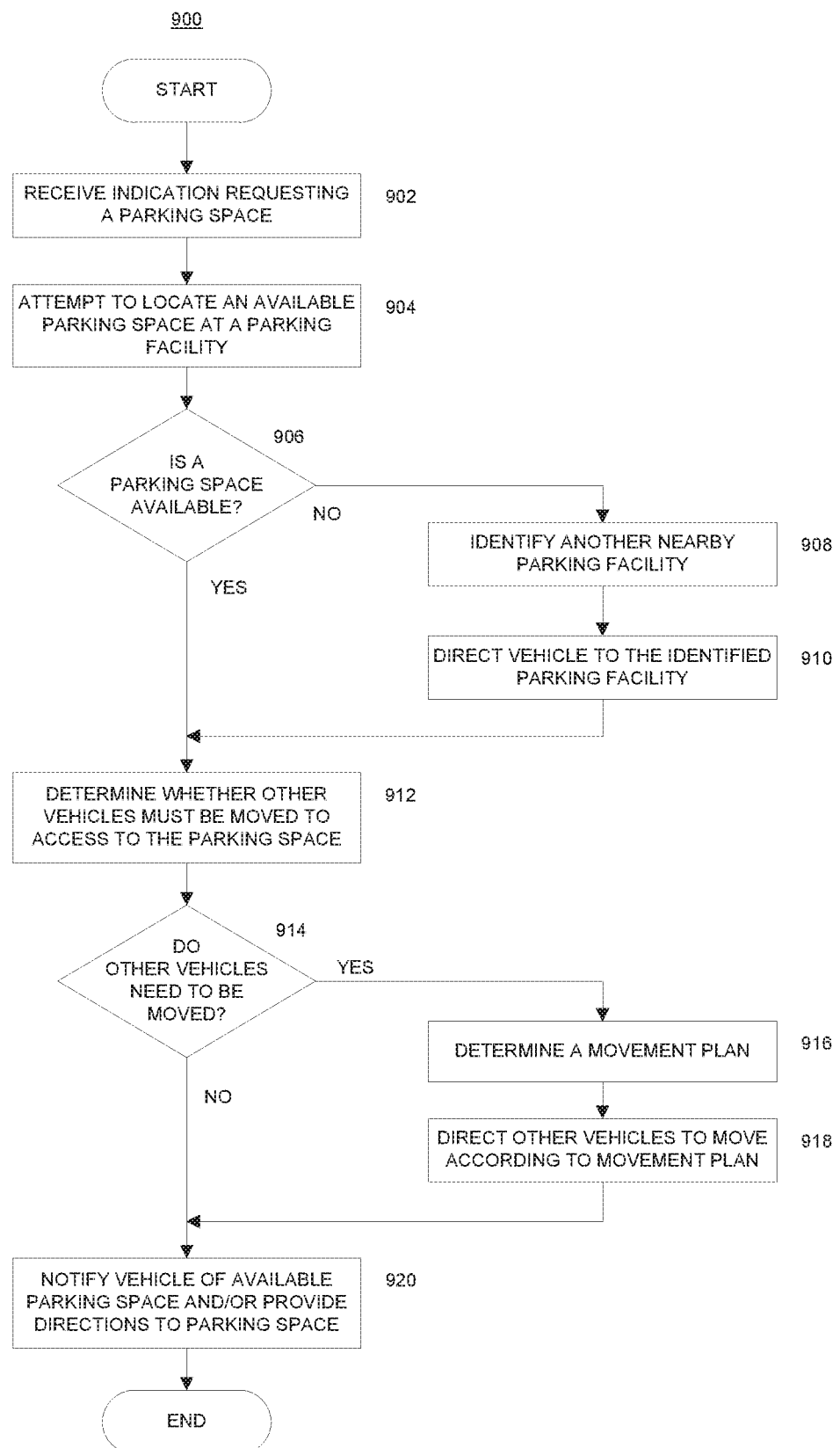
FIG. 9 illustrates a flow diagram of an exemplary autonomous vehicle parking method for parking an autonomous vehicle.
Figure 10:
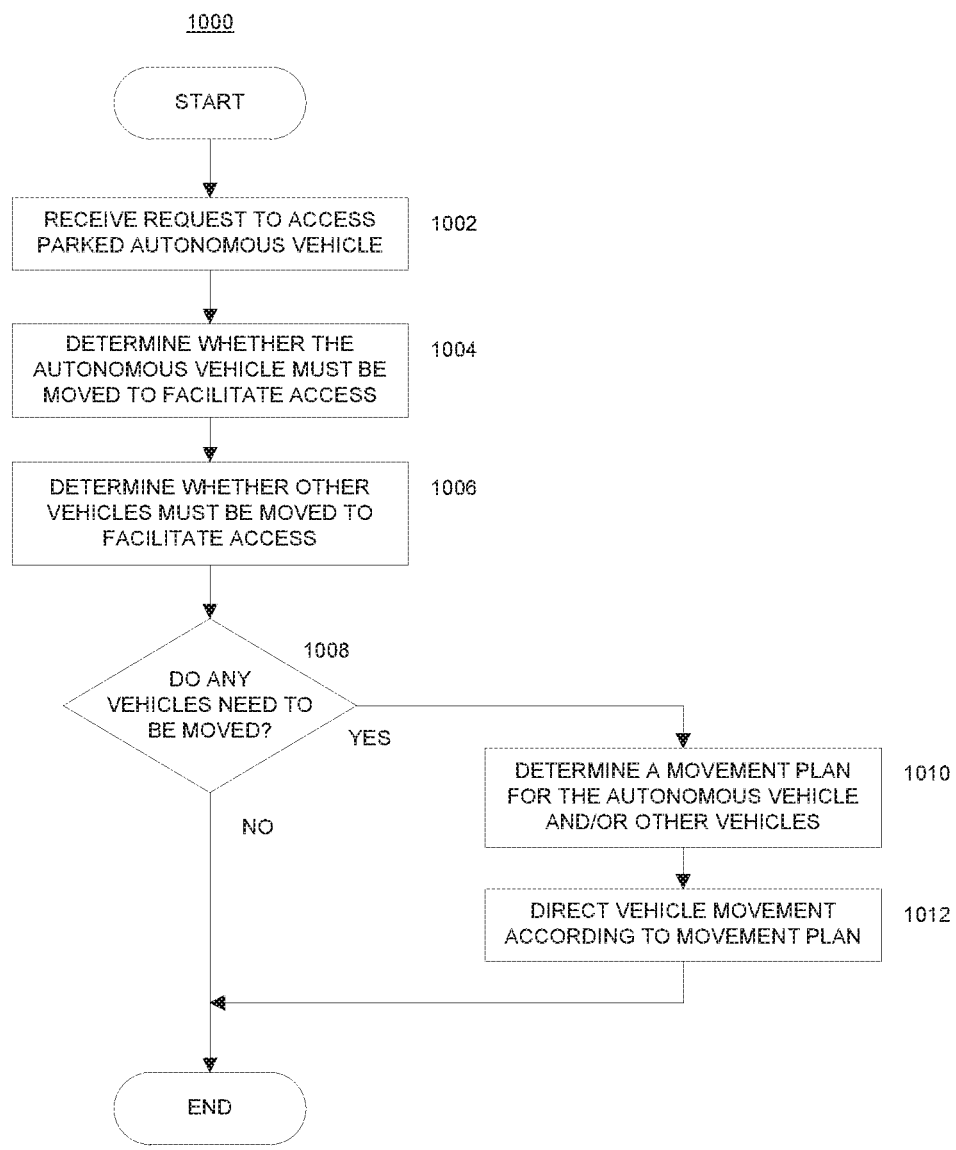
FIG. 10 illustrates a flow diagram of an exemplary autonomous vehicle parking method for retrieving a parked autonomous vehicle.

FIGS. 9 and 10 illustrate flow diagrams of exemplary autonomous vehicle parking methods 900 and 1000 for facilitating parking of an autonomous vehicle 108 in a parking facility. Parking facilities may include parking garages, parking lots, or other locations (e.g., roadside parking spaces). FIG. 9 relates to an exemplary autonomous vehicle parking method 900 for locating a parking space and causing the autonomous vehicle 108 to travel to the parking space. FIG. 10 relates to an exemplary autonomous vehicle parking method 1000 for accessing a parked autonomous vehicle 108. Together, the methods 900 and 1000 may be used to obtain a parking space for an autonomous vehicle 108 and later retrieve the autonomous vehicle 108 from the parking space. By using the autonomous operation capabilities of the vehicle 108 and other vehicles in a parking facility, substantially more vehicles may be parked in less space. Additionally, such parking facilities may be located at a distance from popular destinations or high-density areas, as the vehicle 108 may travel from a passenger drop-off location to the parking facility and from the parking facility to a passenger pick-up location without any passengers. Thus, the exemplary methods described below may be used to improve efficiency and convenience of parking an autonomous vehicle 108.

Although the methods 900 and 1000 are described below as using a server 140 for simplicity, the description below may be easily modified for implementation by other systems including one or more of a mobile device 110, on-board computer 114, or server 140. In some embodiments, the server 140 may be associated with one or more parking facilities. In other embodiments, the server 140 may be associated with a third party that communicates with external computing devices 186 and/or smart infrastructure components 188 within parking facilities. Such third-party server 140 may communicate with the on-board computer 114 of the vehicle 108 or a mobile device 110 of a vehicle operator or passenger via an application, such as the Data Application.

The exemplary autonomous vehicle parking method 900 illustrated in FIG. 9 may begin by receiving an indication requesting a parking space for an autonomous vehicle 108 (block 902). Upon receiving an indication of such request, the method may proceed by attempting to locate an available parking space within a parking facility (block 904). The parking facility may be identified in the indication or may be located near the vehicle's current location or destination. If the parking facility does not have a parking space available for the vehicle (block 906), another nearby facility with an available parking space may be identified (block 908), and the vehicle may be directed to the nearby parking facility (block 910). If the parking facility does have a parking space available for the vehicle (block 906) or when the vehicle has been directed to the nearby parking facility (block 910), the method 900 may continue by determining whether parking the vehicle requires moving one or more other vehicles in the parking facility (block 912). For example, parking the vehicle may require moving other vehicles out of the way.

If it is determined that other vehicles must be moved (block 914), a movement plan may be determined (block 916) and implemented to cause the other vehicles to move (block 918). Finally, the vehicle may be notified of the parking space and/or provided information regarding the location of the parking space (block 920). In some embodiments, the vehicle may be controlled to travel to the parking spot autonomously, with or without passengers.

At block 902, the server 140 may receive an indication requesting a parking space for the vehicle 108. The indication may include an indication of a specific parking facility or a location near which the vehicle 108 should be parked (e.g., a destination or drop-off location). Additionally, or alternatively, the indication may include requirements for the parking space, such as requirements associated with price, distance from a relevant location, or accessibility. The indication may further indicate an estimate of a duration of time the vehicle 108 is anticipated to be parked before being retrieved. In some embodiments, the request may be automatically generated based upon a location of the vehicle 108, such as a destination geospatial location or a current location determined by a GPS unit 206. In further embodiments, one or more options regarding parking facilities or locations may be presented to a vehicle operator or user of a mobile device 110. Once an option has been selected or a request for a parking space has been otherwise manually or automatically generated, the indication requesting a parking space may be communicated to the server 140 via network 130 by the mobile device 110 or on-board computer 114.

At block 904, the server 140 may attempt to locate an available parking space at a parking facility. The parking facility may be selected based upon the received indication of the request for a parking space, either from a direct request for the specific parking facility or an indirect request for a parking space meeting certain requirements (e.g., proximity to a location obtained from the GPS unit 206). In some embodiments, determining whether a parking space is available may include determining the total number of vehicles currently in the parking facility and comparing this number to the total number of parking spaces available for vehicle use in the facility. Each of these numbers may be adjusted to account for restricted-use parking spaces (e.g., reserved parking spaces and vehicles that park in such spaces, electric vehicle parking spaces and electric vehicles, etc.). In further embodiments, the server 140 may determine parking space availability by receiving (such as in response to transmission of an electronic polling message) parking space data from each of a plurality of parking spaces at the parking facility, such parking space data indicating whether a parking spot is occupied or vacant. Such parking space data may be obtained from sensors disposed within the parking facility via one or more infrastructure communication devices 124 within the infrastructure component 126 (viz., the parking facility).

To reduce the need to move vehicles, the parking spaces within a parking facility may be categorized based upon accessibility of the vehicle or expected duration of parking. In such embodiments, the server 140 may attempt to find an appropriate parking space in such lanes or queues. For example, vehicles may be stacked in lanes or queues based upon estimated parking duration. These may follow first-in first-out (FIFO) or last-in first-out (LIFO) principles in various embodiments. For example, a FIFO lane may include a plurality of vehicles each estimated to be parked approximately the same length of time (e.g., 30 minutes, 2 hours, 8 hours, 5 days, etc.), with vehicles being parked initially at the end of the queue and exiting from the front of the queue. As vehicles exit the front of the queue, the other parked vehicles will move forward toward the front. Over time, the average vehicle will move forward from the end to the front of the queue. Thus, fewer movements of vehicles will generally be required. Alternatively, in a LIFO lane, vehicles are parked at the end of the queue and retrieved from the end of the queue, so each LIFO lane will preferably hold a number of vehicles expected to be parked for varying durations. Vehicles expected to be parked for shorter periods of time may be parked at the end of longer LIFO queues because they are not expected to block the queue for long. In a sample embodiment of a parking facility using a plurality of LIFO lanes, the server 140 may estimate a time when each vehicle is expected to be retrieved when each vehicle is initially parked. A later-arriving vehicle may then be parked at the end of a lane having an end-of-queue vehicle with the earliest estimated time of retrieval that is later than the estimated time of retrieval of the later-arriving vehicle. In such embodiments, the parking facility may attempt to locate a duration-appropriate or time-appropriate parking space for the vehicle 108. If no time-appropriate parking space is found (e.g., if all similar-duration FIFO lanes are filled, or if the vehicle 108 is expected to be parked much longer than any end-of-queue vehicles in LIFO lanes), the server may determine to move one or more vehicles or may determine that a parking space cannot be found for the vehicle 108 in the parking facility.

As a yet further embodiment, the server 140 may receive parking space data from a database 146 storing indications of whether each parking space is occupied and, in some embodiments, an identifier for each vehicle parked in the parking facility. For example, each vehicle may be assigned a parking space within the parking facility, or each vehicle may electronically register its location within the parking facility upon parking. Similarly, the server 140 may receive (such as in response to transmission of an electronic polling message) geospatial location data indicating the locations of each vehicle within the parking facility (e.g., from a GPS unit 206 of each vehicle), which may be compared with known geospatial locations of all (or all unrestricted) parking spaces within the parking facility.

At block 906, the server 140 may determine whether an available parking space has been located within the parking facility. If a parking space has been located, the method 900 may continue with block 912. If a parking space has not been located at the parking facility, the server 140 may attempt to locate a parking space at an alternative parking facility. At block 908, the server 140 may attempt to identify an alternative parking facility with an available parking space. The server 140 may communicate with one or more nearby parking facilities to locate an available parking space within at least one alternative parking facility, as described above with respect to attempting to locate a parking space within the parking facility.

In some embodiments, the server 140 may identify one or more parking facilities in response to the received indication requesting a parking space, which parking facilities may be ranked or ordered according to desirability of each facility based upon relevant criteria (e.g., location, price, risk of vehicle damage or theft while parked, etc.). In such embodiments, the server 140 may attempt to identify and/or reserve an available parking space at a parking facility based upon such ordering. For example, the server 140 may first attempt to obtain a parking space in the most desirable parking facility, then attempt to obtain a parking space in the second most desirable parking facility if the first parking facility is full, etc., until a parking space is obtained. Once a parking space is located in an alternative parking facility, the server 140 may direct the vehicle 108 to the alternative parking facility. This may include determining an autonomous or other route from the vehicle's location to the alternative parking facility, as discussed above. In some embodiments, this may include determining the vehicle's current location using a GPS unit 206, determining an autonomous route to the alternative parking facility, and causing the vehicle 108 to autonomously travel to the alternative parking facility.

Regardless of whether the parking space is located at the first parking facility or at an alternative parking facility, some embodiments of the method 900 may allow the driver and/or passengers to exit the vehicle 108 at a drop-off location separate from the parking space. Such drop-off location may be located at an entrance to the parking facility or at a remote location (e.g., where the autonomous operation features control the vehicle 108 as an automated valet to allow the passengers to exit the vehicle closer to their destination, regardless of the location of the parking facility). Although some embodiments may allow or require the vehicle operator to remain in the vehicle or to control the vehicle within the parking facility until the vehicle is parked, alternative embodiments may require the vehicle passengers to exit the vehicle at a location separate from the parking space. This may be required in order to facilitate closer parking of vehicles within the parking facility, such as in a stacked parking configuration. Without the necessity of a driver, vehicles may also be parked closer together because no room is needed for opening vehicle doors or allowing the driver to walk between vehicles. Moreover, vehicles may be parked in stacked rows (i.e., without driving lanes between vehicles, such that at least some vehicles cannot be moved without first moving other vehicles). Such stacked parking is known in valet parking facilities, but it is typically limited to one or two blocked rows of vehicles because each vehicle must be manually moved by a valet. Thus, the time increases significantly for each additional blocked row. In contrast, autonomous vehicle parking may facilitate many more rows of blocked vehicles because a plurality of vehicles can simultaneously be moved as needed to allow vehicles into or out of parking spaces.

Additionally, multi-site parking facilities may move vehicles between sites to optimize use of sites near popular destinations. Thus, the server 140 may determine whether access to a vehicle 108 is likely to be requested within a period of time or whether the vehicle 108 is likely to remain parked. If it is likely that access to the vehicle 108 will not be requested by the vehicle operator for an extended period of time (e.g., at an airport), the vehicle 108 may be moved to a more remote site to make room for incoming vehicles and vehicles more likely to be requested in the near future. Determining whether the vehicle operator is likely to request access to the vehicle 108 may include, in some embodiments, determining a geospatial position of the vehicle operator's mobile device 110 via a GPS unit 206 or otherwise (e.g., the location of the vehicle operator's smartphone based upon network connection points).

At block 912, the server 140 may determine whether parking the vehicle 108 requires moving one or more other vehicles. Other vehicles may need to be moved in some instances to allow the vehicle 108 access to a parking space, such as in the situations described above. If the server 140 determines that at least one vehicle other than the vehicle 108 must be moved before the vehicle 108 can park in the located parking space (block 914), the server 140 may further determine a movement plan for all of the other vehicles that need to be moved (block 916). The movement plan may include one or more stages of movements of one or more vehicles to permit access to the located parking space for the vehicle 108. Such movements may then be automatically controlled by the server 140, such as by an automatic rearrangement routing program operating in conjunction with the autonomous routing methods described above or a user selecting targets for vehicle movement. For example, the server 140 may determine a sequence of movements by vehicles to rearrange their positions in parking spaces such that the vehicle 108 may access the located parking space.

In some embodiments, this may include moving one of the other vehicles out of the located parking space, such as by moving the other vehicle to a more remote location within the parking facility or to a separate site associated with the parking facility, as discussed above. For example, a vehicle parked in a located parking space that is near an entrance of the parking facility or at a short-term holding site of a multi-site parking facility may be moved to another parking space that is further from the destination of the vehicle operator. This may be done in order to allow the vehicle 108 to park in the located parking space (at least temporarily).

Once the movement plan has been determined, the server 140 may direct the one or more other vehicles to move according to the movement plan. This may include sending target destinations to the one or more other vehicles, or it may include directly controlling the routes of the one or more other vehicles. In some embodiments, the movement plan may further include routing instructions for the vehicle 108.

At block 920, the server 140 may notify the vehicle 108 of the available parking space at the parking facility. This may include providing information regarding the location of the parking facility or other relevant information regarding the facility. Additionally, or alternatively, this may include determining a route and providing directions to the parking facility or to the parking space within the parking facility. In some embodiments, the on-board computer 114 may control the vehicle 108 to the parking space in a fully autonomous mode based upon the information received from the server 140. In other embodiments, the vehicle operator may control the vehicle 108 in a manual or semi-autonomous mode to the parking space indicated by communications received from the server 140. As discussed above, the vehicle 108 may travel autonomously without passengers from a drop-off location to the parking space in some embodiments. The server 140 may provide the vehicle 108 with an indication of the drop-off location and/or autonomous route from the drop-off location to the parking space.

The exemplary autonomous vehicle parking method 1000 illustrated in FIG. 10 may begin by receiving a request to access an autonomous vehicle 108 parked in a parking facility (block 1002). The method 1000 may be implemented while the vehicle 108 is parked in a parking space of a parking facility, after being parked according to the exemplary method 900 above or otherwise. The method 1000 may determine whether the vehicle 108 should be moved (block 1004) or whether another vehicle should be moved (block 1006) to facilitate access. If it is determined that the vehicle 108 or another vehicle should be moved (block 1008), the server 140 may determine a movement plan (block 1010) and direct the relevant vehicle(s) to move according to the movement plan (block 1012). As noted above, the vehicle 108 may be parked at a location remote from or inaccessible to the vehicle operator and other passengers, in some embodiments. Thus, the vehicle 108 or other vehicles may need to be moved to provide access to the vehicle 108, which may include retrieving the vehicle 108 from the parking facility or simply providing access to the vehicle 108 (e.g., to retrieve items stored within the vehicle 108).

At block 1002, the server 140 may receive a request from the vehicle operator or other authorized user (e.g., a vehicle owner) to obtain access to the vehicle 108 from the parking space of the parking facility. The user may send such a request from a mobile device 110, such as by selecting an option to request access to the vehicle 108 via a Data Application. The request may include a geospatial location associated with the request, such as a pick-up location. Such pick-up location may be selected by the user, may be automatically determined as the user's current location based upon location data from sensors of the mobile device 110 (such as GPS data from a GPS unit 206), or may be a default location. The default location may be the location at which the user exited the vehicle 108 or a designated drop-off/pick-up area of the parking facility (e.g., an entrance to a hotel or parking garage). In some embodiments, the request may include an indication of whether the user intends to remove the vehicle 108 from the parking facility to use the vehicle 108 for travel or whether the user desires access to retrieve or store items within the vehicle 108 (e.g., luggage, tickets, or other items intentionally or inadvertently left within the vehicle).

In further embodiments, the server 140 may receive or generate an automatic request indicating likely user demand for access to the vehicle 108 based upon a prediction of when the user is likely to desire access to the vehicle. For example, the server 140 may determine that the user is likely to request access to the vehicle 108 at a certain time. Such determination may be based upon prior user behavior (e.g., leaving the parking facility at approximately the same time each day) or may be based upon other information (e.g., average duration of parking of vehicles in a location, such as an average of five hours for vehicles parked near a theater on a weekend evening). Such automatic requests may be generated and received by the server 140, or it may be generated by the mobile device 110 of the user and communicated to the server 140.

In some embodiments, the automatic request may be generated based upon the user's location, which may be determined using a GPS unit 206 or other sensor 120 of the mobile device 110 (e.g., using WiFi or Bluetooth signals for device positioning). For example, the automatic request may be generated when the user is determined to be within a request threshold distance of a relevant location (e.g., within 200 meters of the parking facility or the vehicle pick-up location, etc.). The automatic request may be used together with an actual user request in some embodiments, such that the automatic request causes the vehicle 108 to be moved to a staging area or parking site near the anticipated pick-up location. Similarly, the automatic request may cause the server 140 to move the vehicle 108 from its parking space to another parking space where the vehicle 108 is not blocked, viz. where the vehicle 108 is free to exit the parking facility without requiring any other vehicles to be moved.

At block 1004, the server 140 may determine whether the vehicle 108 should be moved to facilitate access in response to receiving the request. The determination may depend in part upon whether the request indicates that the vehicle 108 will be removed from the parking facility or that the user simply requests access to the vehicle 108. The determination may further depend in part upon whether the vehicle 108 is located in a parking space to which the user has authorized access. For example, the vehicle 108 may be parked in an area that is generally inaccessible to the user or where access is restricted for safety or security reasons. Additionally, or alternatively, the determination may depend in part upon whether the pick-up location for the vehicle 108 is separate from the parking space. In some embodiments, the vehicle 108 may be moved from an accessible or inaccessible parking space to a more convenient pick-up location, which pick-up location may be part of the parking facility (e.g., an entrance area or exit area) or separate from the parking facility (e.g., an entrance to a restaurant, hotel, airport, store, office building, etc.). In some embodiments, the determination may further include a preliminary determination of the location of the vehicle 108 (e.g., such as determining a GPS location, a dead-reckoning location, or a location determined using wireless communication triangulation techniques using wireless communication between an autonomous vehicle and one or more parking lot-mounted sensors and/or transceivers).

At block 1006, the server 140 may further determine whether any other vehicles must be moved to allow the vehicle 108 to exit the parking facility and/or reach the pick-up location. This may be determined in a manner similar to the determination of whether any other vehicles should be moved to allow the vehicle 108 to reach the parking space, as discussed above.

At block 1008, the server 140 may determine whether any vehicles (either the vehicle 108 or another vehicle) must be moved to facilitate access in response to receiving the request. If one or more vehicles must be moved, the server 140 may determine a movement plan for the vehicles that must be moved (block 1010) and direct relevant vehicles to move in accordance with the movement plan (block 1012) using the routing methods discussed above. The movement plan may include moving vehicles not directly required to be moved, but the movement of which nonetheless facilitates access to the vehicle 108. For example, vehicles not directly blocking the vehicle 108 may be moved in order to make room for vehicles directly blocking the vehicle 108 to temporarily move out of the route of the vehicle 108.

In some embodiments, the server 140 may direct the relevant vehicles to move by communicating part of all of the movement plan to the relevant vehicles. In other embodiments, the server 140 may directly control the movements of each of the relevant vehicles in real-time by communicating control commands or navigational commands. Such navigational commands may be higher-level commands that direct the vehicle 108 to travel a specific distance in a specific direction relative to its current location (e.g., move 2.3 meters forward, turn right with a turning radius of 1.8 meters through 90 degrees, etc.), without specifying the detailed control commands necessary to operate the control components of the vehicle 108 (e.g., increase throttle 20% per second for 2.375 seconds, turn front wheels clockwise 37 degrees, etc.). Once any necessary movements have been completed or when the server 140 determines that no vehicles must be moved, the method 1000 may terminate.

Exemplary Methods of Determining Risk Using Telematics Data

As described herein, telematics data may be collected and used in monitoring, controlling, evaluating, and assessing risks associated with autonomous or semi-autonomous operation of a vehicle 108. In some embodiments, the Data Application installed on the mobile computing device 110 and/or on-board computer 114 may be used to collect and transmit data regarding vehicle operation. This data may include operating data regarding operation of the vehicle 108, autonomous operation feature settings or configurations, sensor data (including location data), data regarding the type or condition of the sensors 120, telematics data regarding vehicle regarding operation of the vehicle 108, environmental data regarding the environment in which the vehicle 108 is operating (e.g., weather, road, traffic, construction, or other conditions). Such data may be transmitted from the vehicle 108 or the mobile computing device 110 via radio links 183 (and/or via the network 130) to the server 140. The server 140 may receive the data directly or indirectly (i.e., via a wired or wireless link 183e to the network 130) from one or more vehicles 182 or mobile computing devices 184. Upon receiving the data, the server 140 may process the data to determine one or more risk levels associated with the vehicle 108.

In some embodiments, a plurality of risk levels associated with operation of the vehicle 108 may be determined based upon the received data, using methods similar to those discussed elsewhere herein, and a total risk level associated with the vehicle 108 may be determined based upon the plurality of risk levels. In other embodiments, the server 140 may directly determine a total risk level based upon the received data. Such risk levels may be used for vehicle navigation, vehicle control, control hand-offs between the vehicle and driver, settings adjustments, driver alerts, accident avoidance, insurance policy generation or adjustment, and/or other processes as described elsewhere herein.

In some aspects, computer-implemented methods for monitoring the use of a vehicle 108 having one or more autonomous operation features and/or adjusting an insurance policy associated with the vehicle 108 may be provided. Such methods may comprise the following, with the customer's permission or affirmative consent: (1) collecting sensor data regarding operation of the vehicle 108 from one or more sensors 120 of a mobile computing device 110 and/or otherwise disposed within the vehicle 108; (2) determining telematics data regarding operation of the vehicle 108 based upon the collected sensor data by the mobile computing device 110 and/or on-board computer 114; (3) determining feature use levels indicating usage of the one or more autonomous operation features during operation of the vehicle 108 by an on-board computer of the vehicle 114; (4) receiving the determined feature use levels from the on-board computer 114 at the mobile computing device 110; (5) transmitting information including the telematics data and the feature use levels from the mobile computing device 114 and/or a communication component 122 of the vehicle 108 to a remote server 140 via a radio link 183 or wireless communication channel; (6) receiving the telematics data and the feature use levels at one or more processors of the remote server 140; and/or (7) determining a total risk level associated with operation of the vehicle 108 based at least in part upon the received telematics data and feature use levels by one or more processors of the remote server 140. The remote server 140 may receive the information through a communication network 130 that includes both wired and wireless communication links 183.

In some embodiments, the mobile computing device 110 and/or on-board computer 114 may have a Data Application installed thereon, as described above. Such Data Application may be executed by one or more processors of the mobile computing device 110 and/or on-board computer 114 to, with the customer's permission or affirmative consent, collect the sensor data, determine the telematics data, receive the feature use levels, and transmit the information to the remote server 140. The Data Application may similarly perform or cause to be performed any other functions or operations described herein as being controlled by the mobile computing device 110 and/or on-board computer 114.

The telematics data may include data regarding one or more of the following regarding the vehicle 108; acceleration, braking, speed, heading, and/or location. The telematics data may further include information regarding one or more of the following: time of day of vehicle operation, road conditions in a vehicle environment in which the vehicle is operating, weather conditions in the vehicle environment, and/or traffic conditions in the vehicle environment. In some embodiments, the one or more sensors 120 of the mobile computing device 110 may include one or more of the following sensors disposed within the mobile computing device 110; an accelerometer array, a camera, a microphone, and/or a geolocation unit (e.g., a GPS receiver). In further embodiments, one or more of the sensors 120 may be communicatively connected to the mobile computing device 110 (such as through a wireless communication link).

The feature use levels may be received by the mobile computing device 110 from the on-board computer 114 via yet another radio link 183 between the mobile computing device 110 and the on-board computer 114, such as link 116. The feature use levels may include data indicating adjustable settings for at least one of the one or more autonomous operation features. Such adjustable settings may affect operation of the at least one of the one or more autonomous operation features in controlling an aspect of vehicle operation, as described elsewhere herein.

In some embodiments, the method may further including receiving environmental information regarding the vehicle's environment at the mobile computing device 110 and/or on-board computer 114 via another radio link 183 or wireless communication channel. Such environmental information may also be transmitted to the remote server 140 via the radio link 183 and may be used by the remote server 140 in determining the total risk level. In some embodiments, the remote server 140 may receive part or all of the environmental information through the network 130 from sources other than the mobile computing device 110 and/or on-board computer 114. Such sources may include third-party data sources, such as weather or traffic information services. The environmental data may include one or more of the following: road conditions, weather conditions, nearby traffic conditions, type of road, construction conditions, location of pedestrians, movement of pedestrians, movement of other obstacles, signs, traffic signals, or availability of autonomous communications from external sources. The environmental data may similarly include any other data regarding a vehicle environment described elsewhere herein.

In further embodiments, the method may include collecting addition telematics data and/or information regarding feature use levels at a plurality of additional mobile computing devices 184 associated with a plurality of additional vehicles 182. Such additional telematics data and/or information regarding feature use levels may be transmitted from the plurality of additional mobile computing devices 184 to the remote server 140 via a plurality of radio links 183 and receive at one or more processors of the remote server 140. The remote server 140 may further base the determination of the total risk level at least in part upon the additional telematics data and/or feature use levels.

Some embodiments of the methods described herein may include determining, adjusting, generating, rating, or otherwise performing actions necessary for creating or updating an insurance policy associated with the vehicle 108. Thus, the remote server 140 may receive a request for a quote of a premium associated with a vehicle insurance policy associated with the vehicle 108. Such request may be transmitted via the network 130 from the mobile computing device 110 or another computing device associated with an insurance customer. Alternatively, such request may be generated upon the occurrence of an event, such as the passage of time or a change in a risk level associated with operation of the vehicle 108. In some embodiments, a routine executing on the sever 140 may generate the request based upon the occurrence of an event. Upon receiving such request, the remote server 140 may determine a premium associated with the vehicle insurance policy based at least in part upon the total risk level. An option to purchase the vehicle insurance policy may be presented to a customer associated with the vehicle 108, or information regarding an (actual or predicted) adjustment to an insurance policy may be presented to the customer. For example, the server 140 may cause a predicted change to an insurance policy (e.g., an increase or decrease in a premium) to be presented to the vehicle operator, such as when the vehicle operator is adjusting autonomous operation feature settings. The remote server 140 may alternatively, or additionally, provide information regarding the premium, coverage levels, costs, discounts, rates, or similar information associated with the insurance policy to be presented to the customer for review and/or approval by the mobile computing device 110 or another computing device associated with the customer.

Risk Assessment

The present embodiments may relate to risk assessment and insurance premium calculation. Autonomous software data may be analyzed to measure the risks of transitioning between human and vehicle as the driver (which may vary by driving environment, e.g., transitioning on the highway, when approaching construction, when exiting the highway, when the driver becomes impaired, and when the driver becomes distracted). Accidents related to the transition of control between the driver and the vehicle may become a common cause of accidents for autonomous vehicles. An insurance provider may be able to provide users information about instances when the user resumed control too late, or disengaged too soon, in order to help users transfer control more safely and reduce the risk of future accidents. Insurance provider remote servers may also be able to notify users of instances in which they themselves or other human drivers have activated autonomous driving features in driving environments for which the technology was not intended, such as using autonomous highway driving features on narrow country roads when intended for use only on divided highways.

An assessment may be performed that compares a vehicle's autonomous capabilities against how drivers are using the features. The present embodiments may be configured to measure when an autonomous vehicle is in control, when the driver is in control, neither, or both. The times when both the driver and the vehicle have partial or joint control may also be determined and measured. These times may present higher risk, and an appropriate auto insurance premium may be higher based upon the number of instances of partial or joint control (or partial lack of control), i.e. the frequency of control transitions. Based upon how the autonomous vehicle software handles these partial or joint control situations, premiums or discounts may be adjusted accordingly based upon risk.

The present embodiments may also be associated with unit-based costs (e.g., per-mile or per-minute premiums) that may only charge for non-autonomous driving or charge a flat fee plus non-autonomous driving factor or fee. For instance, a vehicle manufacturer's policy may cover autonomous driving liability, and manual driving liability for individual customers may be covered via a personal liability policy. It is noted that a personal liability policy may have a lower premium because of commercial policy coverage. An insurance policy may be used to define autonomous driving. Autonomous vehicle data may be analyzed to determine liability for individual claims. Data, such as sensor or system data, may include whether a customer performed required maintenance, and/or met responsibilities defined by an original equipment manufacturer (OEM). Insurance policies may state that if a loss is not covered by the OEM, the insurance provider policy will cover the loss (i.e., the insurance provider provides "gap" coverage). Also, a commercial may cover the OEM, software developer, and/or hardware developer only when vehicle is operating in autonomous mode policy (e.g., product liability). Autonomous vehicle data may be analyzed to determine liability for a claim, including whether a customer performed required maintenance, met responsibilities defined by OEM, and/or what components were involved in leading to or causing a vehicle collision. Insurance premiums for product liability for an autonomous system may only be charged to the customer when the autonomous system is used. For instance, a supplier that sells adaptive cruise control systems or technology may only be charged for product liability when the adaptive cruise control systems or technology are being used—similar to usage-based insurance, whether usage is measured by miles or operational time. The present embodiments may also provide non-insurance based uses. Road coverage maps may be developed or generated for various autonomous vehicle software. Users may be able to view which autonomous vehicles work in their city, and/or for their typical daily commute. Autonomous vehicles may also be used to scan license plates for police alerts, stolen vehicles, etc.

Autonomous Vehicle Insurance

The disclosure herein relates in part to insurance policies for vehicles with autonomous operation features. Accordingly, as used herein, the term "vehicle" may refer to any of a number of motorized transportation devices. A vehicle may be a car, truck, bus, train, boat, plane, motorcycle, snowmobile, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. Autonomous operation features may include semi-autonomous operation features configured to control a part of the operation of the vehicle while the vehicle operator controls other aspects of the operation of the vehicle.

The term "autonomous vehicle" means a vehicle including at least one autonomous operation feature, including semi-autonomous vehicles. A "fully autonomous vehicle" means a vehicle with one or more autonomous operation features capable of operating the vehicle in the absence of or without operating input from a vehicle operator. Operating input from a vehicle operator excludes selection of a destination or selection of settings relating to the one or more autonomous operation features. Autonomous and semi-autonomous vehicles and operation features may be classified using the five degrees of automation described by the National Highway Traffic Safety Administration's.

Additionally, the term "insurance policy" or "vehicle insurance policy," as used herein, generally refers to a contract between an insurer and an insured. In exchange for payments from the insured, the insurer pays for damages to the insured which are caused by covered perils, acts, or events as specified by the language of the insurance policy. The payments from the insured are generally referred to as "premiums," and typically are paid by or on behalf of the insured upon purchase of the insurance policy or over time at periodic intervals. Although insurance policy premiums are typically associated with an insurance policy covering a specified period of time, they may likewise be associated with other measures of a duration of an insurance policy, such as a specified distance traveled or a specified number of trips. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company. The terms "insured," "insured party," "policyholder," and "customer" are used interchangeably herein to refer to a person, party, or entity (e.g., a business or other organizational entity) that is covered by the insurance policy, e.g., whose insured article or entity is covered by the policy. Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Although the exemplary embodiments discussed herein relate to automobile insurance policies, it should be appreciated that an insurance provider may offer or provide one or more different types of insurance policies. Other types of insurance policies may include, for example, commercial automobile insurance, inland marine and mobile property insurance, ocean marine insurance, boat insurance, motorcycle insurance, farm vehicle insurance, aircraft or aviation insurance, and other types of insurance products.

Some embodiments described herein may relate to assessing and pricing insurance based upon autonomous (or semi-autonomous) operation of the vehicle 108. Risk levels and/or insurance policies may be assessed, generated, or revised based upon the use of autonomous operation features or the availability of autonomous operation features in the vehicle 108. Additionally, risk levels and/or insurance policies may be assessed, generated, or revised based upon the effectiveness or operating status of the autonomous operation features (i.e., degree to which the features are operating as intended or are impaired, damaged, or otherwise prevented from full and ordinary operation), location (e.g., general areas, types of areas, or specific road segments) or duration (e.g., distance, time duration of operation, time of day, continuous operation, etc.) of autonomous operation feature use, whether recommendations for appropriate feature use or optimal routes are followed, or other information associated with the methods described herein. In particular, compliance, noncompliance, or degree of compliance with recommendations or requirements of allowable or optimal routes (including degree of manual or autonomous operation along portions of such routes) may be used to determine discounts, surcharges, fees, premiums, etc. Thus, information regarding the capabilities or effectiveness of the autonomous operation features available to be used or actually used in operation of the vehicle 108 may be used in risk assessment and insurance policy determinations.

Insurance providers currently develop a set of rating factors based upon the make, model, and model year of a vehicle. Models with better loss experience receive lower factors, and thus lower rates. One reason that this current rating system cannot be used to assess risk for vehicles using autonomous technologies is that many autonomous operation features vary for the same vehicle model. For example, two vehicles of the same model may have different hardware features for automatic braking, different computer instructions for automatic steering, and/or different artificial intelligence system versions. The current make and model rating may also not account for the extent to which another "driver." in this case the vehicle itself, is controlling the vehicle. The present embodiments may assess and price insurance risks at least in part based upon autonomous operation features that replace actions of the driver. In a way, the vehicle-related computer instructions and artificial intelligence may be viewed as a "driver."

Insurance policies, including insurance premiums, discounts, and rewards, may be updated, adjusted, and/or determined based upon hardware or software functionality, and/or hardware or software upgrades, associated with autonomous operation features. Insurance policies, including insurance premiums, discounts, etc. may also be updated, adjusted, and/or determined based upon the amount of usage and/or the type(s) of the autonomous or semi-autonomous technology employed by the vehicle. In one embodiment, performance of autonomous driving software and/or sophistication of artificial intelligence utilized in the autonomous operation features may be analyzed for each vehicle. An automobile insurance premium may be determined by evaluating how effectively the vehicle may be able to avoid and/or mitigate crashes and/or the extent to which the driver's control of the vehicle is enhanced or replaced by the vehicle's software and artificial intelligence.

When pricing a vehicle with autonomous operation features, artificial intelligence capabilities, rather than human decision making, may be evaluated to determine the relative risk of the insurance policy. This evaluation may be conducted using multiple techniques. Autonomous operation feature technology may be assessed in a test environment, in which the ability of the artificial intelligence to detect and avoid potential crashes may be demonstrated experimentally. For example, this may include a vehicle's ability to detect a slow-moving vehicle ahead and/or automatically apply the brakes to prevent a collision. Additionally, actual loss experience of the software in question may be analyzed. Vehicles with superior artificial intelligence and crash avoidance capabilities may experience lower insurance losses in real driving situations. Results from both the test environment and/or actual insurance losses may be compared to the results of other autonomous software packages and/or vehicles lacking autonomous operation features to determine a relative risk levels or risk factors for one or more autonomous operation features. To determine such risk levels or factors, the control decisions generated by autonomous operation features may be assessed to determine the degree to which actual or shadow control decisions are expected to succeed in avoiding or mitigating vehicle accidents. This risk levels or factors may be applicable to other vehicles that utilize the same or similar autonomous operation features and may, in some embodiments, be applied to vehicle utilizing similar features (such as other software versions), which may require adjustment for differences between the features.

Emerging technology, such as new iterations of artificial intelligence systems or other autonomous operation features, may be priced by combining an individual test environment assessment with actual losses corresponding to vehicles with similar autonomous operation features. The entire vehicle software and artificial intelligence evaluation process may be conducted with respect to each of various autonomous operation features, including fully autonomous operation feature, semi-autonomous operation features, or vehicle-to-vehicle communications. A risk level or risk factor associated with the one or more autonomous operation features of the vehicle could then be determined and applied when pricing insurance for the vehicle. In some embodiments, the driver's past loss experience and/or other driver risk characteristics may not be considered for fully autonomous vehicles, in which all driving decisions are made by the vehicle's artificial intelligence. Risks associated with the driver's operation of the vehicle may, however, be included in embodiments in which the driver controls some portion of vehicle operation in at least some circumstances.

In one embodiment, a separate portion of the automobile insurance premium may be based explicitly on the effectiveness of the autonomous operation features. The artificial intelligence pricing model may be combined with traditional methods for semi-autonomous vehicle operation. Insurance pricing for fully autonomous, or driverless, vehicles may be based upon an artificial intelligence model score by excluding traditional rating factors that measure risk presented by the drivers. Evaluation of vehicle software and/or artificial intelligence may be conducted on an aggregate basis or for specific combinations of autonomous operation features and/or driving factors.

An analysis of how the artificial intelligence of autonomous operation features facilitates avoiding accidents and/or mitigates the severity of accidents in order to build a database and/or model of risk assessment. After which, automobile insurance risk and/or premiums (as well as insurance discounts, rewards, and/or points) may be adjusted based upon autonomous or semi-autonomous vehicle functionality, such as by individual autonomous operation features or groups thereof. In one aspect, an evaluation may be performed of how artificial intelligence, and the usage thereof, impacts automobile accidents and/or automobile insurance claims. Such analysis may be based upon data from a plurality of autonomous vehicles operating in ordinary use, or the analysis may be based upon tests performed upon autonomous vehicles and/or autonomous operation feature test units.

The types of autonomous or semi-autonomous vehicle-related functionality or technology implemented by various autonomous operation features may include or be related to the following: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance, (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

The adjustments to automobile insurance rates or premiums based upon the autonomous or semi-autonomous vehicle-related functionality or technology may take into account the impact of such functionality or technology on the likelihood of a vehicle accident or collision occurring or upon the likely severity of such accident or collision. For instance, a processor may analyze historical accident information and/or test data involving vehicles having autonomous or semi-autonomous functionality. Factors that may be analyzed and/or accounted for that are related to insurance risk, accident information, or test data may include the following: (1) point of impact; (2) type of road; (3) time of day; (4) weather conditions (5) road construction; (6) type/length of trip; (7) vehicle style; (8) level of pedestrian traffic: (9) level of vehicle congestion; (10) atypical situations (such as manual traffic signaling) (11) availability of internet connection for the vehicle; and/or other factors. These types of factors may also be weighted according to historical accident information, predicted accidents, vehicle trends, test data, and/or other considerations.

Automobile insurance premiums, rates, discounts, rewards, refunds, points, etc. may be adjusted based upon the percentage of time or vehicle usage that the vehicle is the driver, i.e., the amount of time a specific driver uses each type of autonomous operation feature. In other words, insurance premiums, discounts, rewards, etc. may be adjusted based upon the percentage of vehicle usage during which the autonomous or semi-autonomous functionality is in use. For example, automobile insurance risks, premiums, discounts, etc. for an automobile having one or more autonomous operation features may be adjusted and/or set based upon the percentage of vehicle usage that the one or more individual autonomous operation features are in use, which may include an assessment of settings used for the autonomous operation features. In some embodiments, such automobile insurance risks, premiums, discounts, etc. may be further set or adjusted based upon availability, use, or quality of Vehicle-to-Vehicle (V2V) wireless communication to a nearby vehicle also employing the same or other type(s) of autonomous communication features.

Insurance premiums, rates, ratings, discounts, rewards, special offers, points, programs, refunds, claims, claim amounts, etc. may be adjusted for, or may otherwise take into account, the foregoing functionalities, technologies, or aspects of the autonomous operation features of vehicles, as described elsewhere herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Machine Learning

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as time of day, weather conditions, traffic congestion, interaction between autonomous operation features, or other such variables that influence the risks associated with autonomous or semi-autonomous vehicle operation.

Some embodiments described herein may include automated machine learning to determine risk levels, identify relevant risk factors, optimize autonomous or semi-autonomous operation, optimize routes, determine autonomous operation feature effectiveness, predict user demand for a vehicle, determine vehicle operator or passenger illness or injury, evaluate sensor operating status, predict sensor failure, evaluate damage to a vehicle, predict repairs to a vehicle, predict risks associated with manual vehicle operation based upon the driver and environmental conditions, recommend optimal or preferred autonomous operation feature usage, estimate risk reduction or cost savings from feature usage changes, determine when autonomous operation features should be engaged or disengaged, determine whether a driver is prepared to resume control of some or all vehicle operations, and/or determine other events, conditions, risks, or actions as described elsewhere herein. Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as autonomous vehicle system, feature, or sensor data, autonomous vehicle system control signal data, vehicle-mounted sensor data, mobile device sensor data, and/or telematics, image, or radar data) in order to facilitate making predictions for subsequent data (again, such as autonomous vehicle system, feature, or sensor data, autonomous vehicle system control signal data, vehicle-mounted sensor data, mobile device sensor data, and/or telematics, image, or radar data). Models may be created based upon example inputs of data in order to make valid and reliable predictions for novel inputs.

Additionally or alternatively, the machine learning programs may be trained by inputting sample data sets or certain data into the programs, such as autonomous system sensor and/or control signal data, and other data discuss herein. The machine learning programs may utilize deep learning algorithms are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by the autonomous systems or sensors, and under what conditions those control signals were generated by the autonomous systems or sensors.

The machine learning programs may be trained with autonomous system data, autonomous sensor data, and/or vehicle-mounted or mobile device sensor data to identify actions taken by the autonomous vehicle before, during, and/or after vehicle collisions: identify who was behind the wheel of the vehicle (whether actively driving, or riding along as the autonomous vehicle autonomously drove); identify actions taken be the human driver and/or autonomous system, and under what (road, traffic, congestion, or weather) conditions those actions were directed by the autonomous vehicle or the human driver; identify damage (or the extent of damage) to insurable vehicles after an insurance-related event or vehicle collision; and/or generate proposed insurance claims for insured parties after an insurance-related event.

The machine learning programs may be trained with autonomous system data, autonomous vehicle sensor data, and/or vehicle-mounted or mobile device sensor data to identify preferred (or recommended) and actual control signals relating to or associated with, for example, whether to apply the brakes; how quickly to apply the brakes; an amount of force or pressure to apply the brakes; how much to increase or decrease speed; how quickly to increase or decrease speed; how quickly to accelerate or decelerate; how quickly to change lanes or exit; the speed to take while traversing an exit or on ramp; at what speed to approach a stop sign or light; how quickly to come to a complete stop; and/or how quickly to accelerate from a complete stop.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data, such that the machine learning programs may be trained by inputting sample data sets or certain data into the programs, such as image, vehicle telematics, and/or intelligent home telematics data. The machine learning programs may include Bayesian program learning (BPL), voice recognition and synthesis, image or object recognition, optical character recognition, natural language processing, semantic analysis, and/or automatic reasoning. Models may be created based upon example inputs in order to make valid and reliable predictions for novel inputs.

Machine learning techniques may be used to extract the relevant personal and/or driving behavior-related information for drivers from vehicle-mounted, mobile device-mounted, and/or other sensor data, telematics data, image data, vehicle and GPS data, and/or other data. In one embodiment, a processing element may be trained by providing it with a large sample of conventional analog and/or digital, still and/or moving (i.e., video) image data, telematics data, and/or other data of drivers with known driving characteristics or driving risk profiles. Such information may include, for example, acceleration, cornering, speed, braking, and other driving characteristics and known risks associated with those characteristics. Based upon these analyses, the processing element may learn how to identify characteristics and patterns that may then be applied to analyzing sensor data, telematics data, image data, vehicle data, autonomous system data, GPS data, and/or other data of new drivers or insurance applicants. For example, the processing element may learn to determine the applicant's driving risk profile from telematics and image data of applicant's driving behavior, may learn to identify low risk or risk averse driving behavior by the applicant through vehicle operation, and/or may learn to determine such other information as the applicant's typical area of travel. In another embodiment, a processing element may be trained by providing it with a large sample of conventional analog and/or digital, still and/or moving (i.e., video) image data, and/or other data of roads with known defects/obstacles or of known obstacles. The road defects/obstacles may be include pot holes, detours, construction, pedestrians, parked vehicles, congestion, traffic, and the known obstacles may include pedestrians, vehicles, construction crews, animals (deer, moose, boars, etc.).

After training, machine learning programs (or information generated by such machine learning programs) may be used to evaluate additional data. Such data may be related to tests of new autonomous operation feature or versions thereof, actual operation of an autonomous vehicle, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, thus, be used to perform part or all of the analytical functions of the methods described elsewhere herein.

Exemplary Computer Systems

In one aspect, a computer system configured to analyze roadway suitability for autonomous or semi-autonomous vehicle operation may be provided. The computer system may include comprising one or more local or remote processors, transceivers, and/or sensors configured to: (1) receive map data including indications of a plurality of road segments; (2) receive operating data from a plurality of vehicles having at least one autonomous operation feature, wherein the operating data includes location data associated with operation of the plurality of vehicles; (3) identify a road segment to analyze from the plurality of road segments; (4) associate a subset of the operating data with the identified road segment based upon the location data; (5) determine one or more risk levels associated with the road segment based upon the associated subset of the operating data (such as by inputting the subset of operating data into a machine learning program trained to identify risk levels associated with road segments using operating data); (6) determine one or more suitability scores for the road segment based upon the one or more risk levels, each suitability score indicating a category of suitability for autonomous or semi-autonomous vehicle operation (such as by inputting the risk levels into a machine learning program trained to determine suitability scores for road segments using risk levels); and/or (7) store, in a database, the one or more suitability scores, each suitability score further stored with an indication of the associated road segment to facilitate roadway suitability for autonomous or semi-autonomous vehicle operation analysis.

In another aspect, a computer system configured to provide autonomous or semi-autonomous vehicle routing may be provided. The computer system may include one or more local or remote processors, transceivers, and/or sensors configured to: (1) receive a request to determine an optimal route for a vehicle; (2) receive a first geospatial location indicating a starting location; (3) receive a second geospatial location indicating a destination location; (4) receive a set of parameters indicating requirements for the optimal route; (5) access, from a database, map data including a plurality of road segments, wherein the map data includes one or more suitability scores for each road segment indicating the road segment's suitability for autonomous or semi-autonomous vehicle operation; (6) identify a set of suitable road segments from the plurality of road segments (such as by using machine learning or other processing techniques), wherein each suitable road segment of the set meets the requirements indicated by the set of parameters; (7) determine one or more paths between the first geospatial location and the second geospatial location (such as by using machine learning or other processing techniques), each path composed of one or more of the suitable road segments of the set of suitable road segments; and/or (8) select the optimal route from the one or more paths (such as by using machine learning or other processing techniques) to facilitate autonomous or semi-autonomous vehicle routing.

In another aspect, a computer system configured for automatically routing a vehicle capable of autonomous operation may be provided. The computer system may include one or more local or remote processors, transceivers, and/or sensors configured to: (1) receive an indication of an emergency condition; (2) determine a target location to which to route the vehicle, wherein the target location is associated with emergency assistance; (3) determine a route to the target location, wherein the route includes only road segments meeting a minimum safety rating for fully autonomous vehicle operation; and/or (4) cause or direct a vehicle control system of the vehicle to operate the vehicle along the determined route to the target location to facilitate autonomous vehicle routing.

In another aspect, a computer system configured for automatically routing a vehicle capable of autonomous operation may be provided. The computer system may include one or more local or remote processors, transceivers, and/or sensors configured to: (1) receive a request from a user to initiate an autonomous vehicle trip; (2) receive an indication of a starting location from which to begin the autonomous vehicle trip; (3) receive an indication of a target location to which to route the vehicle during the autonomous vehicle trip; (4) determine an autonomous route from the starting location to the target location, wherein the autonomous route includes only road segments suitable for fully autonomous vehicle travel; (5) cause or direct a vehicle control system of the vehicle to operate the vehicle autonomously along the autonomous route from the starting location to the target location; and/or (6) cause or direct the vehicle control system of the vehicle to stop at the target location to allow one or more passengers to exit the vehicle to facilitate routing an autonomous vehicle.

In another aspect, a computer system configured for automatically parking a vehicle capable of autonomous operation at a parking facility may be provided. The computer system may include one or more local or remote processors, transceivers, or sensors configured to: (1) receive, via a communication network, radio link or wireless communication channel, a request for a parking space for the vehicle; (2) determine whether at least one parking space is available at the parking facility; (3) when the parking facility is determined to have at least one parking space available, sending, via the communication network, radio link or wireless communication channel, an indication that the requested parking space is available at the parking facility; and (4) when the parking facility is determined not to have at least one parking space available: (i) determine an alternative parking facility, and (ii) send, via the communication network, radio link or wireless communication channel, an indication of the alternative parking facility.

In another aspect, a computer system configured for automatically retrieving a vehicle capable of autonomous operation from a parking space at a parking facility may be provided. The computer system may include one or more local or remote processors, transceivers, and/or sensors configured to: (1) receive, via a communication network or wireless communication channel, a request to provide access to the vehicle to a user; (2) determine a target location at which to provide access to the vehicle to the user; (3) determine a movement plan for the vehicle, the movement plan including an autonomous route from the parking space to the target location; and/or (4) cause or direct a vehicle control system of the vehicle to operate the vehicle to the target location according to the movement plan to facilitate retrieving an autonomous vehicle.

The foregoing computer systems may include additional, less, or alternate functionality, including that discussed elsewhere herein. The foregoing computer systems may be implemented via computer-readable instructions stored on non-transitory computer-readable medium or media.

Other Matters

In some aspect, customers may opt-in to a rewards, loyalty, or other program. The customers may allow a remote server to collect sensor, telematics, vehicle, mobile device, and other types of data discussed herein. With customer permission or affirmative consent, the data collected may be analyzed to provide certain benefits to customers. For instance, insurance cost savings may be provided to lower risk or risk averse customers.

Recommendations that lower risk or provide cost savings to customers may also be generated and provided to customers based upon data analysis. The other functionality discussed herein may also be provided to customers in return for them allowing collection and analysis of the types of data discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes." "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary. "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for autonomous or semi-autonomous vehicle routing, comprising:
    receiving, at one or more processors, a first geospatial location indicating a starting location;
    receiving, at the one or more processors, a second geospatial location indicating a destination location;
    receiving, at the one or more processors, a set of parameters indicating requirements for an optimal route;
    accessing, from a database, map data including a plurality of road segments, wherein the map data includes one or more suitability scores for each road segment indicating the road segment's suitability for autonomous or semi-autonomous vehicle operation;
    identifying, by the one or more processors, a set of suitable road segments from the plurality of road segments, wherein each suitable road segment of the set meets the requirements indicated by the set of parameters;
    determining, by the one or more processors, one or more paths between the first geospatial location and the second geospatial location, each path composed of one or more of the suitable road segments of the set of suitable road segments; and
    selecting, by the one or more processors, the optimal route from the one or more paths.

2. The computer-implemented method of claim 1, wherein the parameters indicate a minimum safety rating for fully autonomous vehicle operation.

3. The computer-implemented method of claim 2, wherein the minimum safety rating is associated with a risk level for fully autonomous operation of the vehicle below a risk threshold.

4. The computer-implemented method of claim 1, further comprising:
    causing, by a vehicle control system of the vehicle, the vehicle to operate along the optimal route from the first geospatial location to the second geospatial location.

5. The computer-implemented method of claim 1, wherein the optimal route is selected from the one or more paths based upon maximization or minimization of one or more optimization criteria determined for each path.

6. The computer-implemented method of claim 5, wherein the optimization criteria include distance, time, risk, cost, or amount of manual driving required.

7. The computer-implemented method of claim 1, further comprising:
    determining, by the one or more processors, that no path exists between the first geospatial location and the second geospatial location using the suitable road segments of the set of suitable road segments meeting the requirements indicated by the received parameters;
    determining, by the one or more processors, a second set of parameters based upon the received set of parameters; and
    adding, by the one or more processors, one or more suitable road segments from the plurality of road segments to the set of suitable road segments, wherein each suitable road segment that is added meets the requirements indicated by the second set of parameters, wherein the one or more paths between the first geospatial location and the second geospatial location include at least one of the added suitable road segments.

8. The computer-implemented method of claim 1, further comprising:
    determining, by the one or more processors, that no path exists between the first geospatial location and the second geospatial location using the suitable road segments of the set of suitable road segments meeting the requirements indicated by the received parameters;
    determining, by the one or more processors, at least one of a substitute starting location or a substitute destination location along one of the suitable road segments; and
    adjusting, by the one or more processors, at least one of the first geospatial location to indicate the substitute starting location or the second geospatial location to indicate the substitute destination location, wherein the one or more paths between the first geospatial location and the second geospatial location are determined using the adjusted at least one of the first geospatial location or the second geospatial location.

9. The computer-implemented method of claim 1, wherein the first geospatial location is automatically determined based upon the current location of the vehicle in response to a request to determine the optimal route.

10. The computer-implemented method of claim 9, wherein the current location of the vehicle is obtained from a global positioning system (GPS) receiver within the vehicle.

11. The computer-implemented method of claim 1, wherein:
    the one or more processors are disposed within a server remote from the vehicle;
    the computer-implemented method further comprises transmitting, from the server to a computing device associated with the vehicle via a communication network, an indication of the optimal route.

12. The computer-implemented method of claim 11, further comprising:
    receiving, at the one or more processors, operating data from the vehicle, the operating data including location data indicating a plurality of locations of the vehicle after the indication of the optimal route is transmitted;
    determining, by the one or more processors, an extent to which the location data indicates the vehicle has followed the optimal route; and
    implementing, by the one or more processors, a response based upon the determined extent to which the vehicle has followed the optimal route.

13. A computer system for autonomous or semi-autonomous vehicle routing, comprising:
    one or more processors;

a map database communicatively connected to the one or more processors and storing data including one or more suitability scores for each of a plurality of road segments indicating the road segment's suitability for autonomous or semi-autonomous vehicle operation; and a program memory coupled to the one or more processors and storing executable instructions that when executed by the one or more processors, cause the computer system to:
receive a first geospatial location indicating a starting location;
receive a second geospatial location indicating a destination location;
receive a set of parameters indicating requirements for an optimal route;
access map data for a plurality of road segments from the map database;
identify a set of suitable road segments from the plurality of road segments, wherein each suitable road segment of the set meets the requirements indicated by the set of parameters;
determine one or more paths between the first geospatial location and the second geospatial location, each path composed of one or more of the suitable road segments of the set of suitable road segments; and
select the optimal route from the one or more paths.

14. The computer system of claim 13, wherein:
the parameters indicate a minimum safety rating for fully autonomous vehicle operation associated with a risk level for fully autonomous operation of the vehicle below a risk threshold; and
the optimal route is selected from the one or more paths based upon maximization or minimization of one or more optimization criteria determined for each path, the optimization criteria including one or more of: distance, time, risk, cost or amount of manual driving required.

15. The computer system of claim 13, wherein the program memory further stores executable instructions that cause the computer system to:
control the vehicle to operate along the optimal route from the first geospatial location to the second geospatial location.

16. The computer system of claim 15, wherein:
the one or more processors are disposed within a server remote from the vehicle;
the computer system further comprises a communication unit configured to communicate between the one or more processors of the server and an on-board computer of the vehicle; and
control the vehicle to operate along the optimal route further comprises transmitting an indication of the optimal route from the server to the on-board computer via the communication unit.

17. The computer system of claim 13, wherein the program memory further stores executable instructions that cause the computer system to:
receive operating data from the vehicle, the operating data including location data indicating a plurality of locations of the vehicle after the indication of the optimal route is transmitted;
determine an extent to which the location data indicates the vehicle has followed the optimal route; and
implement a response based upon the determined extent to which the vehicle has followed the optimal route.

18. The computer system of claim 13, wherein the first geospatial location is automatically determined based upon the current location of the vehicle in response to a request to determine the optimal route.

19. A tangible, non-transitory computer-readable medium storing instructions for autonomous or semi-autonomous vehicle routing that, when executed by at least one processor of a computer system, cause the computer system to:
receive a first geospatial location indicating a starting location;
receive a second geospatial location indicating a destination location;
receive a set of parameters indicating requirements for an optimal route;
access map data including a plurality of road segments from a database, wherein the map data includes one or more suitability scores for each road segment indicating the road segment's suitability for autonomous or semi-autonomous vehicle operation;
identify a set of suitable road segments from the plurality of road segments, wherein each suitable road segment of the set meets the requirements indicated by the set of parameters;
determine one or more paths between the first geospatial location and the second geospatial location, each path composed of one or more of the suitable road segments of the set of suitable road segments; and
select the optimal route from the one or more paths.

20. The tangible, non-transitory computer-readable medium of claim 19, wherein:
the parameters indicate a minimum safety rating for folly autonomous vehicle operation associated with a risk level for fully autonomous operation of the vehicle below a risk threshold; and
the optimal route is selected from the one or more paths based upon maximization or minimization of one or more optimization criteria determined for each path, the optimization criteria including one or more of: distance, time, risk cost, or amount of manual driving required.

* * * * *